US006980091B2

(12) United States Patent
White, II et al.

(10) Patent No.: US 6,980,091 B2
(45) Date of Patent: Dec. 27, 2005

(54) POWER LINE COMMUNICATION SYSTEM AND METHOD OF OPERATING THE SAME

(75) Inventors: Melvin Joseph White, II, Germantown, MD (US); James Douglas Mollenkopf, Fairfax, VA (US)

(73) Assignee: Current Technologies, LLC, Germantown, MD (US)

( * ) Notice: Subject to any disclaimer, the term of this patent is extended or adjusted under 35 U.S.C. 154(b) by 18 days.

(21) Appl. No.: 10/641,689

(22) Filed: Aug. 14, 2003

(65) Prior Publication Data

US 2004/0113757 A1 Jun. 17, 2004

Related U.S. Application Data

(63) Continuation of application No. 10/626,308, filed on Jul. 23, 2003, and a continuation-in-part of application No. 10/315,725, filed on Dec. 10, 2002, and a continuation-in-part of application No. 10/319,317, filed on Dec. 13, 2002, and a continuation-in-part of application No. 10/436,778, filed on May 13, 2003.

(51) Int. Cl.$^7$ ...................... H04M 11/04; H04L 27/00; G05D 11/00
(52) U.S. Cl. ........................... 340/310.01; 340/310.06; 340/310.08; 700/286; 702/62; 709/224; 375/259; 333/24 R
(58) Field of Search ..................... 340/310.01–310.08; 700/9, 11, 12, 17, 83, 286, 295; 713/200–202; 702/62; 375/258, 259; 370/254; 455/406–408; 709/220, 221, 223, 224, 208; 705/1, 63; 333/24 R

(56) References Cited

U.S. PATENT DOCUMENTS 1,547,242 A 7/1925 Strieby

| | | | |
|---|---|---|---|
| 2,298,435 A | 10/1942 | Tunick | 250/15 |
| 2,577,731 A | 12/1951 | Berger | 179/2.5 |
| 3,369,078 A | 2/1968 | Stradley | 179/2.5 |
| 3,445,814 A | 5/1969 | Spalti | 340/151 |
| 3,605,009 A | 9/1971 | Enge | 323/93 |
| 3,641,536 A | 2/1972 | Prosprich | 340/870.15 |
| 3,656,112 A | 4/1972 | Paull | 340/151 |
| 3,696,383 A | 10/1972 | Oishi et al. | 340/310 |
| 3,701,057 A | 10/1972 | Hoer | 333/112 |
| 3,702,460 A | 11/1972 | Blose | 340/150 |
| 3,810,096 A | 5/1974 | Kabat et al. | 340/147 R |
| 3,846,638 A | 11/1974 | Wetherell | 307/3 |
| 3,895,370 A | 7/1975 | Valentini | 340/310 |
| 3,900,842 A | 8/1975 | Calabro et al. | 340/310.03 |

(Continued)

FOREIGN PATENT DOCUMENTS

DE 197 28 270 A1 1/1999

(Continued)

OTHER PUBLICATIONS

Dostert, K., Powerline Communications, Ch. 5, pp. 286, 288-292, Prentice Hall PTR, Upper Saddle River, NJ © 2001.

(Continued)

Primary Examiner—Donnie L. Crosland
(74) Attorney, Agent, or Firm—Mel Barnes; Manelli Denison & Selter PLLC

(57) ABSTRACT

The present invention provides a system for operating a power line communications system that is comprised of a plurality of network elements, which may take the form of repeaters, bypass devices, backhaul devices, wireless backhaul devices, enhanced bypass device, communication interface devices and others. In one embodiment, two groups of network elements in the same electrical distribution system are isolated except selected communication link.

78 Claims, 20 Drawing Sheets

U.S. PATENT DOCUMENTS

| | | | |
|---|---|---|---|
| 3,911,415 A | 10/1975 | Whyte | 340/310 |
| 3,942,168 A | 3/1976 | Whyte | 340/310.01 |
| 3,942,170 A | 3/1976 | Whyte | 340/310 |
| 3,962,547 A | 6/1976 | Pattantyus-Abraham | 179/2.5 R |
| 3,964,048 A | 6/1976 | Lusk et al. | 340/310 R |
| 3,967,264 A | 6/1976 | Whyte et al. | 340/310.08 |
| 3,973,087 A | 8/1976 | Fong | 179/170 R |
| 3,973,240 A | 8/1976 | Fong | 340/151 |
| 4,004,110 A | 1/1977 | Whyte | 179/170 J |
| 4,004,257 A | 1/1977 | Geissler | 333/207 |
| 4,012,733 A | 3/1977 | Whyte | 340/310 |
| 4,016,429 A | 4/1977 | Vercellotti et al. | 307/149 |
| 4,017,845 A | 4/1977 | Killian et al. | 340/310.02 |
| 4,053,876 A | 10/1977 | Taylor | 340/529 |
| 4,057,793 A | 11/1977 | Johnson et al. | 340/310 R |
| 4,060,735 A | 11/1977 | Pascucci et al. | 307/3 |
| 4,070,572 A | 1/1978 | Summerhayes | 250/199 |
| 4,119,948 A | 10/1978 | Ward et al. | 340/870.02 |
| 4,142,178 A | 2/1979 | Whyte et al. | 340/310 |
| 4,188,619 A | 2/1980 | Perkins | 340/310 R |
| 4,239,940 A | 12/1980 | Dorfman | 179/2.51 |
| 4,250,489 A | 2/1981 | Dudash et al. | 340/147 T |
| 4,254,402 A | 3/1981 | Perkins | 340/310 R |
| 4,263,549 A | 4/1981 | Toppeto | 324/127 |
| 4,268,818 A | 5/1981 | Davis et al. | 340/870.38 |
| 4,323,882 A | 4/1982 | Gajjer | 340/310 R |
| 4,357,598 A | 11/1982 | Melvin, Jr. | 340/310 A |
| 4,359,644 A | 11/1982 | Foord | 307/40 |
| 4,367,522 A | 1/1983 | Forstbauer et al. | 363/137 |
| 4,383,243 A | 5/1983 | Krügel et al. | 340/310 R |
| 4,386,436 A | 5/1983 | Kocher et al. | 455/151.4 |
| 4,408,186 A | 10/1983 | Howell | 340/310 A |
| 4,409,542 A | 10/1983 | Becker et al. | 324/57 Q |
| 4,413,250 A | 11/1983 | Porter et al. | 340/310.01 |
| 4,419,621 A | 12/1983 | Becker et al. | 324/51 |
| 4,433,284 A | 2/1984 | Perkins | 323/361 |
| 4,442,492 A | 4/1984 | Karlsson et al. | 364/464 |
| 4,457,014 A | 6/1984 | Bloy | 381/98 |
| 4,468,792 A | 8/1984 | Baker et al. | 375/45 |
| 4,471,399 A | 9/1984 | Udren | 361/64 |
| 4,473,816 A | 9/1984 | Perkins | 340/310 |
| 4,473,817 A | 9/1984 | Perkins | 340/310 |
| 4,475,209 A | 10/1984 | Udren | 375/4 |
| 4,479,033 A | 10/1984 | Brown et al. | 179/2.51 |
| 4,481,501 A | 11/1984 | Perkins | 340/310 |
| 4,495,386 A | 1/1985 | Brown et al. | 455/402 |
| 4,504,705 A | 3/1985 | Pilloud | 381/77 |
| 4,517,548 A | 5/1985 | Ise et al. | 340/310 R |
| 4,569,045 A | 2/1986 | Schieble et al. | 370/85 |
| 4,599,598 A | 7/1986 | Komoda et al. | 340/310 A |
| 4,636,771 A | 1/1987 | Ochs | 340/310.05 |
| 4,638,298 A | 1/1987 | Spiro | 370/392 |
| 4,642,607 A | 2/1987 | Strom et al. | 340/310 |
| 4,644,321 A | 2/1987 | Kennon | 340/310 A |
| 4,652,855 A | 3/1987 | Weikel | 340/310 |
| 4,668,934 A | 5/1987 | Shuey | 340/310.06 |
| 4,675,648 A | 6/1987 | Roth et al. | 340/310.07 |
| 4,683,450 A | 7/1987 | Max et al. | 333/202 |
| 4,686,382 A | 8/1987 | Shuey | 307/149 |
| 4,686,641 A | 8/1987 | Evans | 364/580 |
| 4,697,166 A | 9/1987 | Warnagiris et al. | 340/310 R |
| 4,701,945 A | 10/1987 | Pedigo | 379/66 |
| 4,724,381 A | 2/1988 | Crimmins | 324/127 |
| 4,745,391 A | 5/1988 | Gajjar | 340/310 A |
| 4,746,897 A | 5/1988 | Shuey | 340/310 R |
| 4,749,992 A | 6/1988 | Fitzmeyer et al. | 340/870.02 |
| 4,749,992 A | 6/1988 | Fitzmeyer et al. | 340/870.02 |
| 4,766,414 A | 8/1988 | Shuey | 340/310 A |
| 4,772,870 A | 9/1988 | Reyes | 340/310 R |
| 4,785,195 A | 11/1988 | Rochelle et al. | 307/18 |
| 4,800,363 A | 1/1989 | Braun et al. | 340/310 A |
| 4,815,106 A | 3/1989 | Propp et al. | 375/257 |
| 4,835,517 A | 5/1989 | van der Gracht et al. | 340/310 A |
| 4,890,089 A | 12/1989 | Shuey | 340/310.07 |
| 4,903,006 A | 2/1990 | Boomgaard | 340/310 A |
| 4,904,996 A | 2/1990 | Fernandes | 340/870.07 |
| 4,912,553 A | 3/1990 | Pal et al. | 358/86 |
| 4,962,496 A | 10/1990 | Vercellotti et al. | 370/204 |
| 4,973,940 A | 11/1990 | Sakai et al. | 340/310 R |
| 4,979,183 A | 12/1990 | Cowart | 375/142 |
| 5,006,846 A | 4/1991 | Granville et al. | 340/870.28 |
| 5,066,939 A | 11/1991 | Mansfield, Jr. | 340/310 R |
| 5,068,890 A | 11/1991 | Nilssen | 379/90 |
| 5,132,992 A | 7/1992 | Yurt et al. | 375/240 |
| 5,148,144 A | 9/1992 | Sutterlin et al. | 340/310 A |
| 5,151,838 A | 9/1992 | Dockery | 340/310 R |
| 5,185,591 A | 2/1993 | Shuey | 340/310 A |
| 5,191,467 A | 3/1993 | Kapany et al. | 359/341 |
| 5,210,519 A | 5/1993 | Moore | 340/310 |
| 5,257,006 A | 10/1993 | Graham et al. | 340/310 A |
| 5,264,823 A | 11/1993 | Stevens | 340/310.04 |
| 5,272,462 A | 12/1993 | Teyssandier et al. | 340/310.01 |
| 5,301,208 A | 4/1994 | Rhodes | 375/36 |
| 5,319,634 A | 6/1994 | Bartholomew et al. | 370/18 |
| 5,341,265 A | 8/1994 | Westrom et al. | 361/44 |
| 5,351,272 A | 9/1994 | Abraham | 375/38 |
| 5,355,109 A | 10/1994 | Yamazaki | 336/92 |
| 5,359,625 A | 10/1994 | Vander Mey et al. | 375/1 |
| 5,369,356 A | 11/1994 | Kinney et al. | 324/142 |
| 5,375,141 A | 12/1994 | Takahashi | 375/1 |
| 5,406,249 A | 4/1995 | Pettus | 340/310.06 |
| 5,410,720 A | 4/1995 | Osterman | 725/150 |
| 5,426,360 A | 6/1995 | Maraio et al. | 324/126 |
| 5,432,841 A | 7/1995 | Rimer | 455/457 |
| 5,448,229 A | 9/1995 | Lee, Jr. | 340/870.02 |
| 5,461,629 A | 10/1995 | Sutterlin et al. | 371/30 |
| 5,477,091 A | 12/1995 | Fiorina et al. | 307/66 |
| 5,481,249 A | 1/1996 | Sato | 340/2.1 |
| 5,485,040 A | 1/1996 | Sutterlin | 307/3 |
| 5,497,142 A | 3/1996 | Chaffanjon | 340/310.06 |
| 5,498,956 A | 3/1996 | Kinney et al. | 324/142 |
| 5,533,054 A | 7/1996 | DeAndrea et al. | 375/286 |
| 5,537,087 A | 7/1996 | Naito | 336/92 |
| 5,559,377 A | 9/1996 | Abraham | 307/104 |
| 5,568,185 A | 10/1996 | Yoshikazu | 348/22 |
| 5,579,221 A | 11/1996 | Mun | 364/188 |
| 5,579,335 A | 11/1996 | Sutterlin et al. | 375/200 |
| 5,592,354 A | 1/1997 | Nocentino, Jr. | 361/69 |
| 5,592,482 A | 1/1997 | Abraham | 348/8 |
| 5,598,406 A | 1/1997 | Albrecht et al. | 370/296 |
| 5,616,969 A | 4/1997 | Morava | 307/91 |
| 5,625,863 A | 4/1997 | Abraham | 455/3.3 |
| 5,630,204 A | 5/1997 | Hylton et al. | 455/3.3 |
| 5,640,416 A | 6/1997 | Chalmers | 375/147 |
| 5,664,002 A | 9/1997 | Skinner, Sr. | 379/56.2 |
| 5,684,450 A | 11/1997 | Brown | 340/310.02 |
| 5,691,691 A | 11/1997 | Merwin et al. | 340/310.02 |
| 5,694,108 A | 12/1997 | Shuey | 340/310.01 |
| 5,705,974 A | 1/1998 | Patel et al. | 340/310.08 |
| 5,712,614 A | 1/1998 | Patel et al. | 340/310.03 |
| 5,717,685 A | 2/1998 | Abraham | 370/30 |
| 5,726,980 A | 3/1998 | Rickard | 370/293 |
| 5,748,104 A | 5/1998 | Argyroudis et al. | 340/870.11 |
| 5,748,671 A | 5/1998 | Sutterlin et al. | 375/206 |
| 5,751,803 A | 5/1998 | Shpater | 379/379 |
| 5,770,996 A | 6/1998 | Severson et al. | 340/310.08 |
| 5,774,526 A | 6/1998 | Propp et al. | 379/90.1 |
| 5,777,544 A | 7/1998 | Vander Mey et al. | 340/310.06 |
| 5,777,545 A | 7/1998 | Patel et al. | 341/310.06 |
| 5,777,769 A | 7/1998 | Coutinho | 359/173 |
| 5,778,116 A | 7/1998 | Tomich | 385/16 |
| 5,796,607 A | 8/1998 | Le Van Suu | 364/140.01 |
| 5,798,913 A | 8/1998 | Tiesinga et al. | 363/21.13 |

| Patent No. | | Date | Inventor | Class |
|---|---|---|---|---|
| 5,801,643 | A | 9/1998 | Williams et al. | 340/870.02 |
| 5,802,102 | A | 9/1998 | Davidovici | 375/152 |
| 5,805,053 | A | 9/1998 | Patel et al. | 340/310.01 |
| 5,805,458 | A * | 9/1998 | McNamara et al. | 702/60 |
| 5,818,127 | A | 10/1998 | Abraham | 307/106 |
| 5,818,821 | A | 10/1998 | Schurig | 370/293 |
| 5,828,293 | A | 10/1998 | Rickard | 340/310.04 |
| 5,835,005 | A | 11/1998 | Furukawa et al. | 340/310.01 |
| 5,847,447 | A | 12/1998 | Rozin et al. | 257/678 |
| 5,850,114 | A | 12/1998 | Froidevaux | 307/105 |
| 5,856,776 | A | 1/1999 | Armstrong et al. | 340/310.01 |
| 5,864,284 | A | 1/1999 | Sanderson et al. | 340/310.01 |
| 5,870,016 | A | 2/1999 | Shresthe | 340/310.01 |
| 5,880,677 | A | 3/1999 | Lestician | 340/825.06 |
| 5,881,098 | A | 3/1999 | Tzou | 375/152 |
| 5,892,430 | A | 4/1999 | Wiesman et al. | 340/310.01 |
| 5,892,758 | A | 4/1999 | Argyroudis | 370/335 |
| 5,929,750 | A | 7/1999 | Brown | 340/310.02 |
| 5,933,071 | A | 8/1999 | Brown | 340/310.01 |
| 5,933,073 | A | 8/1999 | Shuey | 340/310.07 |
| 5,937,003 | A | 8/1999 | Sutterlin et al. | 375/208 |
| 5,937,342 | A | 8/1999 | Kline | 455/402 |
| 5,949,327 | A | 9/1999 | Brown | 340/310.01 |
| 5,952,914 | A | 9/1999 | Wynn | 340/310.01 |
| 5,963,585 | A | 10/1999 | Omura et al. | 375/207 |
| 5,977,650 | A | 11/1999 | Rickard et al. | 307/3 |
| 5,978,371 | A | 11/1999 | Mason, Jr. et al. | 370/389 |
| 5,982,276 | A | 11/1999 | Stewart | 340/310.01 |
| 5,994,998 | A | 11/1999 | Fisher et al. | 340/310.01 |
| 5,994,999 | A | 11/1999 | Ebersohl | 340/310.01 |
| 6,014,386 | A | 1/2000 | Abraham | 370/485 |
| 6,023,106 | A | 2/2000 | Abraham | 307/3 |
| 6,037,678 | A | 3/2000 | Rickard | 307/89 |
| 6,037,857 | A | 3/2000 | Behrens et al. | 340/310.03 |
| 6,040,759 | A | 3/2000 | Sanderson | 340/310.01 |
| 6,091,932 | A | 7/2000 | Langlais | 455/5.1 |
| 6,104,707 | A | 8/2000 | Abraham | 370/295 |
| 6,121,765 | A | 9/2000 | Carlson | 323/359 |
| 6,130,896 | A | 10/2000 | Lueker et al. | 370/469 |
| 6,140,911 | A | 10/2000 | Fisher et al. | 340/310.01 |
| 6,141,634 | A | 10/2000 | Flint et al. | 703/18 |
| 6,144,292 | A | 11/2000 | Brown | 340/310.02 |
| 6,151,330 | A | 11/2000 | Liberman | 370/449 |
| 6,151,480 | A | 11/2000 | Fischer et al. | 340/310.01 |
| 6,154,488 | A * | 11/2000 | Hunt | 375/219 |
| 6,157,292 | A | 12/2000 | Piercy et al. | 340/310.01 |
| 6,172,597 | B1 | 1/2001 | Brown | 340/310.02 |
| 6,175,860 | B1 | 1/2001 | Gaucher | 709/208 |
| 6,177,849 | B1 | 1/2001 | Barsellotti et al. | 333/177 |
| 6,212,658 | B1 | 4/2001 | Le Van Suu | 714/749 |
| 6,226,166 | B1 | 5/2001 | Gumley et al. | 361/118 |
| 6,229,434 | B1 | 5/2001 | Knapp et al. | 340/310.01 |
| 6,239,722 | B1 | 5/2001 | Colton et al. | 340/870.02 |
| 6,243,413 | B1 * | 6/2001 | Beukema | 375/222 |
| 6,243,571 | B1 | 6/2001 | Bullock et al. | 455/402 |
| 6,255,805 | B1 | 7/2001 | Papalia et al. | 323/207 |
| 6,255,935 | B1 | 7/2001 | Lehmann et al. | 340/310.07 |
| 6,275,144 | B1 | 8/2001 | Rumbaugh | 340/310.01 |
| 6,282,405 | B1 | 8/2001 | Brown | 725/79 |
| 6,297,729 | B1 | 10/2001 | Abali et al. | 340/310.01 |
| 6,297,730 | B1 | 10/2001 | Dickinson | 340/310.01 |
| 6,300,881 | B1 | 10/2001 | Yee et al. | 340/870.02 |
| 6,313,738 | B1 | 11/2001 | Wynn | 340/310.03 |
| 6,317,031 | B1 | 11/2001 | Rickard | 340/310.03 |
| 6,331,814 | B1 | 12/2001 | Albano et al. | 340/310.01 |
| 6,335,672 | B1 | 1/2002 | Tumlin et al. | 336/175 |
| 6,373,376 | B1 | 4/2002 | Adams et al. | 340/310.01 |
| 6,384,580 | B1 | 5/2002 | Ochoa et al. | 323/207 |
| 6,396,391 | B1 | 5/2002 | Binder | 340/310.01 |
| 6,396,392 | B1 | 5/2002 | Abraham | 340/310.01 |
| 6,404,773 | B1 | 6/2002 | Williams et al. | 370/463 |
| 6,407,987 | B1 | 6/2002 | Abraham | 370/295 |
| 6,414,578 | B1 | 7/2002 | Jitaru | 336/170 |
| 6,417,762 | B1 | 7/2002 | Comer | 340/310.01 |
| 6,425,852 | B1 | 7/2002 | Epstein et al. | 600/13 |
| 6,441,723 | B1 | 8/2002 | Mansfield, Jr. et al. | 340/310.01 |
| 6,449,318 | B1 | 9/2002 | Rumbaugh | 375/309 |
| 6,452,482 | B1 | 9/2002 | Cern | 340/310.01 |
| 6,480,510 | B1 | 11/2002 | Binder | 370/502 |
| 6,486,747 | B1 | 11/2002 | DeCramer et al. | 333/25 |
| 6,492,897 | B1 | 12/2002 | Mowery, Jr. | 340/310.01 |
| 6,496,104 | B2 | 12/2002 | Kline | 340/310.01 |
| 6,504,357 | B1 | 1/2003 | Hemminger et al. | 340/310.01 |
| 6,507,573 | B1 | 1/2003 | Brandt et al. | 370/335 |
| 6,515,485 | B1 | 2/2003 | Bullock et al. | 324/601 |
| 6,522,626 | B1 | 2/2003 | Greenwood | 370/208 |
| 6,522,650 | B1 | 2/2003 | Yonge, III et al. | 370/390 |
| 6,549,120 | B1 | 4/2003 | deBuda | 340/310.01 |
| 6,577,231 | B2 | 6/2003 | Litwin, Jr. et al. | 340/310.01 |
| 6,590,493 | B1 | 7/2003 | Rasimas | 340/310.01 |
| 6,611,134 | B2 | 8/2003 | Chung | 324/74 |
| 6,624,532 | B1 | 9/2003 | Davidow et al. | 307/39 |
| 6,646,447 | B2 | 11/2003 | Cern et al. | 324/539 |
| 6,650,249 | B2 | 11/2003 | Meyer et al. | 340/870.02 |
| 6,667,685 | B2 | 12/2003 | Wasaki et al. | 340/310.03 |
| 6,668,058 | B2 | 12/2003 | Grimes | 379/322 |
| 6,683,531 | B2 | 1/2004 | Diamanti et al. | 340/310.01 |
| 6,686,832 | B2 | 2/2004 | Abraham | 340/310.01 |
| 6,696,925 | B1 | 2/2004 | Aiello, Jr. | 340/310.01 |
| 6,753,742 | B2 | 6/2004 | Kim et al. | 333/24 R |
| 6,785,532 | B1 | 8/2004 | Rickard | 455/402 |
| 6,785,592 | B1 | 8/2004 | Smith et al. | 700/291 |
| 6,788,745 | B1 | 9/2004 | Lim et al. | 375/297 |
| 6,844,809 | B2 | 1/2005 | Manis et al. | 340/310.02 |
| 6,844,810 | B2 | 1/2005 | Cern | 340/310.07 |
| 6,854,059 | B2 | 2/2005 | Gardner | 380/277 |
| 2001/0038329 | A1 | 11/2001 | Diamanti et al. | 340/310.01 |
| 2001/0038343 | A1 | 11/2001 | Meyer et al. | 340/870.02 |
| 2001/0045888 | A1 | 11/2001 | Kline | 340/310.01 |
| 2001/0052843 | A1 | 12/2001 | Wiesman et al. | 340/310.01 |
| 2001/0054953 | A1 | 12/2001 | Kline | 340/310.01 |
| 2002/0002040 | A1 | 1/2002 | Kline et al. | 455/402 |
| 2002/0010870 | A1 | 1/2002 | Gardner | 713/300 |
| 2002/0014884 | A1 | 2/2002 | Chung | 324/74 |
| 2002/0027496 | A1 | 3/2002 | Cern | 340/310.01 |
| 2002/0041228 | A1 | 4/2002 | Zhang | 340/310.01 |
| 2002/0048368 | A1 | 4/2002 | Gardner | 380/277 |
| 2002/0060624 | A1 | 5/2002 | Zhang | 340/310.01 |
| 2002/0071452 | A1 | 6/2002 | Abraham | 370/480 |
| 2002/0080010 | A1 | 6/2002 | Zhang | 340/310.06 |
| 2002/0095662 | A1 | 7/2002 | Ashlock et al. | 717/136 |
| 2002/0097953 | A1 | 7/2002 | Kline | 385/24 |
| 2002/0098867 | A1 | 7/2002 | Meiksen et al. | 455/560 |
| 2002/0098868 | A1 | 7/2002 | Meiksen et al. | 455/560 |
| 2002/0105413 | A1 | 8/2002 | Cern et al. | 340/310.01 |
| 2002/0109585 | A1 | 8/2002 | Sanderson | 340/310.01 |
| 2002/0110310 | A1 | 8/2002 | Kline | 385/15 |
| 2002/0110311 | A1 | 8/2002 | Kline | 385/15 |
| 2002/0118101 | A1 | 8/2002 | Kline | 340/310.01 |
| 2002/0121963 | A1 | 9/2002 | Kline | 340/310.01 |
| 2002/0140547 | A1 | 10/2002 | Litwin, Jr. et al. | 340/310.01 |
| 2002/0154000 | A1 | 10/2002 | Kline | 340/310.01 |
| 2002/0171535 | A1 | 11/2002 | Cern | 340/310.07 |
| 2003/0007570 | A1 | 1/2003 | Kim et al. | 375/303 |
| 2003/0007576 | A1 | 1/2003 | Alavi et al. | 375/329 |
| 2003/0062990 | A1 | 4/2003 | Schaeffer, Jr. et al. | 340/310.01 |
| 2003/0067910 | A1 | 4/2003 | Razazian et al. | 370/352 |
| 2003/0090368 | A1 | 5/2003 | Ide | 340/310.06 |
| 2003/0103307 | A1 | 6/2003 | Dostert | 361/113 |
| 2003/0107477 | A1 | 6/2003 | Ide | 340/310.01 |
| 2003/0129978 | A1 | 7/2003 | Akiyama et al. | 455/426.1 |
| 2003/0149784 | A1 | 8/2003 | Ide | 709/231 |
| 2003/0160684 | A1 | 8/2003 | Cern | 340/310.01 |
| 2003/0169155 | A1 | 9/2003 | Mollenkopf et al. | 310/310.01 |
| 2003/0179080 | A1 | 9/2003 | Mollenkopf et al. | 340/310.01 |
| 2003/0184433 | A1 | 10/2003 | Zalitzky et al. | 340/310.06 |

| | | | |
|---|---|---|---|
| 2003/0185237 A1 * | 10/2003 | Baker, Jr. | 370/469 |
| 2003/0201759 A1 | 10/2003 | Cern | 323/247 |
| 2003/0201873 A1 | 10/2003 | Cern | 340/310.07 |
| 2003/0210135 A1 | 11/2003 | Cern | 340/310.07 |
| 2003/0210734 A1 | 11/2003 | Kaku | 375/148 |
| 2003/0222747 A1 | 12/2003 | Perkinson et al. | 336/178 |
| 2003/0222748 A1 | 12/2003 | Cern et al. | 336/178 |
| 2003/0224784 A1 | 12/2003 | Hunt et al. | 455/426.2 |
| 2003/0227373 A1 * | 12/2003 | Lou et al. | 340/310.01 |
| 2003/0232599 A1 | 12/2003 | Dostert | 455/66.1 |
| 2003/0234713 A1 | 12/2003 | Pridmore, Jr. et al. | 336/82 |
| 2004/0001438 A1 | 1/2004 | Aretz | 370/232 |
| 2004/0001499 A1 | 1/2004 | Patella et al. | 370/412 |
| 2004/0003934 A1 | 1/2004 | Cope | 174/36 |
| 2004/0022304 A1 | 2/2004 | Santhoff et al. | 375/219 |
| 2004/0032320 A1 | 2/2004 | Zalitzky et al. | 340/310.01 |
| 2004/0037317 A1 | 2/2004 | Zalitzky et al. | 370/466 |
| 2004/0047335 A1 | 3/2004 | Proctor et al. | 370/351 |
| 2004/0054425 A1 | 3/2004 | Elmore | 700/1 |
| 2004/0056734 A1 | 3/2004 | Davidow | 333/100 |
| 2004/0064782 A1 | 4/2004 | Lerner et al. | 714/800 |
| 2004/0067745 A1 | 4/2004 | Belsak | 455/402 |
| 2004/0070912 A1 | 4/2004 | Kopp | 361/119 |
| 2004/0083066 A1 | 4/2004 | Hayes et al. | 702/62 |
| 2004/0113756 A1 | 6/2004 | Mollenkopf | 340/310.01 |
| 2004/0135676 A1 | 7/2004 | Berkman et al. | 340/310.01 |
| 2004/0142599 A1 | 7/2004 | Cope et al. | 439/620 |
| 2004/0174851 A1 | 9/2004 | Zalitzky et al. | 370/338 |
| 2004/0223617 A1 | 11/2004 | Corcoran et al. | 380/266 |
| 2004/0227621 A1 | 11/2004 | Cope et al. | 340/310.01 |
| 2004/0227622 A1 | 11/2004 | Giannini et al. | 340/310.01 |
| 2004/0242185 A1 | 12/2004 | Lee | 455/402 |

FOREIGN PATENT DOCUMENTS

| | | |
|---|---|---|
| DE | 100 08 602 A1 | 6/2001 |
| DE | 100 12 235 C2 | 12/2001 |
| DE | 100 47 648 A1 | 4/2002 |
| DE | 100 61 584 A1 | 6/2002 |
| DE | 100 61 586 A1 | 6/2002 |
| DE | 101 00 181 A1 | 7/2002 |
| DE | 101 03 530 A1 | 8/2002 |
| DE | 100 59 564 A1 | 9/2002 |
| DE | 100 48 348 C2 | 11/2002 |
| DE | 101 190 039 A1 | 12/2002 |
| DE | 101 190 040 A1 | 12/2002 |
| DE | 100 26 930 C2 | 1/2003 |
| DE | 100 26 931 C2 | 1/2003 |
| DE | 100 42 958 C2 | 1/2003 |
| DE | 101 47 918 A1 | 4/2003 |
| DE | 101 47 916 C1 | 5/2003 |
| DE | 101 46 982 C1 | 6/2003 |
| DE | 101 47 915 C1 | 6/2003 |
| DE | 101 47 913 C1 | 7/2003 |
| EP | 0 141 673 A2 | 5/1985 |
| EP | 0 581 351 A1 | 2/1994 |
| EP | 0 632 602 A2 | 1/1995 |
| EP | 0 632 602 A3 | 1/1995 |
| EP | 0 470 185 B1 | 11/1995 |
| EP | 0 822 721 A2 | 2/1998 |
| EP | 0 822 721 A3 | 2/1998 |
| EP | 0 913 955 A2 | 5/1999 |
| EP | 0 933 883 A2 | 8/1999 |
| EP | 0 933 883 A3 | 8/1999 |
| EP | 0 948 143 A2 | 10/1999 |
| EP | 0 959 569 A1 | 11/1999 |
| EP | 1 011 235 A2 | 6/2000 |
| EP | 1 014 640 A2 | 6/2000 |
| EP | 1 043 866 A2 | 10/2000 |
| EP | 1 043 866 A3 | 10/2000 |
| EP | 1 075 091 A1 | 2/2001 |
| EP | 0 916 194 B1 | 9/2001 |
| EP | 1 011 235 A3 | 5/2002 |
| EP | 1 213 849 A1 | 6/2002 |
| EP | 1 217 760 A1 | 6/2002 |
| EP | 1 014 640 A3 | 7/2002 |
| EP | 1 021 866 B1 | 10/2002 |
| EP | 1 251 646 A2 | 10/2002 |
| EP | 1 253 699 A2 | 10/2002 |
| ES | 2 122 920 A1 | 12/1998 |
| FR | 2 326 087 | 7/1976 |
| GB | 1 548 652 | 7/1979 |
| GB | 2 101 857 A | 1/1983 |
| GB | 2 293 950 A | 4/1996 |
| GB | 2 315 937 A | 2/1998 |
| GB | 2 331 683 A | 5/1999 |
| GB | 2 335 335 A | 9/1999 |
| GB | 2 341 776 A | 3/2000 |
| GB | 2 342 264 A | 4/2000 |
| GB | 2 347 601 A | 9/2000 |
| JP | 1276933 | 11/1989 |
| NZ | 276741 | 7/1998 |
| WO | 84/01481 A1 | 4/1984 |
| WO | 90/13950 A2 | 11/1990 |
| WO | 92/16920 A1 | 10/1992 |
| WO | 93/07693 A1 | 4/1993 |
| WO | 95/29536 A1 | 11/1995 |
| WO | 98/01905 A1 | 1/1998 |
| WO | 98/33258 A2 | 7/1998 |
| WO | 98/33258 A3 | 7/1998 |
| WO | 98/40980 A1 | 9/1998 |
| WO | 99/59261 A1 | 11/1999 |
| WO | 00/16496 A2 | 3/2000 |
| WO | 00/59076 A1 | 10/2000 |
| WO | 00/60701 A1 | 10/2000 |
| WO | 00/60822 A1 | 10/2000 |
| WO | 01/08321 A1 | 2/2001 |
| WO | 01/43305 A1 | 6/2001 |
| WO | 01/50625 A2 | 7/2001 |
| WO | 01/50625 A3 | 7/2001 |
| WO | 01/50628 A1 | 7/2001 |
| WO | 01/50629 A1 | 7/2001 |
| WO | 01/63787 A1 | 8/2001 |
| WO | 01/82497 A1 | 11/2001 |
| WO | 02/17509 A1 | 2/2002 |
| WO | 02/37712 A1 | 5/2002 |
| WO | 02/054605 A1 | 7/2002 |
| WO | 02/065684 A2 | 8/2002 |
| WO | 02/065684 A3 | 8/2002 |
| WO | 02/089352 A1 | 11/2002 |
| WO | 02/089353 A1 | 11/2002 |
| WO | 03/009083 A2 | 1/2003 |
| WO | 03/009083 A3 | 1/2003 |
| WO | 03/010896 A1 | 2/2003 |
| WO | 03/30396 A2 | 4/2003 |
| WO | 03/034608 A2 | 4/2003 |
| WO | 03/039022 A1 | 5/2003 |
| WO | 03/040732 A2 | 5/2003 |
| WO | 03/056715 A1 | 7/2003 |
| WO | 2004/008656 A1 | 1/2004 |
| WO | 2004/021600 A1 | 3/2004 |

OTHER PUBLICATIONS

Liu, E. et al., "Broadband Characterization of Indoor Powerline Channel," Communications Laboratory, Helsinki University of Technology, Finland [presented at the 2004 International Symposium on PowerLine Communications and its Applications, Zaragoza, Spain. Mar. 31-Apr. 2, 2004] 6 pages.

Patent Abstracts of Japan, Japanese Publication No. 10200544 A2, published Jul. 31, 1998, (Matsushita Electric Works, LTD).

Tohoku Electric Power, Co., Inc., "Tohoku Electric Develops High-Speed Communications System Using Power Distribution Lines,"*Tohoku Currents*, Spring 1998, 8(1), 2 pages (http://www.tohoku-epco.co.jp/profil/kurozu/c_vol8_1/art04.htm).

Power Line Communications Conference entitled, "PLC, A New Competitor in Broadband Internet Access," Dec. 11-12, 2001, Washington, D.C., 60 pages.

Rivkin, S. R., "Co-Evolution of Electric & Telecommunications Networks," *The Electricity Journal*, May 1998, 71-76.

Marketing Assessment Presentation entitled "Powerline Telecommunications," The Shpigler Group for CITI PLT, Jul. 16, 2002, 9 pages.

Campbell, C., presentation entitled "Building a Business Case for PLC: Lessons Learned From the Communication Industry Trenches," KPMG Consulting, Jul. 16, 2002, 5 pages.

"Embedded Power Line Carrier Modem," Archnet Electronic Technology, http://www.archnetco.com/english/product/ATL90.htm, 2001, 3 pages.

"Archnet: Automatic Meter Reading System Power Line Carrier Communication", www.archnetco.com/english/product/product_sl.htm, 3 pages.

"Power Line Communications Solutions", www.echelon.com/products/oem/transceivers/powerline/default.htm, 2 pages.

"Texas Instruments: System Block Diagrams; Power Line Communication (Generic)", http://focus.ti.com/docs/apps/catalog/resources/blockdiagram.jhtml?bdId=638, 1 page.

Feduschak, N.A., "Waiting in the Wings: Is Powerline Technology Ready to Compete with Cable?", Mar. 2001, www.cabletoday.com/ic2/archives/0301/0301powerline.htm, 5 pages.

"Signalling on Low-Voltage Electrical Installations in the Frequency Band 3kHz to 148.5kHz-Part 4: Filters at the Interface of the Indoor and Outdoor Electricity Network", *CLC SC 105A (Secretariat)* May 1992, 62, 1-11.

"Intellon Corporation Test Summary for Transformerless Coupler Study", *Intellon No News Wires*, Dec. 24, 1998, DOT/NHTSA Order No. DTNH22-98-P-07632, pp 1-18.

EMETCON *Automated Distribution System*, ABB Power T & D Company, Inc., Jan. 1990, Raleigh, North Carolina, No B-919A, 14 pages.

"Dedicated Passive Backbone for Power Line Communications", *IBM Technical Disclosure Bulletin*, Jul. 1997, 40(7), 183-185.

Coaxial Feeder Cables [Engineering Notes], *PYE Telecommunications Limited Publication Ref No. TSP507/1*, Jun. 1975, Cambridge, England, 15 pages.

"Centralized Commercial Building Applications with the Lonworks ® PLT-21 Power Line Transceiver", *Lonworks Engineering Bulletin*, Echelon, Apr. 1997, pp 1-22.

Plexeon Logistics, Inc., "Power Line Communications", www.plexeon.com/power.html, 2 pages.

"EMETCON Automated Distribution System: Communications Guide", *Westinghouse ABB Power T & D Company Technical Manual 42-6001A*, Sep. 1989, 55 pages.

Abraham, K.C. et al., "A Novel High-Speed PLC Communication Modem", *IEEE Transactions on Power Delivery*, 1992, 7(4), 1760-1768.

J.M. Barstow., "A Carrier Telephone System for Rural Service", *AIEE Transactions*, 1947, 66, 301-307.

Chang, S.S.L., "Power-Line Carrier", *Fundamentals Handbook of Electrical and Computer Engineering*, vol. II-Communication, Control, Devices and Systems, John Wiley & Sons, 617-627.

Chen, Y-F. et al. "Baseband Transceiver Design of a 128-Kbps Power-Line Modem for Household Applications", *IEEE Transactions on Power Delivery*, 2002, 17(2), 338-344.

Coakley, N.G. et al., "Real-Time Control of a Servosytem Using the Inverter-Fed Power Lines to Communicate Sensor Feedback", *IEEE Transactions on Industrial Electonics*, 1999, 46(2), 360-369.

Esmailian, T. et al., "A Discrete Multitone Power Line Communication System", *Department of Electrical and Computer Engineering*, University of Toronto, Ontario Canada, 2000 IEEE, pp 2953-2956.

Kawamura, A. et al., "Autonomous Decentralized Manufacturing System Using High-speed Network with Inductive Transmission of Data and Power", *IEEE*, 1996, 940-945.

Kilbourne, B. "EEI Electric Perspectives: The Final Connection", www.eei.org/ep/editorial/Jul-01/0701conenct.htm, 7 pages.

Kim, W-O., et al., "A Control Network Architecture Based on EIA-709.1 Protocol for Power Line Data Communications", *IEEE Transactions on Consumer Electronics*, 2002, 48(3), 650-655.

Lim, C.K. et al., "Development of a Test Bed for High-Speed Power Line Communications", School of Electrical and Electronic Engineering, Nanyang Technological University, Singapore, *IEEE*, 2000, 451-456.

Lokken, G. et al., "The Proposed Wisconsin electric Power Company Load Management System Using Power Line Carrier Over Distribution Lines", *1976 National Telecommunications Conference, IEEE*, 1976, 2.2-12.2-3.

Marthe, E. et al., "Indoor Radiated Emission Associated with Power Line Communication Systems", *Swiss Federal Institute of Technology Power Systems Laboratory IEEE*, 2001, 517-520.

Naredo, J.L. et al., "Design of Power Line Carrier Systems on Multitransposed Delta Transmission Lines", *IEEE Transactions on Power Delivery*, 1991, 6(3), 952-958.

Nichols, K., "Build a Pair of Line-Carrier Modems", *CRC Electronics-Radio Electronics*, 1988, 87-91.

Okazaki, H, et al., "A Transmitting, and Receiving Method for CDMA Communications Over Indoor Electrical Power Lines", *IEEE*, 1998, pp VI-522-VI-528.

B. Don Russell, "Communication Alternatives for Distribution Metering and Load Management", *IEEE Transactions on Power Apparatus and Systems*, 1980, vol. PAS-99(4), pp 1448-1455.

Sado, WN. et al., "Personal Communication on Residential Power Lines- Assessment of Channel Parameters", *IEEE*, 532-537.

LONWORKS Engineering Bulletin, "Demand Side Management with LONWORKS® Power Line Transceivers," Dec. 1996, 36 pages.

HomePlug™Powerline Alliance, HomePlug Initial Draft Medium Interface Specification, May 19, 2000, 109 pages.

HomePlug™Powerline Alliance, HomePlug 0.5 Draft Medium Interface Specification, Nov. 28, 2000, 133 pages.

HomePlug™Powerline Alliance, HomePlug Initital Draft Medium Interface Specification, Jul. 27, 2000, 109 pages.

HomePlug™Powerline Alliance, HomePlug 1.01 Specification, Dec. 1, 2001, 139 pages.

Summary of an IEEE Guide for Power-Line Carrier Applications, A Report by the Power System Communications Committee, *IEEE Transactions on Power Apparatus and*

*Systems*, vol. PAS-99, No. 6, Nov./Dec. 1980, pp. 2334-2337.

De Wilde, W. R. et al., "Upwards to a Reliable Bi-Directional Communication Link on the LV Power Supplies for Utility Services: Field Tests in Belgium," pp. 168-172.

Tanaka, M., "Transmission Characteristics of a Power Line Used for Data Communications at High Frequencies," IEEE Transactions on Consumer Electronics, Feb. 1989, vol. 35, No. 1, pp. 37-42.

Hasler, E. F. et al., "Communication Systems Using Bundle Conductor Overhead Power Lines," IEEE Transactions on Power Apparatus and Systems, Mar./Apr. 1975, vol. PAS-94, No. 2, pp. 344-349.

IEEE Guide for Power-Line Carrier Applications, ANSI/IEEE Std 643-1980, © 1980 by The Institute of Electrical and Electronics Engineers, Inc., pp. 1-80.

Hatori, M. et al., "Home Informatization and Standardization of Home Bus," IEEE Transactions on Consumer Electronics, Aug. 1986, vol. CE-32, No. 3, pp. 542-549.

Hunt, J. M. et al., "Electrical Energy Monitoring and Control System for the Home," IEEE Transactions on Consumer Electronics, Aug. 1986, vol. CE-32, No. 3, pp. 578-583.

Gutzwiller, F. W. et al., "Homenet: A Control Network for Consumer Applications," IEEE Transactions on Consumer Electronics, Aug. 1983, vol. CE-29, No. 3, pp. 297-304.

Burrascano, P. et al., "Digital Signal Transmission on Power Line Carrier Channels: An Introduction," IEEE Transactions on Power Delivery, Jan. 1987, vol. PWRD-2, No. 1, pp. 50-56.

Burr, A. G. et al., "Effect of HF Broadcast Interference on PowerLine Telecommunications Above 1 Mhz," © 1998 IEEE, pp. 2870-2875.

Onunga, J. et al., "Distribution Line Communications Using CSMA Access Control with Priority Acknowledgements," IEEE Transactions on Power Delivery, Apr. 1989, vol. 4, No. 2, pp. 878-886.

Tanaka, M., "High Frequency Noise Power Spectrum, Impedance and Transmission Loss of Power Line in Japan on Intrabuilding Power Line Communications," IEEE Transactions on Consumer Electronics, May 1988, vol. 34, No. 2, pp. 321-326.

Meng, H. et al., "A Transmission Line Model for High-Frequency Power Line Communication Channel," © 2002 IEEE, pp. 1290-1295.

Burrascano, P. et al., "Performance Evaluation of Digital Signal Transmission Channels on Coronating Power Lines," © 1988 IEEE, pp. 365-368.

DiClementi, D. A. et al., "Electrical Distribution System Power Line Characterization," © 1996 IEEE, pp. 271-276.

Abraham, K. C. et al., "A Novel High-Speed PLC Communication Modem," IEEE Transactions on Power Delivery, Oct. 1992, vol. 7, No. 4, pp. 1760-1768.

Yoshitoshi, M. et al., "Proposed Interface Specifications for Home Bus," IEEE Transactions on Consumer Electronics, Aug. 1986, vol. CE-32, No. 3, pp. 550-557.

O'Neal, Jr., J. B., "The Residential Power Circuit as a Communication Medium," IEEE Transactions on Consumer Electronics, Aug. 1986, vol. CE-32, No. 3, pp. 567-577.

Dostert, K., "EMC Aspects of High Speed Powerline Communications," Proceedings of the $15^{th}$ International Wroclaw Symposium and Exhibition on Electromagnetic Capability, Jun. 27-30, 2000; Wroclaw, Poland, pp. 98-102.

Piety, R. A., "Intrabuilding Data Transmission Using Power-Line Wiring," Hewlett-Packard Journal, May 1987, pp. 35-40.

"ABB joins Main.net's subsidiary, PPC, as shareholder and strategic partner for Power Line Communications," Mannheim, Germany/Kfar Saba, Israel, Oct. 8th, 2002, 2 pages.

Outlook Conference 2004: Amperion Deployment Overview, Primen Conference, May 7, 2004, 10 pages.

International Search dated Jul. 16, 2001, from PCT/US01/12699.

Written Opinion dated May 15, 2002, from PCT/US01/12699.

International Search Report dated Oct. 22, 2001, from PCT/US01/12291.

International Search Report dated Jun. 5, 2002, from PCT/US01/48064.

International Search Report dated Jun. 24, 2002, from PCT/US02/04310.

International Search Report dated Aug. 7, 2002, from PCT/US02/04300.

Written Opinion dated Mar. 21, 2003, from PCT/US02/04300.

Written Opinion dated Aug. 20, 2003, from PCT/US02/04310.

* cited by examiner

POWER LINE COMMUNICATION SYSTEM AND METHOD OF OPERATING THE SAME

CROSS REFERENCE TO RELATED APPLICATIONS

This application is a continuation of U.S. patent application Ser. No. 10/626,308 filed Jul. 23, 2003, which is herein incorporated by reference. This application is also a continuation-in-part and claims priority under 35 U.S.C. §120 to U.S. patent application Ser. No. 10/315,725 filed Dec. 10, 2002, U.S. patent application Ser. No. 10/319,317 filed Dec. 13, 2002, U.S. patent application Ser. No. 10/436,778 filed May 13, 2003, all of which are incorporated herein by reference.

FIELD OF THE INVENTION

The present invention generally relates to data communications over a power distribution system and more particularly, to a device for facilitating communications through power lines and method of using the same.

BACKGROUND OF THE INVENTION

Well-established power distribution systems exist throughout most of the United States, and other countries, which provide power to customers via power lines. With some modification, the infrastructure of the existing power distribution systems can be used to provide data communication in addition to power delivery, thereby forming a power line communication system (PLCS). In other words, existing power lines, that already have been run to many homes and offices, can be used to carry data signals to and from the homes and offices. These data signals are communicated on and off the power lines at various points in the power line communication system, such as, for example, near homes, offices, Internet service providers, and the like.

While the concept may sound simple, there are many challenges to overcome in order to use power lines for data communication. Overhead power lines are not designed to provide high speed data communications and are very susceptible to interference. Additionally, federal regulations limit the amount of radiated energy of a power line communication system, which therefore limits the strength of the data signal that can be injected onto power lines (especially overhead power lines).

Power distribution systems include numerous sections, which transmit power at different voltages. The transition from one section to another typically is accomplished with a transformer. The sections of the power distribution system that are connected to the customers premises typically are low voltage (LV) sections having a voltage between 100 volts(V) and 240 V, depending on the system. In the United States, the LV section typically is about 120 V. The sections of the power distribution system that provide the power to the LV sections are referred to as the medium voltage (MV) sections. The voltage of the MV section is in the range of 1,000 V to 100,000 V. The transition from the MV section to the LV section of the power distribution system typically is accomplished with a distribution transformer, which converts the higher voltage of the MV section to the lower voltage of the LV section.

Power system transformers are one obstacle to using power distribution lines for data communication. Transformers act as a low-pass filter, passing the low frequency signals (e.g., the 50 or 60 Hz) power signals and impeding the high frequency signals (e.g., frequencies typically used for data communication). As such, power line communication systems face the challenge of communicating the data signals around, or through, the distribution transformers.

Furthermore, up to ten (and sometimes more) customer premises will typically receive power from one distribution transformer via their respective LV power lines. However, all of the customer premises LV power lines typically are electrically connected at the transformer. Consequently, a power line communications system must be able to tolerate the interference produced by many customers. In addition, the power line communication system should provide bus arbitration and router functions for numerous customers who share a LV connection (i.e., the customer premises LV power lines that are all electrically connected to the LV power line extending from the LV side of the transformer) and a MV power line.

In addition, components of the power line communication system, such as the distribution transformer bypass device (BD), must electrically isolate the MV power signal from the LV power lines and the customer premises. In addition, a communication device of the system should be designed to facilitate bi-directional communication and to be installed without disrupting power to customers. These and other advantages are provided by various embodiments of the present invention.

SUMMARY OF THE INVENTION

The present invention provides a system for operating a power line communications system that is comprised of a plurality of network elements, which may take the form of repeaters, bypass devices, backhaul devices, wireless backhaul devices, enhanced bypass device, communication interface devices and others. In one embodiment, two groups of network elements in the same electrical distribution system are isolated except selected communication link.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

System Architecture and General Design Concepts

Figure 1:
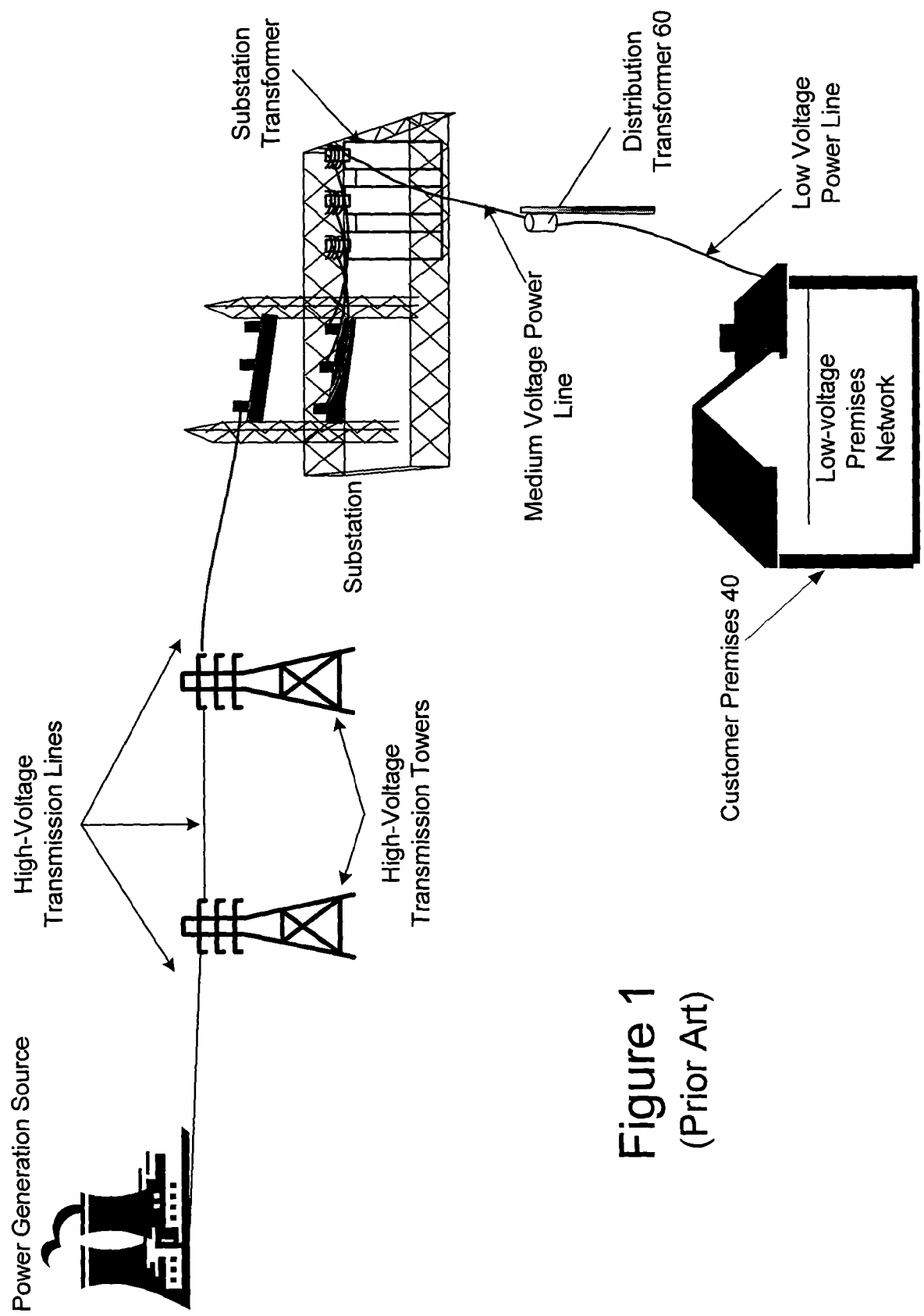
FIG. 1 is a diagram of an exemplary power distribution system with which the present invention may be employed.

As shown in FIG. 1, power distribution systems typically include components for power generation, power transmission, and power delivery. A transmission substation typically is used to increase the voltage from the power generation source to high voltage (HV) levels for long distance transmission on HV transmission lines to a substation. Typical voltages found on HV transmission lines range from 69 kilovolts (kV) to in excess of 800 kV.

In addition to HV transmission lines, power distribution systems include MV power lines and LV power lines. As discussed, MV typically ranges from about 1000 V to about 100 kV and LV typically ranges from about 100 V to about 240 V. Transformers are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Such transformers are often referred to as distribution transformers or a step down transformers, because they "step down" the voltage to some lower voltage. Transformers, therefore, provide voltage conversion for the power distribution system. Thus, power is carried from substation transformer to a distribution transformer over one or more MV power lines. Power is carried from the distribution transformer to the customer premises via one or more LV power lines.

In addition, a distribution transformer may function to distribute one, two, three, or more phase currents to the customer premises, depending upon the demands of the user. In the United States, for example, these local distribution transformers typically feed anywhere from one to ten homes, depending upon the concentration of the customer premises in a particular area. Distribution transformers may be pole-top transformers located on a utility pole, pad-mounted transformers located on the ground, or transformers located under ground level.

The communication device of the present invention may form part of a PLCS to communicate signals to and from communication devices at the customer premises through the LV power line. In addition, the communication device of the present invention may facilitate the communication of data signals along the MV power line with 1) other power line communication devices; 2) one or more backhaul points; 3) one or more power line servers; and/or 4) devices on a network such as the Internet.

Power Line Communication System

Figure 2:
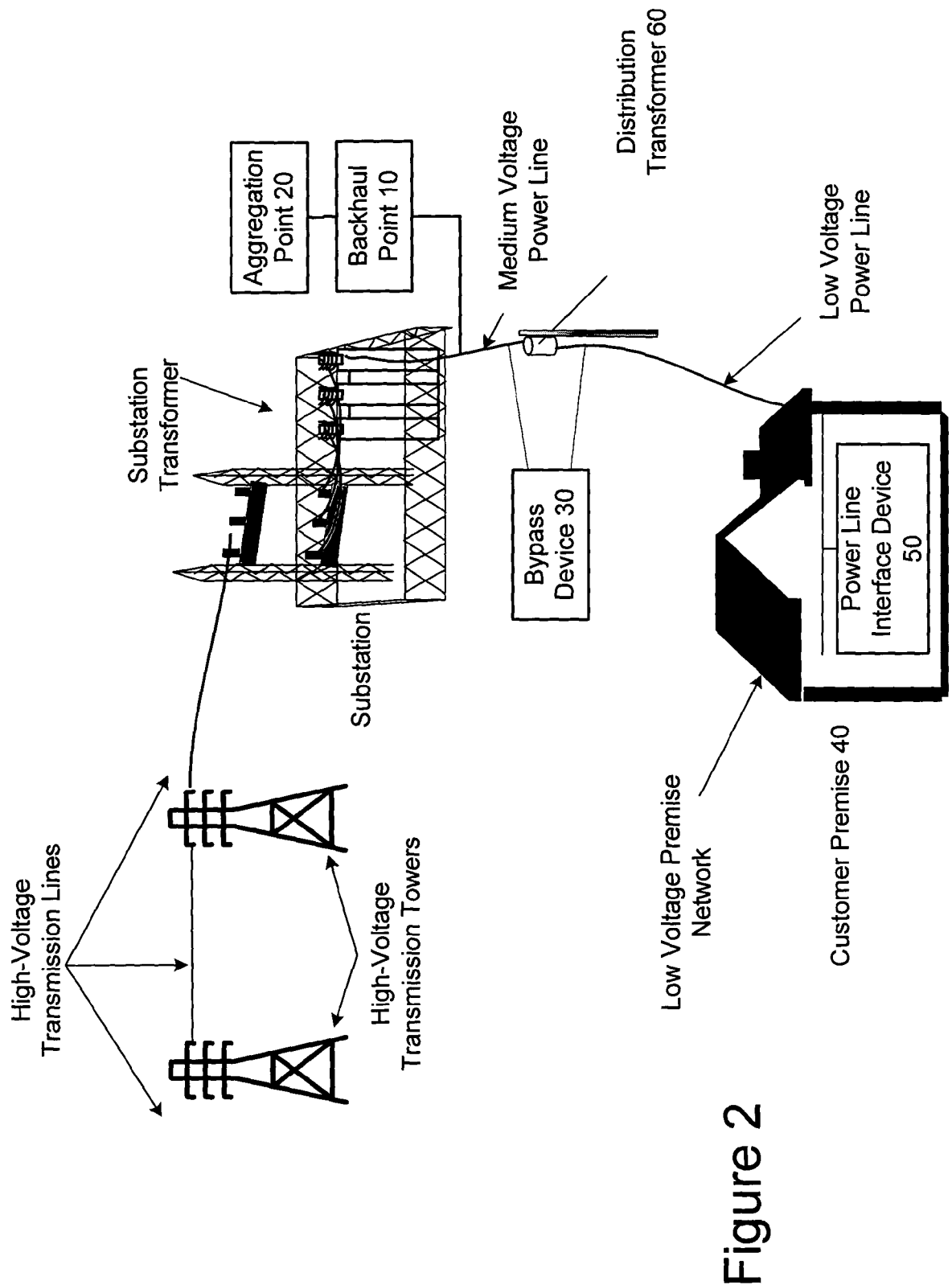
FIG. 2 is a diagram of the exemplary power distribution system of FIG. 1 modified to operate as a power line communication system, in accordance with an embodiment of the present invention.

One example of such a PLCS is shown in FIG. 2 and includes one or more bypass devices 100, which may be formed by an embodiment of the present invention. In this example, the present invention is embodied as a bypass device 100 to communicate data signals around the distribution transformer that would otherwise filter such data signals, preventing them from passing through the transformer. Thus, the communication device in this embodiment is a BD 100 that is the gateway between the LV power line subnet (i.e., the devices that are communicatively coupled to the LV power lines) and the MV power line.

In this embodiment, the BD the provides communication services for the user, which may include security management, routing of Internet protocol (IP) packets, filtering data, access control, service level monitoring, signal processing and modulation/demodulation of signals transmitted over the power lines.

This example PLCS also includes a backhaul point 10, which may also be an alternate embodiment of the present invention. The backhaul point 10 is an interface and gateway between a PLCS and a traditional non-power line telecommunication network. One or more backhaul points 10 are communicatively coupled to an aggregation point (AP) 20 that in many embodiments may be the point of presence to the Internet. The backhaul point 10 may be connected to the AP 20 using any available mechanism, including fiber optic conductors, T-carrier, Synchronous Optical Network (SONET), or wireless techniques well known to those skilled in the art. Thus, the backhaul point 10 may include a transceiver suited for communicating through the communication medium.

The AP 20 may include a conventional Internet Protocol (IP) data packet router and may be directly connected to an Internet backbone thereby providing access to the Internet. Alternatively, the AP 20 may be connected to a core router (not shown), which provides access to the Internet, or other communication network. Depending on the configuration of the PLCS, a plurality of APs 20 may be connected to a single core router which provides Internet access. The core router (or AP 20 as the case may be) may route voice traffic to and from a voice service provider and route Internet traffic to and from an Internet service provider. The routing of packets to the appropriate provider may be determined by any suitable means such as by including information in the data packets to determine whether a packet is voice. If the packet is voice, the packet may be routed to the voice service provider and, if not, the packet may be routed to the Internet service provider. Similarly, the packet may include information (which may be a portion of the address) to determine whether a packet is Internet data. If the packet is Internet data, the packet may be routed to the Internet service provider and, if not, the packet may be routed to the voice service provider.

In some PLCS embodiments, there may a distribution point (not shown) between the backhaul point 10 and the AP 20. The distribution point, which may be a router, may be coupled to a plurality of backhaul points 10 and provides routing functions between its backhaul points 10 and its AP 20. In one example embodiment, a plurality of backhaul points 10 are connected to each distribution point and each distribution point (of which there is a plurality) is coupled to the AP 20, which provides access to the Internet.

The PLCS also may include a power line server (PLS) that is a computer system with memory for storing a database of information about the PLCS and includes a network element manager (NEM) that monitors and controls the PLCS. The PLS allows network operations personnel to provision users and network equipment, manage customer data, and monitor system status, performance and usage. The PLS may reside at a remote operations center to oversee a group of communication devices via the Internet. The PLS may provide an Internet identity to the network devices by assigning the devices (e.g., user devices, BDs 100, (e.g., the LV modems and MV modems of BDs), repeaters 70, backhaul points 10, and AP 20) an IP address and storing the IP address and other device identifying information (e.g., the device's location, address, serial number, etc.) in its memory. In addition, the PLS may approve or deny user devices authorization requests, command status reports and measurements from the BDs, repeaters, and backhaul points, and provide application software upgrades to the communication devices (e.g., BDs, backhaul points, repeaters, and other devices). The PLS, by collecting electric power distribution information and interfacing with utilities' back-end computer systems may provide enhanced distribution services such as automated meter reading, outage detection, load balancing, distribution automation, Volt/Volt-Amp Reactance (Volt/VAr) management, and other similar functions. The PLS also may be connected to one or more APs and/or core routers directly or through the Internet and therefore can communicate with any of the BDs, repeaters, user devices, and backhaul points through the respective AP and/or core router.

At the user end of the PLCS, data flow originates from a user device, which provides the data to a power line interface device (PLID) 50 (sometimes referred to as a power line modem), which is well-known in the art.

Various electrical circuits within the customer's premises distribute power and data signals within the customer premises. The customer draws power on demand by plugging a device into a power outlet. In a similar manner, the customer may plug the PLID 50 into a power outlet to digitally connect user devices to communicate data signals carried by the power wiring. The PLID 50 thus serves as an interface for user devices to access the PLCS. The PLID 50 can have a variety of interfaces for customer data appliances. For example, a PLID 50 can include a RJ-11 Plain Old Telephone Service (POTS) connector, an RS-232 connector, a USB connector, a 10 Base-T connector, RJ-45 connector, and the like. In this manner, a customer can connect a variety of user devices to the PLCS. Further, multiple PLIDs can be plugged into power outlets throughout the customer premises, with each PLID 50 communicating over the same wiring internal to the customer premises.

The user device connected to the PLID 50 may be any device cable of supplying data for transmission (or for receiving such data) including, but not limited to a computer, a telephone, a telephone answering machine, a fax, a digital cable box (e.g., for processing digital audio and video, which may then be supplied to a conventional television and for transmitting requests for video programming), a video game, a stereo, a videophone, a television (which may be a digital television), a video recording device, a home network device, a utility meter, or other device. The PLID 50 transmits the data received form the user device through the customer LV power line to a BD 100 and provides data received from the LV power line to the user device. The PLID 50 may also be integrated with the user device, which may be a computer. In addition, the functions of the PLID may be integrated into a smart utility meter such as a gas meter, electric meter, water meter, or other utility meter to thereby provide automated meter reading (AMR).

The BD 100 typically transmits the data to the backhaul point 10, which, in turn, transmits the data to the AP 20. The AP 20 then transmits the data to the appropriate destination (perhaps via a core router), which may be a network destination (such as an Internet address) in which case the packets are transmitted to, and pass through, numerous routers (herein routers are mean to include both network routers and switches) in order to arrive at the desired destination.

Figure 3:
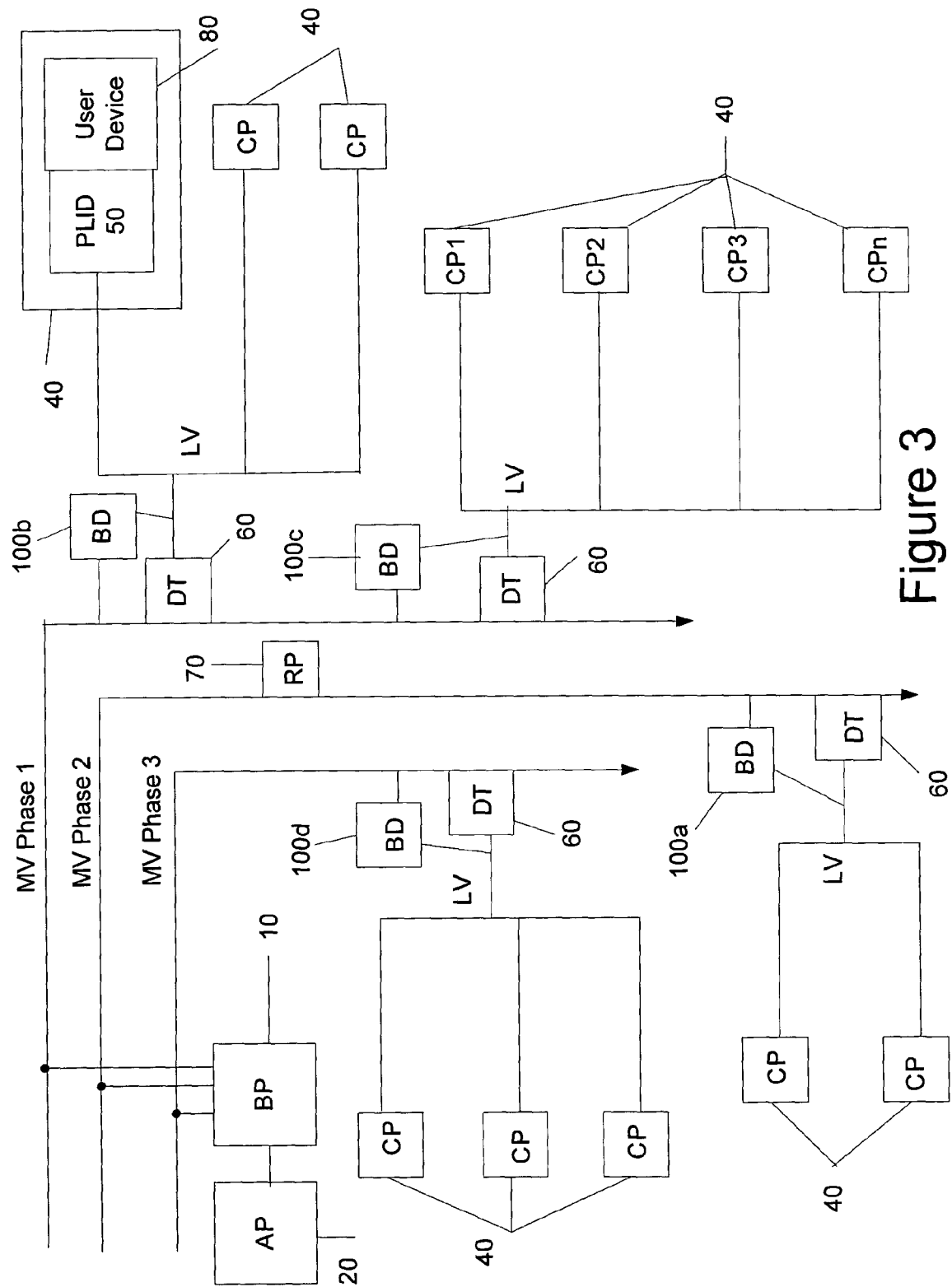
FIG. 3 is a schematic of a power line communication system in accordance with an embodiment of the present invention.

FIG. 3 illustrates a power distribution network topology providing one example of a portion of a PLCS employing the present invention. The power distribution network shown in FIG. 3 includes three MV phase conductors. Each of the three MV phase conductors is connected to one or more distribution transformers 60. Each distribution transformer 60 may include an associated BD 100, although if no users receiving power from the distribution transformer subscribe to the PLCS service, the distribution transformer may not have an associated BD. Each BD 100 is coupled to the MV power line and the LV power line connected to the transformer 60, thereby providing a path for data around the transformer 60. Each customer premises 40 may include one or more PLIDs 50 and one or more user devices 80. Those users who are not subscribers to the communication service may not have a PLID 50 or user device 80 connected to the PLCS. Depending on the power distribution system, there may be ten or more customer premises 40 coupled to a single distribution transformer 60.

If the backhaul point 10 and the BD 100 are too far apart (along the MV power line), noise and interference may prevent reliable communications therebetween. Thus, the PLCS may have a maximum communication distance (MCD) (along the MV line) over which the backhaul point 10 and BD 100 may communicate reliably. However, sometimes a distribution transformer 60 and its BD 100 may be located more than the MCD away from the backhaul point 10.

To overcome this problem, the PLCS may use BDs 100 located along the MV line as a repeater to repeat and/or amplify data. For example, if BD 100c is more than the MCD from the backhaul point 10, BD 100b may repeat (i.e., receive and transmit on the MV line) data received from the backhaul point 10 that is intended for BD 100c (or alternately repeat all data received on the MV line that is not intended for BD 100b or its subnet). Similarly, BD 100b may repeat data received from BD 100c that is intended for backhaul point 10 or alternately repeat all data received on the MV line that is not received from the backhaul point 10 or that is not intended for BD 100b or its LV subnet.

If there are no BDs 100 disposed between the backhaul point 10 and a BD 100 that is out of communication range of the backhaul point 10, it may be necessary to include a repeater therebetween. As shown on phase 2 of the MV line, a repeater 70 is disposed between the backhaul point 10 and BD 100a. While the repeater does not necessarily need not be near a distribution transformer, it may be more practical to install it near a distribution transformer (e.g., attached to the same pole) to allow the repeater to draw power from the LV power line extending from the transformer. Alternatively, the repeater—because it does not need to couple data to the LV power line—may be a self-contained device that couples to the MV line to draw power therefrom and communicate data therewith, thereby alleviating the need to provide electrical isolation from the LV power line. The repeater 70 may function to repeat data in a manner similar to that described above with respect to the BD 100b or may repeat all data received.

The backhaul point 10 of FIG. 3 is shown coupled to each phase of the MV power line. In practice, however, this may not be necessary. In some embodiments, such as those communicating through overhead MV conductors, data signals may couple across the MV conductors. In other words, data signals transmitted on one MV phase conductor may be present on all of the MV phase conductors due to the data coupling between the conductors. As a result, the backhaul point 10 may not need to be physically connected to all three phase conductors of the MV cable and transmission from the backhaul point 10 when coupled to one MV phase conductor will be received by the BDs 100 connected to the other MV phase conductors and vice versa. In some embodiments, however, which may include underground MV cables, it may be desirable to couple the backhaul point 10 to all of the available phase conductors.

Bypass Device Embodiment

The following description is for a communication device of the present invention that is embodied as a BD. In particular, the embodiment described immediately below is a BD for bypassing a pole-mounted transformer. The present invention is equally applicable for use in bypassing other types of transformers (such as pad mount and underground) and in other applications (such as repeaters and backhaul points) with minor modifications that will be evident to those skilled the art. The BD may provide a path for data to bypass the transformer by being coupled to the same MV power line conductor that the transformer is coupled or to a different MV power line conductor and, in either instance, may be coupled to the same LV power lines to which the transformer is coupled.

Figure 4:
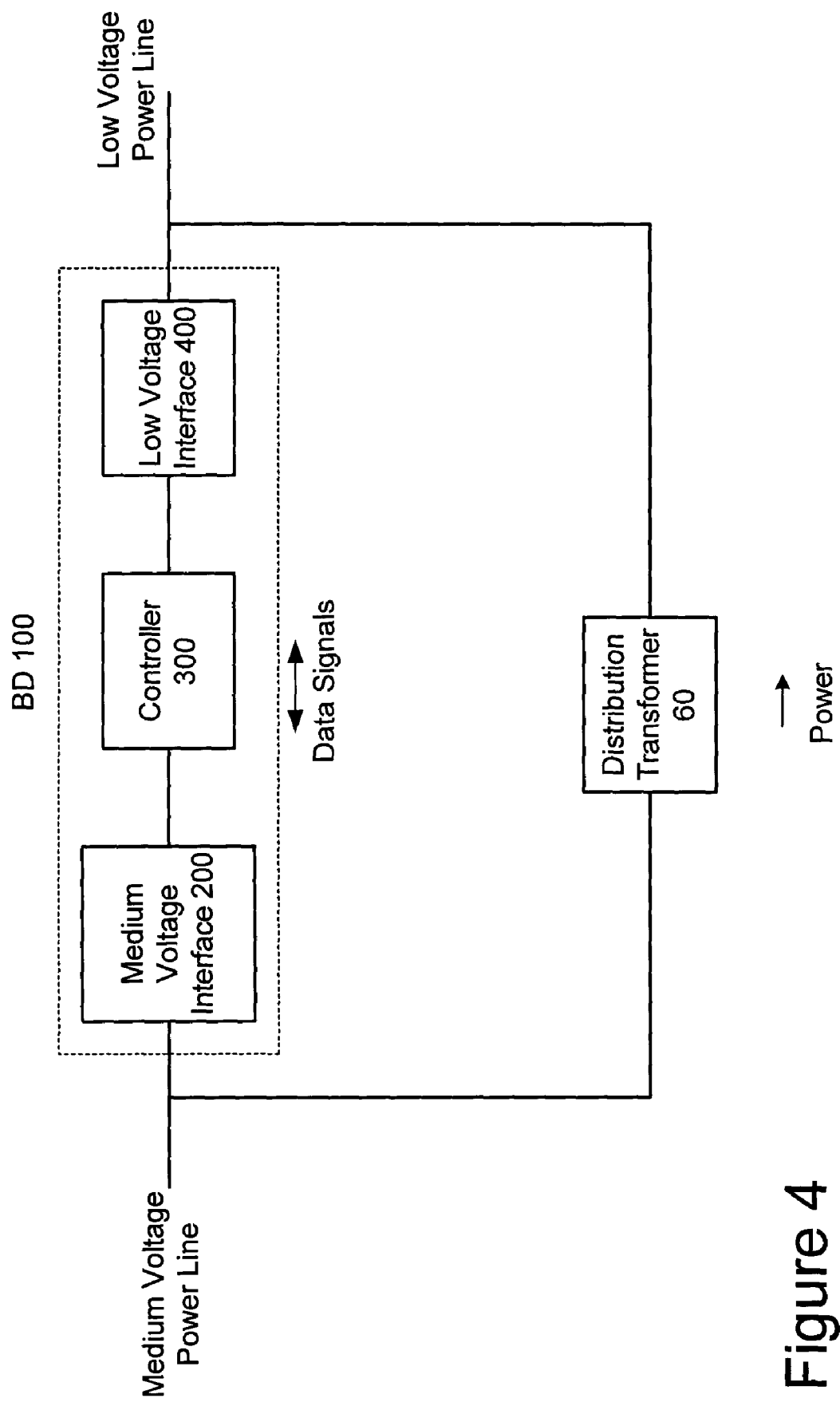
FIG. 4 is a block diagram of a bypass device, in accordance with an embodiment of the present invention.

The BD described herein, which is an example embodiment of the present invention, provides bi-directional communications and includes the functional block diagrams shown in FIG. 4. In particular, in this embodiment of the BD 100 includes a MV power line interface (MVI) 200, a controller 300, and a LV power line interface (LVI) 400. The BD 100 is controlled by a programmable processor and associated peripheral circuitry, which form part of the controller 300. The controller 300 includes memory that stores, among other things, program code, which controls the operation of the processor.

Figure 5:
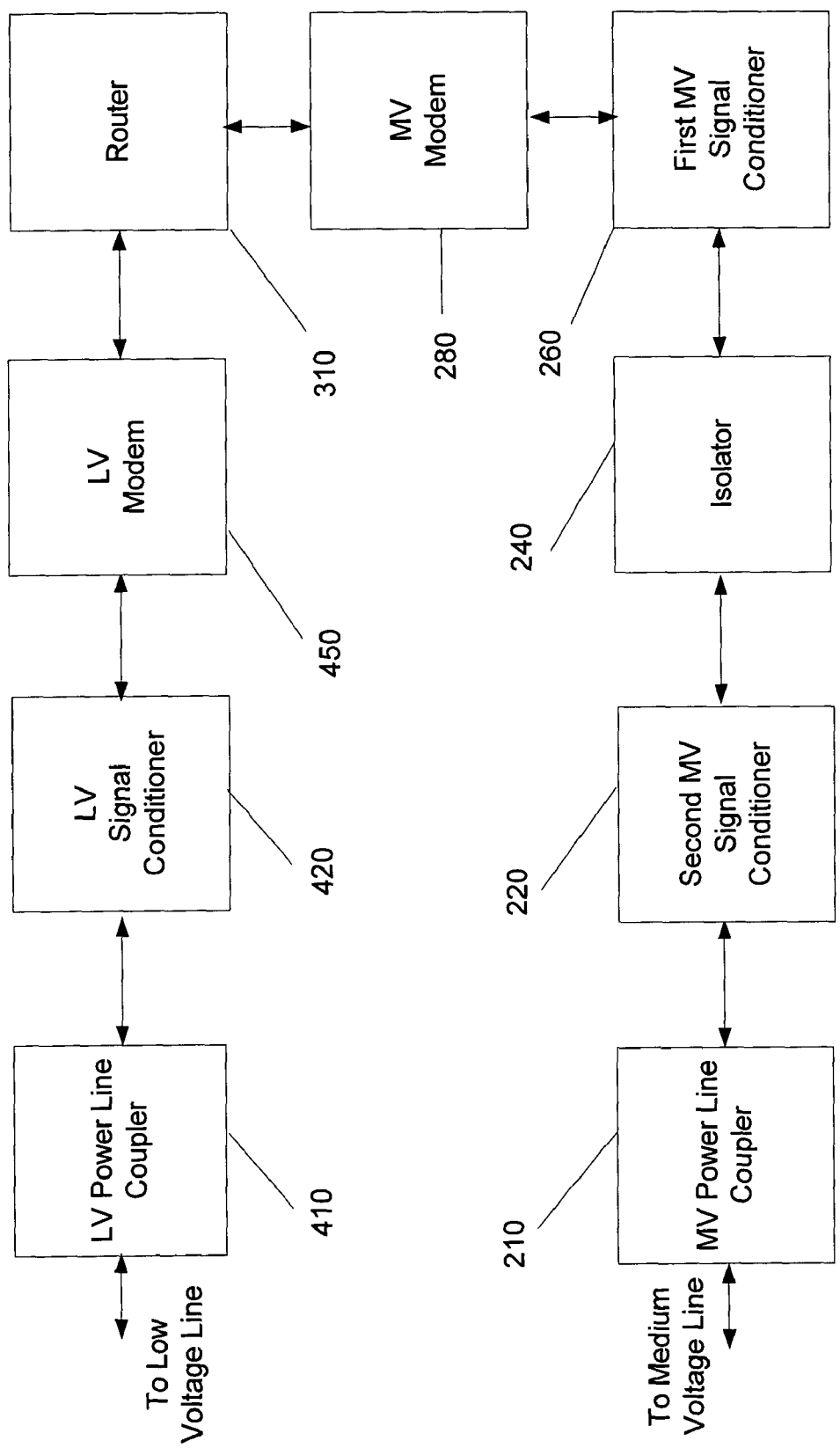
FIG. 5 is a block diagram of a bypass device, in accordance with an embodiment of the present invention.

Referring to FIG. 5, the LVI 400 may include a LV power line coupler 410, a LV signal conditioner 420, and a LV modem 450. The router 310 forms part of the controller 300 and performs routing functions. Router 310 may perform routing functions using layer 3 data (e.g., IP addresses), layer 2 data (e.g., MAC addresses), or a combination of layer 2 and layer 3 data (e.g., a combination of MAC and IP addresses). The MVI 200 may include a MV modem 280, a first MV signal conditioner 260, an isolator 240, a second MV signal conditioner 220, and a power line coupler 210. In addition to routing, the controller 300 may perform other functions including controlling the operation of the LVI 400 and MVI 200 functional components. A more complete description of the controller 300 and its functionality is described below.

As discussed, this embodiment of the present invention provides bi-directional communications around the distribution transformer 60 to thereby provide a first communications path from the LV power line to the MV power line and a second path from the MV power line to the LV power line. For ease of understanding, the processing, and functional components of a communication path from the LV power line to the MV power line (the LV to MV path) will be described first. Subsequently, the processing and functional components of the communication path from the MV power line to the LV power line (the MV to LV path) will be described.

As will be evident to those skilled in the art, the two paths are logical paths. The LV to MV path and the MV to LV path may be separate physical electrical paths at certain functional blocks and may be the same physical path in other functional blocks. However, other embodiments of the present invention may provide for a completely, or substantially complete, separate physical path for the LV to MV and the MV to LV paths.

LV Power Line to MV Power Line Path

In the United States, the LV power line typically includes a neutral conductor and two conductors carrying current ("energized") conductors. In the United States, the two energized conductors typically carry about 120V alternating current (AC) at a frequency of 60 Hz and are 180 degrees out of phase with each other. The present invention is suitable for LV power line cables having conductors that are spaced apart or that are coupled together (e.g., in a twisted pair or via the conductor insulation).

LV Coupler

The LVI 400 includes a LV power line coupler 410 that couples data to and from the LV power line and may include a transducer. The coupler 410 also may couple power from the LV power line, which is used to power at least a portion of the BD 100. In this embodiment, the electronics of much of the BD 100 is housed in an enclosure with first and second BD cables extending from the enclosure. The first BD cable includes a twisted pair of conductors including a signal conductor and neutral conductor. The first conductor of the first BD cable is connected to one of the energized LV conductors extending from the transformer and the second conductor of the first BD cable is connected to the neutral conductor extending from the transformer. In this embodiment, clamping the BD conductors to the LV power line conductors makes the connection.

The second BD cable extending from the enclosure is also a twisted pair comprised of a first and second conductor. The first conductor of the second BD cable is connected to the neutral conductor extending from the transformer and the second conductor of the second BD cable is connected to the second (other) energized LV conductor extending from the transformer.

The third BD cable is a ground conductor that may be connected to an earth ground, which typically is an earth ground conductor that connects the transformer housing to a ground rod. The neutral conductor of the LV power line may also be connected to the earth ground of the power line system (by the electric power company). However, their may be an intrinsic RF impedance between the BD ground conductor connection and the LV neutral conductor connections of the BD (i.e., the second conductor of the first BD cable and the first conductor of the second BD cable). Additionally, it may be desirable to add an RF impedance (e.g., an RF choke) between the connections.

In other embodiments, the LV coupler 410 may include a transducer and may be an inductive coupler such as toroid coupling transformer or a capacitive coupler, for coupling data to and/or from the LV power line and/or for coupling power from the LV power line.

In this embodiment, the signals entering the BD 100 via the first and second BD cables (hereinafter the first signal and second signal respectively) are processed with conventional transient protection circuitry, which is well-known to those skilled in the art. Next, the first signal and second signal are processed with voltage translation circuitry. The data signals in this embodiment, which are in the 4.5 to 21 MHz band, "ride on" (i.e., are additive of) the low frequency power signal (the 120V 60 Hz voltage signal). Consequently, in this embodiment, it is desirable to remove the low frequency power signal, but to keep the data signals for processing, which is accomplished by the voltage translation circuitry. The voltage translation circuitry may include a high pass filter to remove the low frequency power signal and may also (or instead) include other conventional voltage translation circuitry.

Next, the first and second signals may be processed with impedance translation circuitry, which is well-known in the art. In this embodiment, it is desirable to substantially match the impedance of the LV power line. One method of matching the impedance of the LV power line is to separately terminate the BD LV conductors of the first and second BD cables through a termination resistor to ground. The value of the termination resistor may be selected to match the characteristic impedance of the LV power line.

The electronics of the BD 100 that are on the LV side of the isolator 240 may be powered by power received from the LV power line. Thus, this embodiment of the BD 100 includes a power supply for powering much of the BD 100 electronics. The power supply may include its own transient protection circuitry, which may be in addition to, or instead of, the transient protection circuitry that processes the data signals described above. Thus, the power supply may receive power from the BD LV conductor of the first (or second) BD cable after the power signal passes through the transient protection circuitry.

In addition to the power supply, the BD 100 may include a battery backup for operating the BD 100 during power outages. Thus, a backup power system (which may include a battery) may allow the device to detect a power outage and communicate information relating to the outage to the utility company and/or PLS. In practice, information of the outage may be transmitted to the PLS, which communicates the location, time, and/or other information of the outage to the power utility (e.g., the utility's computer system). The backup power system also may allow the BD 100 to communicate certain data packets during a power outage. For example, during an outage, the BD 100 may be programmed to communicate all voice data or only emergency voice transmissions (e.g., phone calls dialed to 911).

The PLS may also determine the location and/or area of a power outage. Periodically, the PLS may ping each (or some subset of) network element. The determination of a power outage may be made by a failure of a network element to respond to the periodic ping (or other command or request) transmitted by the PLS. If the network element has an alternate power source such as a batter backup, the network element may transmit a notification of the power outage (e.g., based on a low voltage measurement by the network element).

Based on the network element(s) serial number(s), the PLS can retrieve the network element's physical location (such as its pole number, which may be mapped to a longitude and latitude and/or street address) from memory to determine the location of the power outage. Thus, by determining that a number of network elements are not responsive, the PLS may map an area without power. Information of the power outage, such as the location(s) time, etc., may then be transmitted to the utility company.

LV Signal Conditioner

Once the LV power line coupler 410 couples the signals (both power and data) from the LV power line, the data signals are provided to the LV signal conditioner 420. In this example embodiment, the BD 100 may either transmit data to, or receive data from, the LV power line at any one instant. From the user's perspective, however, the communications may seem simultaneous because the change in direction of data flow (from transmit to receive and vice versa) is very fast and transmission and reception is contemporaneous over very short periods of time.

FIG. 6 is a block diagram of a portion of a bypass device. The processor of the controller 300 controls a set of switches 426 (e.g., Field-effect Transistor (FET) switches), which when in a first configuration permit reception and when in a second configuration permit transmission thereby providing a fast LV transmit/receive switch 426 for communicating through the LV power lines.

In this embodiment, the LV data signals are in the frequency band of approximately 4.5 to 21 MHz and, as discussed, the data signals "ride on" the low frequency power signal. As a result, even though the two energized LV conductors typically are kept separate electrically, there is significant coupling of data signals between the energized LV conductors at these frequencies. Consequently, a signal sent on one energized LV conductor from the customer premises typically will be present on both energized LV conductors at the BD 100.

The LV power line often does not, however, have a flat frequency response over the frequency band of the data signals, which is especially true for underground power distribution system cables. More specifically, LV power lines sometimes have a greater loss at higher frequencies than at lower frequencies. To compensate for the nonlinearity of the LV power line communication channel, this embodiment of the present invention provides separate, and potentially different, signal processing for the higher frequencies.

Figure 6A:
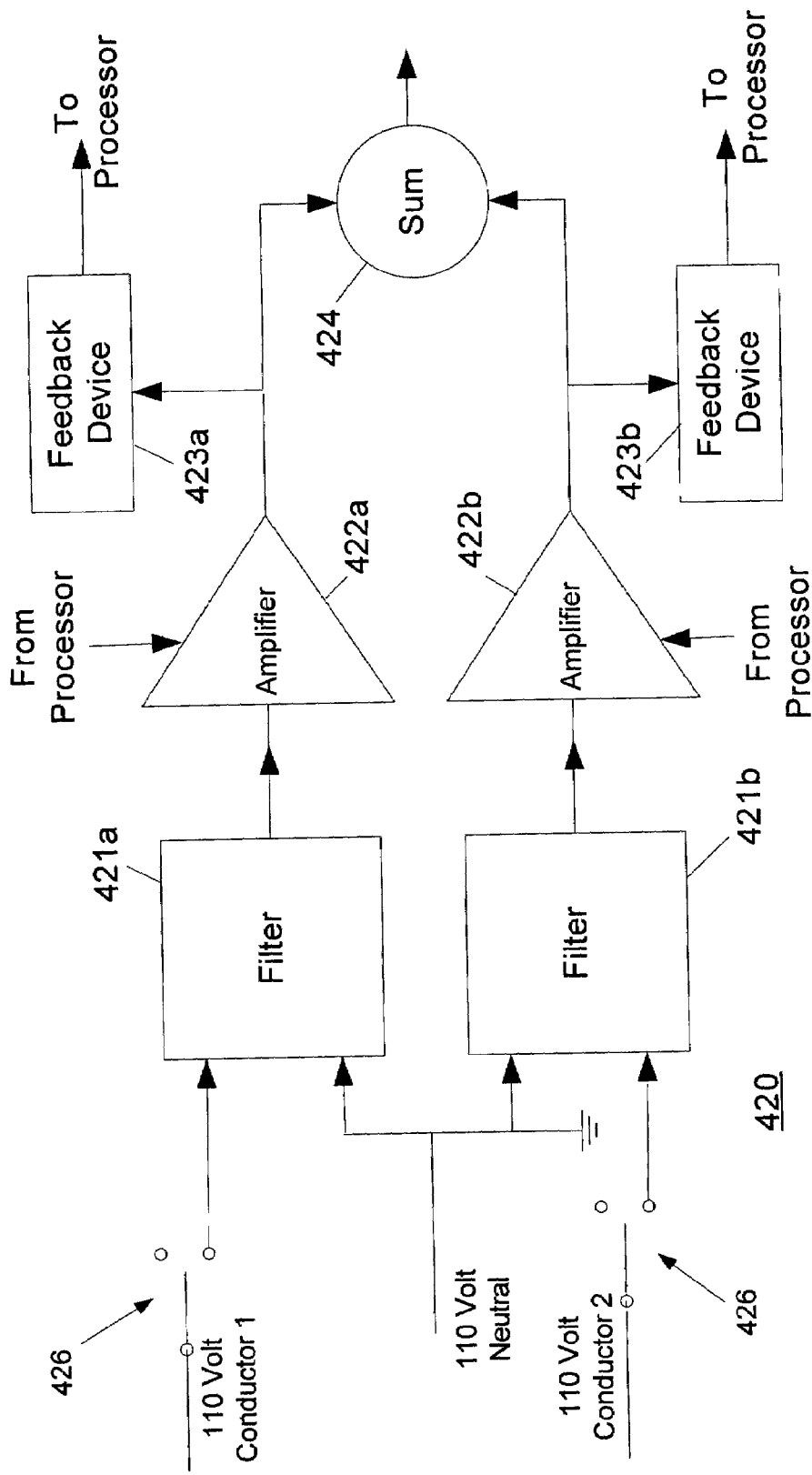
FIGS. 6a–c is a functional block diagram of a portion of a bypass device, in accordance with an embodiment of the present invention.

As shown in FIG. 6a, after passing through the LV transmit/receive switch 426 (which would be in receive mode) the first signal (comprising data signals from the BD LV conductor of the first cable) is supplied to a first filter 421a that has a pass band of approximately 4.0 to 10 MHz. The second signal (comprising data signals from the BD LV conductor of the second BD cable) is supplied to a second filter 421b that has a pass band of approximately 10–21 MHz. Each of these filters 421 provides pass band filtering and may also provide anti-aliasing filtering for their respective frequency bands, and noise filtering.

The outputs of the first and second filters 421a–b are supplied to a first amplifier 422a and second amplifier 422b, respectively. The outputs of the first and second amplifiers 422a–b are coupled to a first feedback device 423a and a second feedback device 423b, respectively. Each feedback device 423 measures the power over time and supplies the power measurement to the controller 300. Based on the power measurement, the controller 300 increases, decreases, or leaves the gain of the associated amplifiers the same to provide automatic gain control (AGC). The outputs of the first and second amplifiers 422 are also supplied to a summation device 424 that sums the two pass band, amplified signals to provide a single data signal.

Thus, the gain of the second amplifier 422b, which receives signals in the 10–21 MHz band, may be greater (or may be dynamically made greater) than the gain of the first amplifier 422a, which receives signals in the 4.5 to 10 MHz band. The higher gain of the second amplifier filter 422b can thus compensate for the greater loss of the transmission channel at the higher frequencies.

In this embodiment, the amplification by the amplifiers 422 is accomplished by amplifying the signal a first predetermined amount, which may be the same or different (e.g., such as proportional to the anticipated loss of the channel) for each amplifier. The amplified signal is then attenuated so that the resultant amplified and subsequently attenuated signal is at the appropriate amplification with respect to the original signal, which may be determined by controller 300 from information received by the feedback devices 423. The feedback device 423 may be implemented with suitable feedback architecture, well-known to those skilled in the art. For example, the feedback devices 423 may use both hardware (such as feedback that may be provided by an analog to digital converter) and software (such as in modifying the reference voltage supplied to an operational amplifier that is implementing amplifier 422).

Other embodiments may not include filtering the inputs of the two BD LV conductors at separate pass bands and separately amplifying the filtered signals. Instead, the signal may be filtered and amplified across the entire LV power line communication pass band (e.g., from 4.5 to 21 MHz). Similarly, while this embodiment divides the LV power line communication channel into two bands (for filtering, amplifying and summing), other embodiments may similarly divide the LV power line communication channel into three, four, five or more bands (for filtering, amplifying and summing).

LV Modem

The output of the summing device of the LV signal conditioner 420 is supplied to the LV modem 450, which includes a modulator and demodulator. The LV modem 450 also may include one or more additional functional submodules such as an Analog-to-Digital Converter (ADC), Digital-to-Analog Converter (DAC), a memory, source encoder/decoder, error encoder/decoder, channel encoder/decoder, MAC (Media Access Control) controller, encryption module, and decryption module. These functional submodules may be omitted in some embodiments, may be integrated into a modem integrated circuit (chip or chip set), or may be peripheral to a modem chip. In the present example embodiment, the LV modem 450 is formed, at least in part, by part number INT5130, which is an integrated power line transceiver circuit incorporating most of the above-identified submodules, and which is manufactured by Intellon, Inc. of Ocala, Fla.

The incoming signal from the summation device 424 is supplied to the ADC to convert the incoming analog signal to a digital signal. The digital signal is then demodulated. The LV modem 450 then provides decryption, source decoding, error decoding, channel decoding, and media access control (MAC) all of which are known in the art and, therefore, not explained in detail here.

With respect to MAC, however, the LV modem 450 may examine information in the packet to determine whether the packet should be ignored or passed to the router 310. For example, the modem 450 may compare the destination MAC address of the packet with the MAC address of the LV modem 450 (which is stored in the memory of the LV modem 450). If there is a match, the LV modem 450 removes the MAC header of the packet and passes the packet to the router 310. If there is not a match, the packet may be ignored.

Router

The data packet from the LV modem 450 may be supplied to the router 310, which forms part of the controller 300. The router 310 performs prioritization, filtering, packet routing, access control, and encryption. The router 310 of this example embodiment of the present invention uses a table (e.g., a routing table) and programmed routing rules stored in memory to determine the next destination of a data packet. The table is a collection of information and may include information relating to which interface (e.g., LVI 400 or MVI 200) leads to particular groups of addresses (such as the addresses of the user devices connected to the customer LV power lines), priorities for connections to be used, and rules for handling both routine and special cases of traffic (such as voice packets and/or control packets).

The router 310 will detect routing information, such as the destination address (e.g., the destination IP address) and/or other packet information (such as information identifying the packet as voice data), and match that routing information with rules (e.g., address rules) in the table. The rules may indicate that packets in a particular group of addresses should be transmitted in a specific direction such as through the LV power line (e.g., if the packet was received from the MV power line and the destination IP address corresponds to a user device connected to the LV power line), repeated on the MV line (e.g., if the BD 100 is acting as a repeater), or be ignored (e.g., if the address does not correspond to a user device connected to the LV power line or to the BD 100 itself).

As an example, the table may include information such as the IP addresses (and potentially the MAC addresses) of the user devices on the BD's LV subnet, the MAC addresses of the PLIDs 50 on the BD's LV subnet, the MV subnet mask (which may include the MAC address and/or IP address of the BD's backhaul point 10), and the IP address of the LV modem 450 and MV modem 280. Based on the destination IP address of the packet (e.g., an IP address), the router may pass the packet to the MV modem 280 for transmission on the MV power line. Alternately, if the IP destination address of the packet matches the IP address of the BD 100, the BD 100 may process the packet as a request for data.

In other instances, such as if the user device is not provisioned and registered, the router may prevent packets from being transmitted to any destination other than a DNS server or registration server. In addition, if the user device is not registered, the router 310 may replace any request for a web page received from that user device with a request for a web page on the registration server (the address of which is stored in the memory of the router).

The router 310 may also prioritize transmission of packets. For example, data packets determined to be voice packets may be given higher priority for transmission through the BD than data packets so as to reduce delays and improve the voice connection experienced by the user. Routing and/or prioritization may be based on IP addresses, MAC addresses, subscription level, or a combination thereof (e.g., the MAC address of the PLID or IP address of the user device).

MV Modem

Similar to the LV modem 450, the MV modem 280 receives data from the router 310 and includes a modulator and demodulator. In addition, the MV modem 280 also may include one or more additional functional submodules such as an ADC, DAC, memory, source encoder/decoder, error encoder/decoder, channel encoder/decoder, MAC controller, encryption module, and decryption module. These functional submodules may be omitted in some embodiments, may be integrated into a modem integrated circuit (chip or chip set), or may be peripheral to a modem chip. In the present example embodiment, the MV modem 280 is formed, at least in part, by part number INT5130, which is an integrated power line transceiver circuit incorporating most of the identified submodules and which is manufactured by Intellon, Inc. of Ocala, Fla.

The incoming signal from the router 310 (or controller) is supplied to the MV modem 280, which provides MAC processing, for example, by adding a MAC header that includes the MAC address of the MV modem 280 as the source address and the MAC address of the backhaul point 10 (and in particular, the MAC address of the MV modem of the backhaul point) as the destination MAC address. In addition, the MV modem 280 also provides channel encoding, source encoding, error encoding, and encryption. The data is then modulated and provided to the DAC to convert the digital data to an analog signal.

First MV Signal Conditioner

The modulated analog signal from MV modem 280 is provided to the first MV signal conditioner 260, which may provide filtering (anti-alias, noise, and/or band pass filtering) and amplification. In addition, the MV signal conditioner 260 may provide frequency translation. In this embodiment, the translation is from the 4–21 MHz band of the LV power line to the band of the MV power line, which in this embodiment is a higher frequency band. In this embodiment, translation of the frequency is accomplished through the use of a local oscillator and a conversion mixer. This method and other methods of frequency translation are well known in the art and, therefore, not described in detail.

As is known in the art, frequency translation may result in a first and second image of the original frequency although in some instances, such as in the present embodiment, only one of the two images is desired. Thus, the frequency translation circuitry may include an image rejection filter to filter out the undesired image leaving only the desired frequency bandwidth, which in this embodiment is the higher frequency band of the MV power line.

Isolator

The isolator 240 of the present embodiment provides isolation for both the LV to MV path and the MV to LV path that is substantially the same. The isolator 240 provides electrical isolation between the MV power line and the LV power line, thereby ensuring that the higher voltages of the MV power line do not reach the LV power line or the customer premises. In addition, the isolator 240 in this embodiment ensures that the voltages of the MV power line do not reach the electronics on the LV side of the isolator 240, which may be referenced to the neutral of the LV power line.

The output of the MV first signal conditioner 260 may be supplied to the isolator 240, which may be a fiber optic isolator comprising a fiber optic transmitter (or transceiver) on the LV side of the isolator 240 and a fiber optic receiver (or transceiver) on the MV side of the isolator 240. Hereinafter, a fiber optic transmitter (or receiver) shall include a transmitter (or receiver) that forms part of a fiber optic transceiver. The fiber optic transmitter and fiber optic receiver (or transceivers) are communicatively coupled through a fiber optic conductor(s) or light pipe(s). While this embodiment employs a fiber optic based isolator, other embodiments may use an inductive isolator (such as in a transformer), a capacitive isolator, a wireless isolator path (such as a Bluetooth® wireless path, an 802.11 wireless path, or an ultrawideband wireless path), or some combination thereof.

The isolator 240 also may include isolation signal conditioning circuitry that filters (e.g., band pass, anti-aliasing, noise), amplifies, and/or performs other processing or conditioning of the signal, which may be necessary for interfacing the isolator with the surrounding components of the device. The isolation signal conditioning circuitry may be on the LV side of the isolator and/or on the MV side of the isolator 240. While the isolator in this embodiment forms part of the MVI 200, the isolator may instead form part of the LVI 400.

Second MV Signal Conditioner

The isolator 240 supplies the signals to the second MV signal conditioner 220 on the MV side of the isolator 240. The second MV signal conditioner 220 may condition the signal by filtering and/or amplifying the signal. In addition, the signal may buffer the signal and provide load balancing.

The output of these conditioning elements may be supplied to a MV transmit/receive switch (not shown), which controls whether the BD 100 is transmitting or receiving on the MV power line. The MV transmit/receive switch may default to receive mode so that data received from the MV line will pass through the switch to the receive circuitry. The MV transmit/receive switch also may be coupled to a transmission detection circuit, which detects when data is being provided for transmission on the MV line from the router 310 (for example, which may have originated from a user device). When the transmission detect circuitry detects transmission data, the circuitry transitions the switch to transmit mode so that the data to be transmitted may pass through the MV transmit/receive switch to the MV power line.

MV Power Coupler Line

Data passing through the MV transmit/receive switch for transmission on the MV power line is supplied to the MV power line coupler 210, which may include impedance translation circuitry, transient suppression circuitry, and a coupling device. The coupling device couples the data onto the MV power line as a transmission.

The coupling device may be inductive, capacitive, conductive, a combination thereof, or any suitable device for communicating data signals to and/or from the MV power line. One example of such a coupler is described in U.S. application Ser. No. 10/176,500, entitled "Power Line Coupling Device and Method of Using the Same," which is hereby incorporated by reference.

Figure 7:
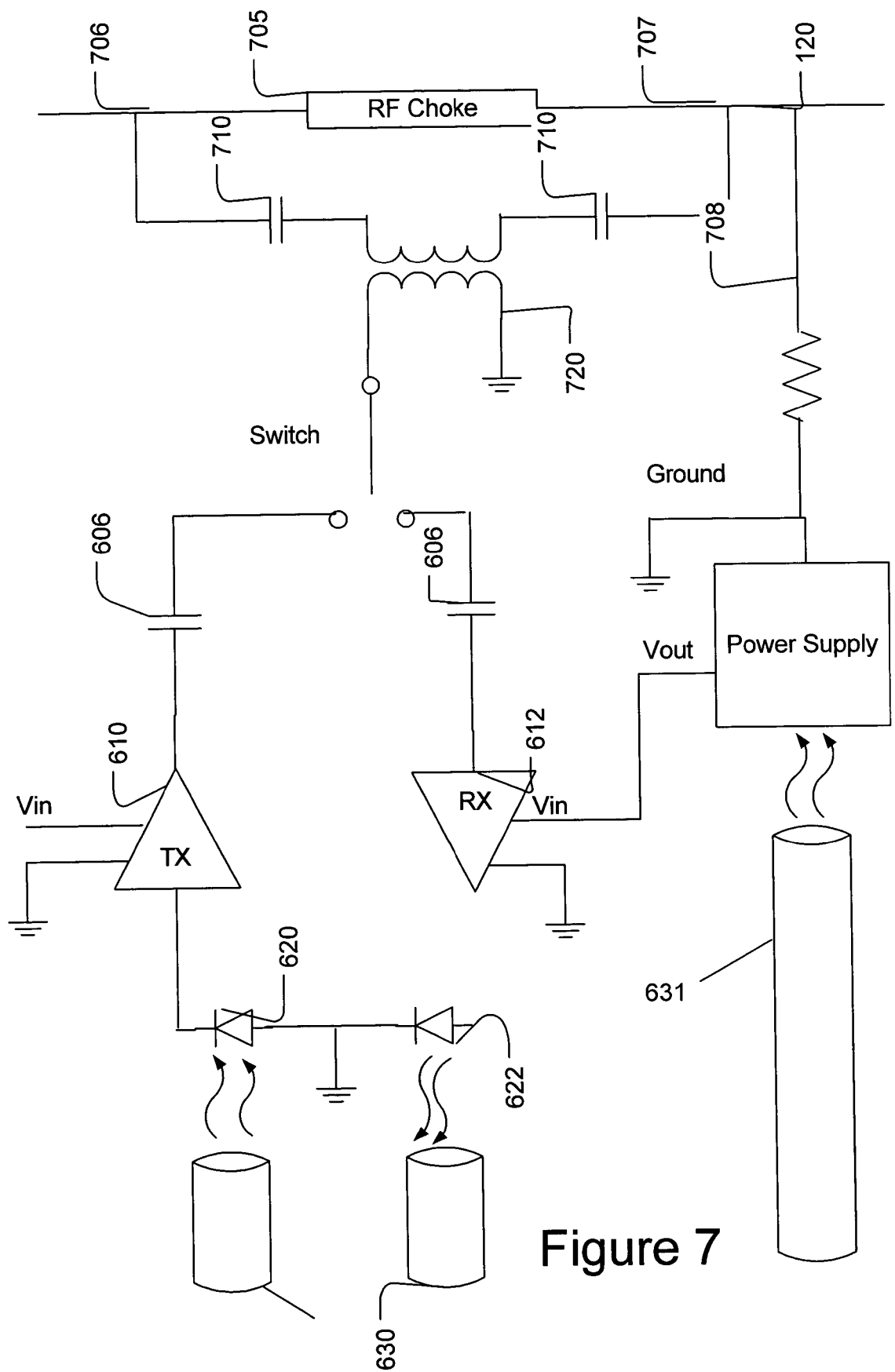
FIG. 7 is a schematic of a portion of a medium voltage interface for use in an embodiment of the present invention.

As explained in detail in that application, from an electrical perspective the coupling device includes a data filter which may be radio frequency (RF) filter or RF choke 705 communicatively coupled to the MV power line between the connection nodes as shown in FIG. 7. The RF choke 705 provides the impedance with inductors (e.g., ferrite toroids) disposed in the inductor chambers of a housing. Inductances may range from about 0.1 microHenries to 5.0 microHenries.

The RF choke 705 operates as a low pass filter. In other words, low frequency signals (e.g., having a frequency of 50 or 60 Hz) of the MV power signal pass through the RF choke relatively unimpeded (i.e., the RF choke can be modeled as a short circuit to low frequency signals). High frequency signals (e.g., a data signal), however, do not pass through RF choke; rather, they are impeded by the RF choke 705 (i.e., the RF choke 705 can be modeled as a high impedance circuit to high frequency signals). As such, the voltage across the RF choke 705 includes data signals but substantially no power signals. This voltage (i.e., the voltage across the RF choke 705) is applied to transformer 720 via capacitors 710 to receive data signals from MV power line. To transmit data signals to the MV power line, a data signal is applied to transformer 720, which in turn communicates the data signal to MV power line through capacitors 710.

The impedance translation circuitry and transient suppression circuitry of this MV coupler is provided, at least in part, by capacitors 710 and transformer 720. Capacitors 710 provide some electrical isolation between MV power line and transformer 720. Capacitors 710 further provide filtering of stray power signals. That is, the data signal passes across capacitors 710 while any lower frequency power signals are substantially prevented from passing across capacitors 710.

Transformer 720 may operate as a differential transceiver. That is, transformer 720 may operate to repeat data signals received from the MV power line to receive circuitry 612 and to repeat data signals received from transmit circuitry 610 to the MV power line. Transformer 720 also provides some electrical isolation between MV power line and LV power line. Transformer 720 also permits RF signals, such as data signals, to pass through and travel on down the power line.

Also shown in FIG. 7, this coupling device is coupled to an isolator 240 comprised of a fiber optic transceiver. Capacitors 606 are electrically connected between transmit circuitry 610 and receive circuitry 612 and transformer 720. Transmit circuitry 610 and receive circuitry 612 are electrically connected to transmit optoelectronic device 620 and receive optoelectronic device 622, respectively. Transmit optoelectronic device 620 (e.g., a photo diode) and receive optoelectronic device 622 (e.g., a photo detector) collectively form a transceiver and are in communication with communication medium 630, which acts as an isolator.

In the embodiment illustrated in FIG. 7, the communication medium 630 of the isolator is a fiber optic cable that provides electrical power isolation between MV power line and LV power line. In this example embodiment, power may be supplied to the MV side of the isolator 240 via a power supply that includes a transducer (e.g., a photo cell array) that converts non-electrical energy (e.g., light) into electrical energy. The non-electrical energy in this example is light that is supplied to the power supply via a light pipe or fiber optic cable 631 and has an energy source that is a light source powered from power supplied from the LV power line. Such a power supply is disclosed in U.S. application Ser. No. 10/292,745, entitled "A Floating Power Supply and Method of Using the Same" filed Nov. 12, 2002, which is hereby incorporated by reference.

Figure 8:
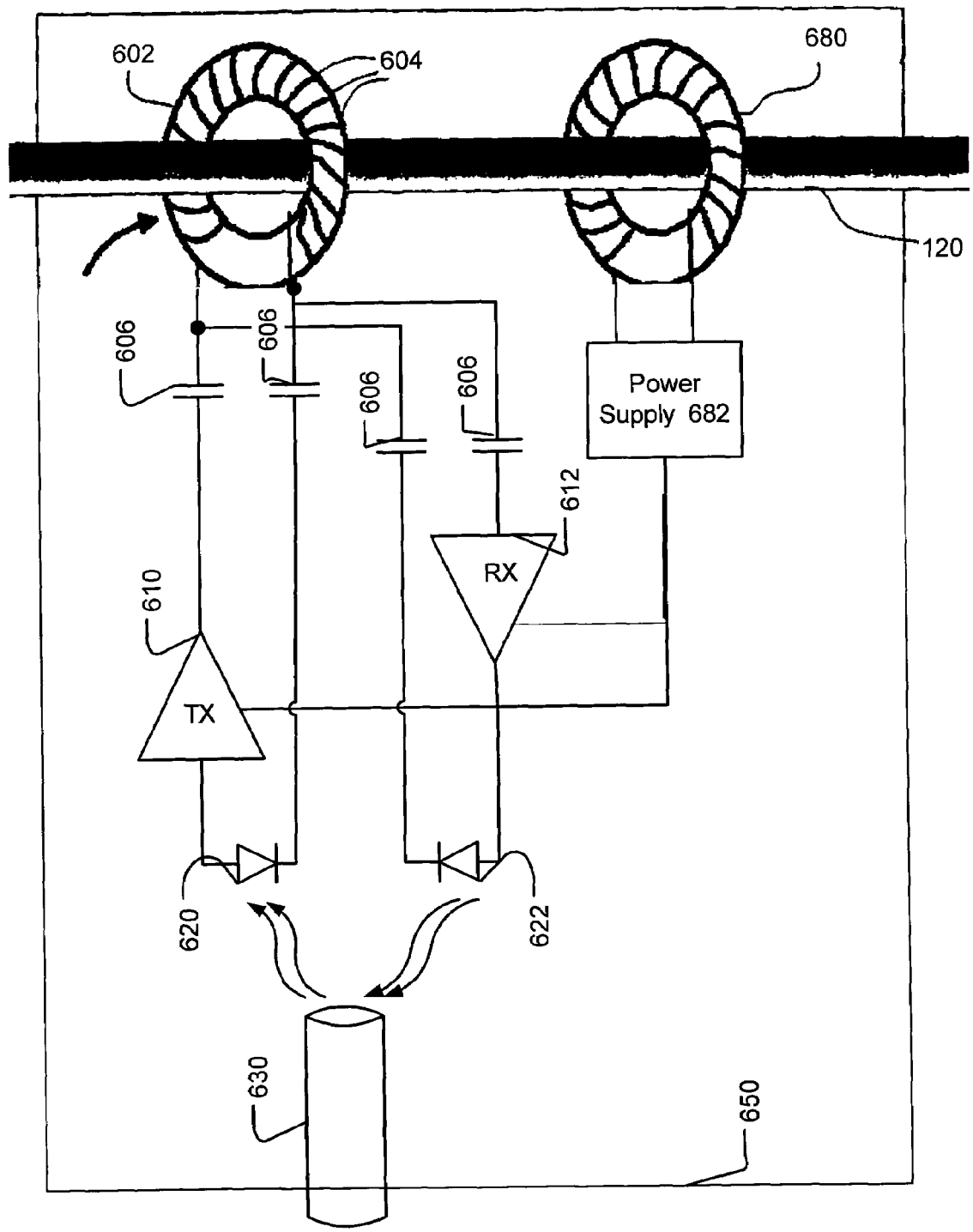
FIG. 8 is a schematic of a portion of an alternate medium voltage interface for use in an embodiment of the present invention.

In still another embodiment of a coupler and isolator shown in FIG. 8, the coupler includes an inductive coupling device having a toroid 602 with windings 604 that form part of a coupling transformer. In addition, the coupler includes a power coupling device 680 (e.g., a toroid transformer) that supplies electrical energy to a power supply 682 to power the electronics on the MV side of the isolator 240

Figure 10:
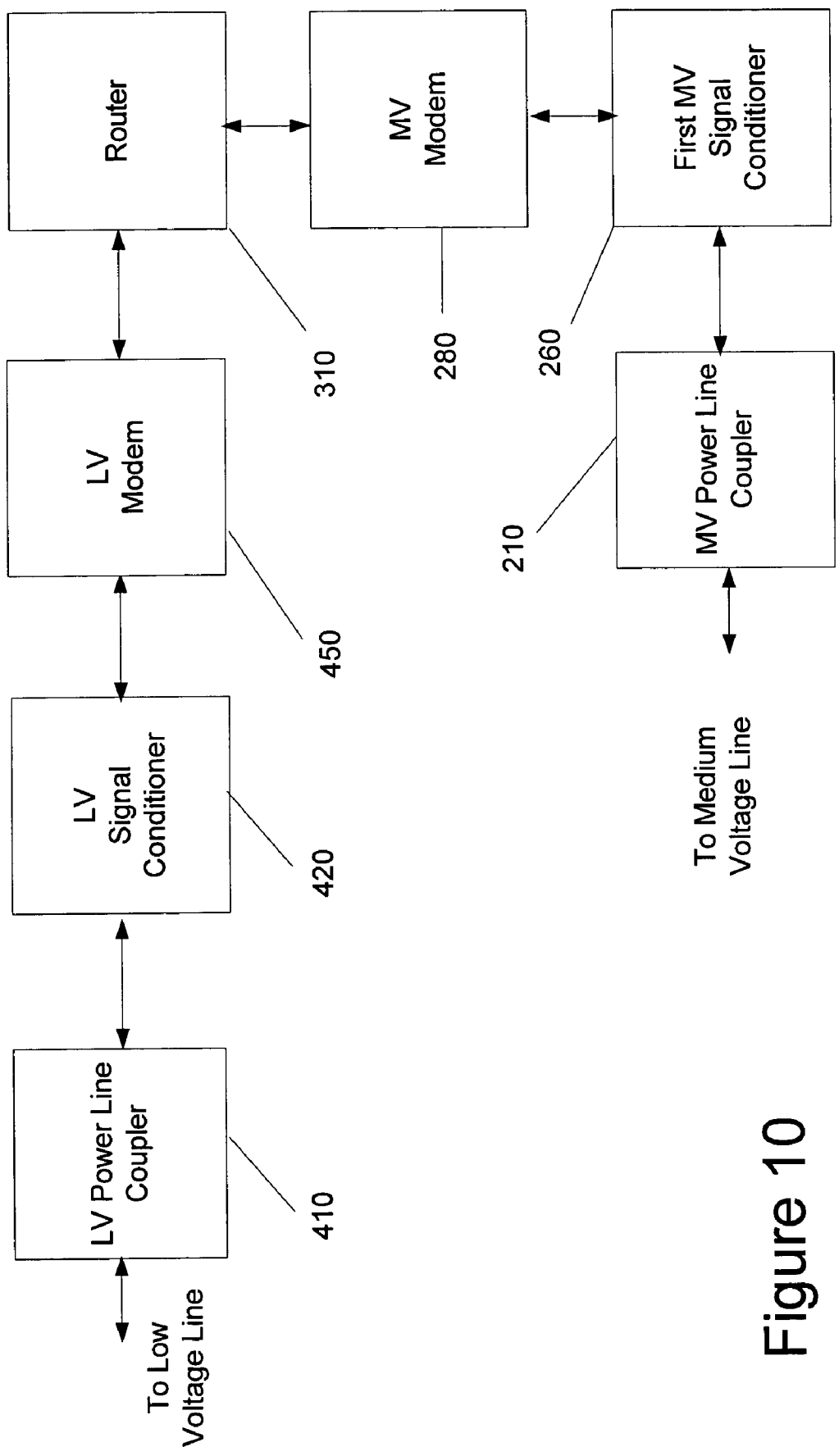
FIG. 10 is a functional block diagram of a bypass device, in accordance with another embodiment of the present invention.

Another example of such a suitable MV coupler is described in U.S. application Ser. No. 10/292,714, entitled "A Power Line Coupling Device and Method of Using the Same," filed Nov. 12, 2002, which is hereby incorporated by reference. This coupler itself provides isolation by using the isolation provided by a standard underground residential distribution MV cable (although it may be used in an underground or overhead application). Thus, this coupler provides electrical isolation from the MV voltages while communicating signals to and from the MV power line. Consequently, an embodiment of the present invention (in the form of a BD, repeater, backhaul point, or other device) using this coupler may not incorporate a separate isolator 240 since the coupler itself provides isolation. In addition, the first MV signal conditioner 220 also may be omitted or combined with the second MV signal conditioner 260 when using such a coupler. Such a combined signal conditioner may include a MV transmit/receive switch, a filter (e.g., include one or more of band pass, noise, or anti-alias filter) an amplifier, and a frequency translator. Thus, a BD 100 employing this coupler may include the functional components shown in FIG. 10.

Path from MV Power Line to LV Power Line

As discussed the MV power line coupler 210 also receives data signals from the MV power line via a coupling device, which may take the form of any of those coupling devices described above. The data signals from the MV coupler pass through the transient suppression circuitry and impedance translation circuitry to the MV transmit/receive switch.

Second MV Signal Conditioner

The switch, when in receive mode, passes the incoming data signal to the second MV signal conditioner 220, which may provide band pass filtering of the signal (e.g., filtering out signals outside the frequency band of interest), amplification of the signal, and additional filtering (e.g., image rejection filtering, anti-aliasing, noise). The signal is then supplied to the isolator 240, which in this one embodiment is a fiber optic cable and transceivers.

Isolator

As discussed, the isolator 240 of the present embodiment provides isolation for both the LV to MV path and the MV to LV path. The input to the isolator 240 may be conditioned with signal conditioning circuitry associated with the isolator. Such conditioning circuitry may include circuitry that filters (e.g., band pass, anti-aliasing, noise), amplifies, and/or performs other processing or conditioning of the signal.

In this embodiment, the isolator 240 is comprised of a fiber optic isolator including a fiber optic transceiver on the LV side of the isolator and a fiber optic transceiver on the MV side of the isolator. As discussed, the fiber optic transceivers are communicatively coupled through a fiber optic conductor(s) or light pipe(s). The isolator 240 provides electrical power isolation between the MV power line and the LV power line, thereby ensuring that the higher voltages of the MV power line to not reach the LV power line or the customer premises. In addition, the isolator 240 ensures that the voltages of the MV power line do not reach the electronics on the LV side of the isolator, which are referenced to the neutral of the LV power line. While this embodiment employs a fiber optic based isolator, other embodiments may use an inductive isolator (such as in a transformer), a capacitive isolator, a wireless path (such as a Bluetooth® wireless path, an 802.11 wireless path, an ultrawideband (need more info) wireless path), or some combination thereof.

As discussed, the isolator 240 may include isolation signal conditioning circuitry that filters (e.g., band pass, anti-aliasing, noise, etc.), amplifies, and/or performs other processing or conditioning of the signal. The isolation signal conditioning circuitry may be on the input or output of the isolator 240 and form part of either communication path as is necessary.

First MV Signal Conditioner

The output of the isolator 240 is provided to the first MV signal conditioner 260, which may include a low pass filter for filtering out signals above the uppermost frequency of interest or a band pass filter for filtering out signals outside the MV communication channel band. The conditioner 260 of this example embodiment includes a frequency translator circuit to shift the frequency of the signal from the frequencies of the MV communication channel to those of the LV communication channel (e.g., 4.5–21 MHz). The second MV signal conditioner 260 may also include an additional filter after the frequency translation, which may include anti-alias filtering, and/or band pass filtering. In addition, the signal conditioner 260 may include an amplifier for amplifying the signal.

MV Modem

The MV modem 280 receives the output of the first MV signal conditioner 260. The MV modem 280 and LV modem 450 provide a bi-directional path and form part of the MV to LV path and the LV to MV path. The components of the MV modem 280 have been described above in the context of the LV to MV path and are therefore not repeated here. The incoming signal is supplied to the ADC to convert the incoming analog signal to a digital signal. The digital signal is then demodulated. The modem then provides decryption, source decoding, error decoding, and channel decoding all of which are known in the art and, therefore, not explained in detail here.

The MV modem 280 also provides MAC processing through the use of MAC addresses. In one embodiment employing the present invention, the MAC address is used to direct data packets to the appropriate device. The MAC addresses provide a unique identifier for each device on the PLC network including, for example, user devices, BDs, PLIDs, repeaters and backhaul points (i.e., the LV modems and MV modems of the BDs, repeaters, and the backhaul points).

Based on the destination IP address of a received packet, the backhaul point 10 will determine the MAC address of the MV modem 280 of the BD 100 servicing the user device. The information for making this determination is stored in a table in the memory of the backhaul point 10. The backhaul point 10 will remove the MAC header of the packet and add a new header that includes the MAC address of the backhaul point 10 (as the source address) and the MAC address of the BD 100 (the destination address)—or more specifically, the MAC address of the MV modem 280 of the destination BD 100.

Thus, in this embodiment, packets destined for a user device on a LV subnet of a BD 100 (or to the BD 100) are addressed to the MAC address of the MV modem 280 of the BD 100 and may include additional information (e.g., the destination IP address of the user device) for routing the packet to devices on the BD's LV subnet.

If the destination MAC address of the received packet does not match the MAC address of the MV modem 280, the packet may be discarded (ignored). If the destination MAC address of the received packet does match the MAC address of the MV modem 280, the MAC header is removed from the packet and the packet is supplied to the router 310 for further processing.

There may be a different MAC sublayer for each physical device type such as for user devices and PLCS network elements (which may include any subset of devices such as backhaul devices, BDs, repeaters, aggregation points, and core routers).

Router

As discussed above, upon reception of a data packet, the MV modem 280 of a BD 100 will determine if the destination MAC address of the packet matches the MAC address of the MV modem 280 and, if there is a match, the packet is passed to the router 310. If there is no match, the packet is discarded.

n this embodiment, the router 310 analyzes packets having a destination IP address to determine the destination of the packet which may be a user device or the BD 100 itself. This analysis includes comparing the information in the packet (e.g., a destination IP address) with information stored in memory, which may include the IP addresses of the user devices on the BD 100 LV subnet. If a match is found, the router 310 routes the packet through to the LV modem 450 for transmission on the LV power line. If the destination IP address matches the IP address of the BD 100, the packet is processed as a command or data intended for the BD 100 (e.g., by the Command Processing software described below) and may not be passed to the LV modem 450.

The term "router" is sometimes used to refer to a device that routes data at the IP layer (e.g., using IP addresses). The term "switch" is sometimes used to refer to a device that routes at the MAC layer (e.g., using MAC addresses). Herein, however, the terms "router", "routing", "routing functions" and the like are meant to include both routing at the IP layer and MAC layer. Consequently, the router 310 of the present invention may use MAC addresses instead of, or in addition to, IP addresses to perform routing functions.

For many networks, the MAC address of a network device will be different from the IP address. Transmission Control Protocol (TCP)/IP includes a facility referred to as the Address Resolution Protocol (ARP) that permits the creation of a table that maps IP addresses to MAC addresses. The table is sometimes referred to as the ARP cache. Thus, the router 310 may use the ARP cache or other information stored in memory to determine IP addresses based on MAC addresses (and/or vice versa). In other words, the ARP cache and/or other information may be used with information in the data packet (such as the destination IP address) to determine the routing of a packet (e.g., to determine the MAC address of the PLID communicating with the user device having the destination IP address).

In an alternate embodiment using IP address to route data packets, all packets received by the MV modem 280 may be supplied to the router 310. The router 310 may determine whether the packet includes a destination IP address that corresponds to a device on the BD's LV subnet (e.g., an address corresponding to a user device address or the BD's address). Specifically, upon determining the destination IP address of an incoming packet, the router 310 may compare the identified destination address with the addresses of the devices on the subnet, which are stored in memory. If there is a match between the destination address and the IP address of a user device stored in memory, the data is routed to the LV power line for transmission to the user device. If there is a match between the destination address and the IP address of the BD 100 stored in memory, the data packet is processed as a command or information destined for the BD 100.

In addition, the router 310 may also compare the destination address with the IP address of the backhaul point 10, other BDs, or other repeaters (for example, if the BD is also acting as a repeater). If there is no match between the destination address and an IP address stored in memory, the packet is discarded (ignored).

According to any of these router embodiments, if the data is addressed to an address on the BD's LV or MV subnet (the network of devices with which the BD can communicate and/or for which the BD has an address (MAC or IP) stored therein), the router may perform any or all of prioritization, packet routing, access control, filtering, and encryption.

As discussed, the router 310 of this example embodiment of the present invention may use a routing table to determine the destination of a data packet. Based on information in the routing table and possibly elsewhere in memory, the router 310 routes the packets. For example, voice packets may be given higher priority than data packets so as to reduce delays and improve the voice connection experienced by the user. The router 310 supplies data packets intended for transmission along the LV power line to the LV modem 450.

LV Modem

The functional components of the LV Modem 450 have been described above in the context of the LV to MV path and, therefore, are not repeated here. After receiving the data packet from the router 310, the LV modem 450 provides MAC processing, which may comprise adding a MAC header that includes the source MAC address (which may be the MAC address of the LV modem 450) and the destination MAC address (which may be the MAC address of the PLID 50 corresponding to the user device identified by the destination IP address of the packet).

To determine the MAC address of the PLID 50 that provides communications for the user device identified by the destination IP address of the packet, the LV modem 450 first determines if the destination IP address of the packet is an IP address stored in its memory (e.g., stored in its bridging table). If the IP address is stored in memory, the LV modem 450 retrieves the MAC address for communicating with the destination IP address (e.g., the MAC address of the PLID 50) from memory, which will also be stored therein. If the IP address is not stored in memory, the LV modem 450 transmits a request to all the devices to which it is coupled via the low voltage power line (e.g., all the PLIDs). The request is a request for the MAC address for communicating with the destination IP address of the packet. The device (e.g., the PLID) that has the MAC address for communicating with the destination IP address will respond by providing its MAC address. The LV modem 450 stores the received MAC address and the IP address for which the MAC address provides communications in its memory (e.g., in its bridging table). The LV modem 450 then adds the received MAC address as the destination MAC address for the packet.

The packet is then channel encoded, source encoded, error encoded, and encrypted. The data is then modulated and provided to the DAC to convert the digital data to an analog signal.

LV Signal Conditioner

The output of the LV modem 450 is provided to the LV signal conditioner 420, which conditions the signal for transmission. Knowing (or determining) the frequency response (or loss) of the LV power line transmission channel allows the device to predistort signals prior to transmission to compensate for anticipated losses at certain frequencies or frequency ranges. During and/or prior to transmission, the amount of amplification necessary for particular frequency ranges may be periodically determined according to methods known in the art to provide dynamic predistortion (i.e., changing the amount of amplification of all or portions (e.g., frequencies or frequency ranges) of the signal over time) of the transmitted signal. The determination of the desired amount of amplification may, for example, be determined and/or relate to the amount of amplification performed by amplifiers 422 in the LV to MV path. Alternately, the amplification may be characteristic for a particular type of channel (e.g., overhead or underground), or measured for a channel, and the predistortion thus may be fixed (preprogrammed and/or hardwired into the device).

In this embodiment, signals at higher frequencies are amplified more than signals at lower frequencies to compensate for the anticipated greater loss at the higher frequencies. As shown in FIG. 6a, the signal to be transmitted is amplified with an amplifier that provides greater amplification at higher frequencies of the 4.5 to 21 MHz band. Such amplifiers are well-known to those skilled in the art. The amplifier may have a transfer function substantially inverse to the frequency response of the LV transmission channel. Once amplified and filtered, the signal is conducted through switch 426 to the LV power line coupler 410 for transmission on the energized LV conductors of the LV power line. Of course, in alternate embodiments the transmission may not be predistorted and may be filtered and amplified substantially the same across the transmission channel.

Figure 6B:
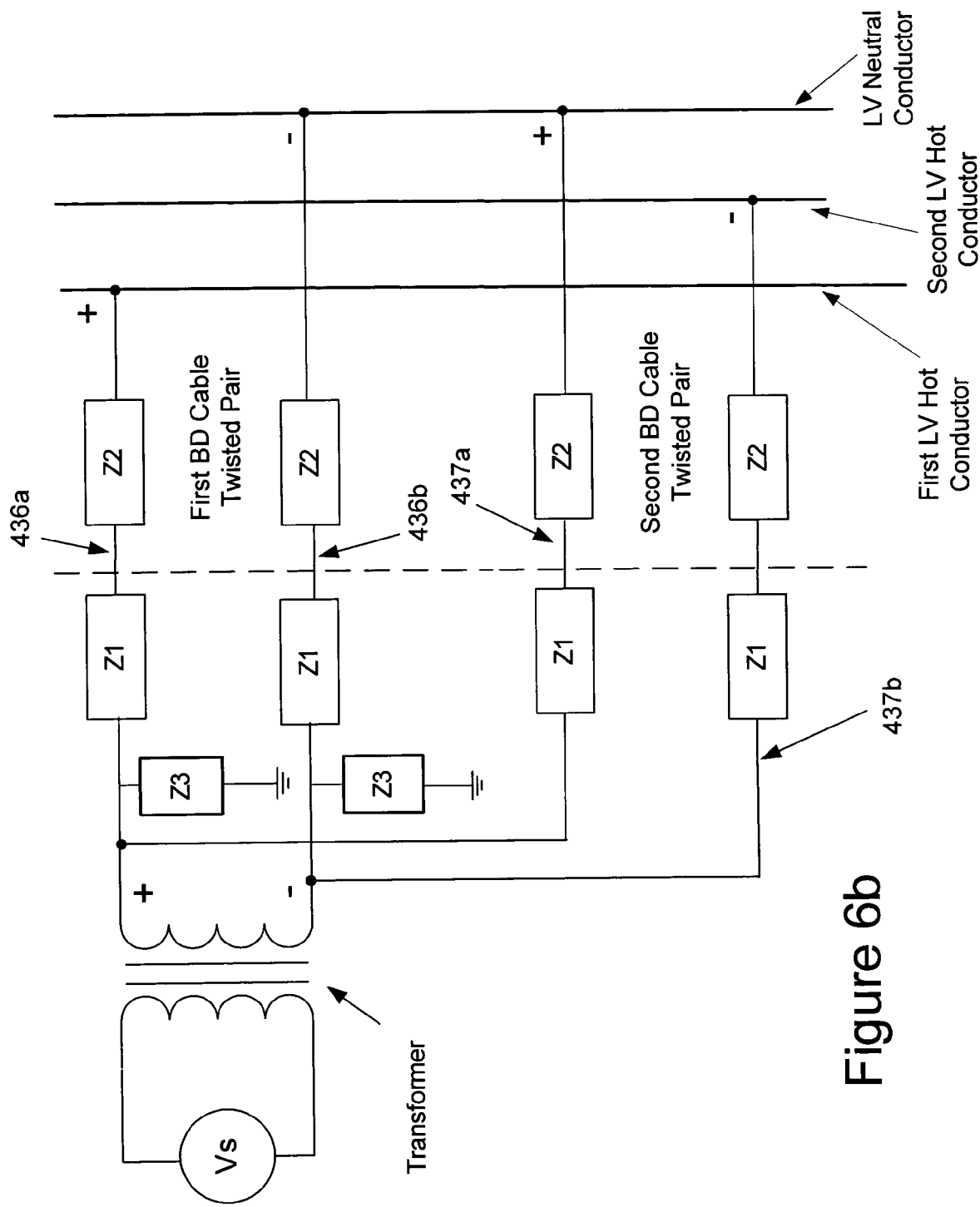

FIG. 6b illustrates the transmit circuit used to drive the data signal (indicated by Vs). Components to the left of the dashed line in FIG. 6b may be inside the BD enclosure and those to the right may be outside the BD enclosure. The transmit circuit of this embodiment is comprised of a transformer that drives the two conductor pairs 436 and 437. Each conductor pair 436, 437 is coupled to ground by impedance Z3, which may be resistive. In addition, each conductor 436a,b and 437a,b includes a series impedance Z1, which may be capacitive (e.g., providing a high pass filter) and/or resistive.

As discussed, the first and second BD cables 436, 437 are each comprised of a twisted pair of conductors 436a,b and 437a,b. As will be evident to those skilled in the art, each twisted pair cable 436, 437 will have an impedance (determined by the geometry of the cable) as represented by Z2 in FIG. 6b. This impedance Z2 may be modeled by a resistive component and an inductive component. The inductive component also may cause coupling between the two twisted conductors of each cable.

LV Power Line Coupler

In addition to the above, the LV power line coupler 410 may include the impedance matching circuitry and transient protection circuitry. The coupler 410 couples the data signal onto the LV power line as described above for reception by a user device communicatively coupled to the LV power line via a PLID.

After the LV energized conductors enter the customer premises, typically only one LV energized conductor will be present at each wall socket where a PLID might be installed (e.g., plugged in). Given this fact regarding the internal customer premises wiring, there is no way to know to which LV energized conductor the PLID (and user device) will be connected. In addition, the subscriber may move the PLID and user device to another socket to access the PLCS and the new socket may be coupled to the second (different) LV energized conductor. Given these facts, the network designer must supply communications on both LV energized conductors and, therefore, would be motivated to simultaneously transmit the PLC RF data signal on each LV energized conductor referenced to the neutral conductor. However, in comparison to transmitting the RF data signals on both energized conductors referenced to the neutral, the following method of providing communications on the LV energized has been found to provide improved performance.

As shown in FIG. 6b, the first BD cable 436 is coupled to the LV power line so that the data signal is applied to the first LV energized conductor referenced to the LV neutral conductor. The second BD cable 437 is coupled to the LV power line so that the data signal (Vs) is applied to the neutral conductor referenced to the second LV energized conductor. As a result, the data signal is applied to the first and second LV energized conductors differentially. In other words, with reference to the neutral conductor, the voltage signal (representing the data) on the second LV energized conductor is equal in magnitude and opposite in polarity of the voltage on the first LV energized conductor. Similarly, the current flow representing the data on the second LV energized conductor will be the opposite of the current flow on the first LV energized conductor in magnitude and direction. It has been found that differentially driving the LV energized conductors as described provides significant performance improvements over methods, which may result from reduced reflections, improved signal propagation, and impedance matching among other things. It is worth noting the transmit circuit of this and the following embodiments may transmit data signals with multiple carriers (e.g., eighty or more) such as with using an Orthogonal Frequency Division Multiplex (OFDM) modulation scheme.

Figure 6C:
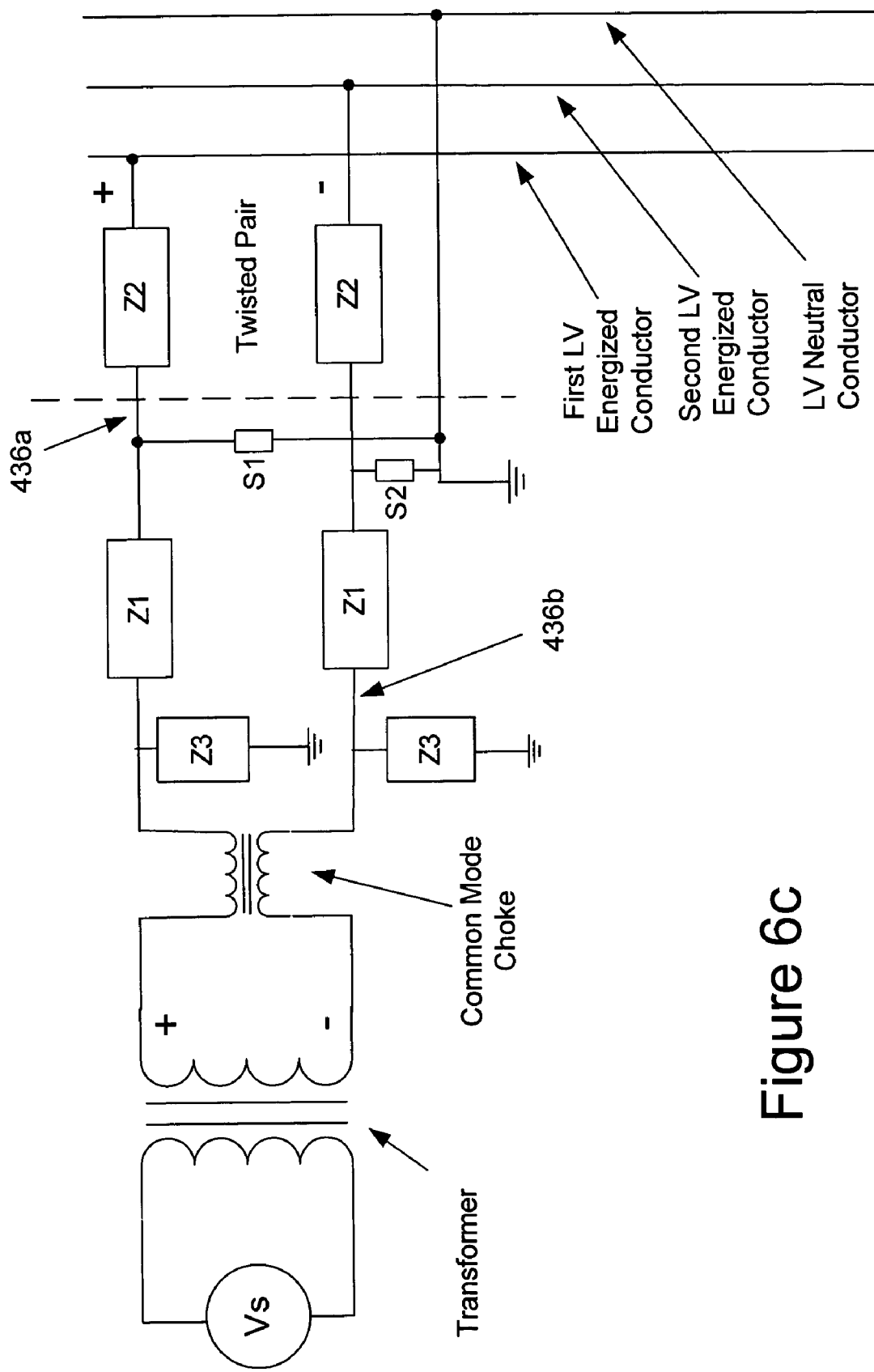

FIG. 6c illustrates another embodiment of a transmit circuit for transmitting the data signal. Components to the left of the dashed line in FIG. 6c may be inside the BD enclosure and those to the right may be outside the BD enclosure. The transmit circuit of this embodiment is comprised of a transformer that drives one conductor pair 436, which traverse through a common mode choke. The common mode choke provides a very low impedance to differential currents in the two conductors 436a,b, but provides a significant or high impedance to common mode currents (i.e., currents traveling in the same direction such as in or out). The two conductors 436a,b may also be coupled to ground by an impedance Z3, which may be a resistive impedance. In addition, each conductor 436a, b includes a series impedance Z1, which may be a capacitive impedance, or other low pass filter component(s), for impeding the 60 Hz power signal and permitting the RF data signal to pass unimpeded. Such impedances may be on either side of the common mode choke, but are preferably on the LV power line side of the choke.

In either embodiment, each conductor may also include a surge protection circuit, which in FIG. 6c are shown as S1 and S2. Finally, the cable 436 may be comprised of a twisted pair of conductors between the BD enclosure and LV power line. As will be evident to those skilled in the art, the twisted pair cable 436 may have an impedance (determined by the geometry of the cable) as represented by Z2. This impedance Z2 may be modeled by a resistive component and an inductive component. The inductive component also may cause coupling between the two twisted wired conductors.

While not shown in the figures, the transmit circuit of either embodiment may also include a fuse in series with each conductor and a voltage limiting device, such as a pair of oppositely disposed zener diodes, coupled between the pair of conductors and may be located between the common mode choke and the transformer. Finally, one of the conductors of the BD cable(s) 436 or 437 may used to supply power to the power supply of the BD 100 to power the BD 100.

It is worth noting that these embodiments of the present invention drive the first and second LV energized conductors differentially to transmit the data signal (e.g., using OFDM). However, the PLID transmits data signals from the customer premises to the BD 100 by applying the data signal to one conductor (e.g., one energized conductor) referenced to the other conductor such as a ground and/or neutral.

While in this embodiment the two energized conductors are opposite in magnitude, other embodiments may phase shift the data signal on one conductor (relative to the data signal on the other conductor) by forty-five degrees, ninety degrees, one hundred twenty degrees, one hundred eighty degrees, or some other value, in addition to or instead of differentially driving the two conductors.

Controller

Figure 9:
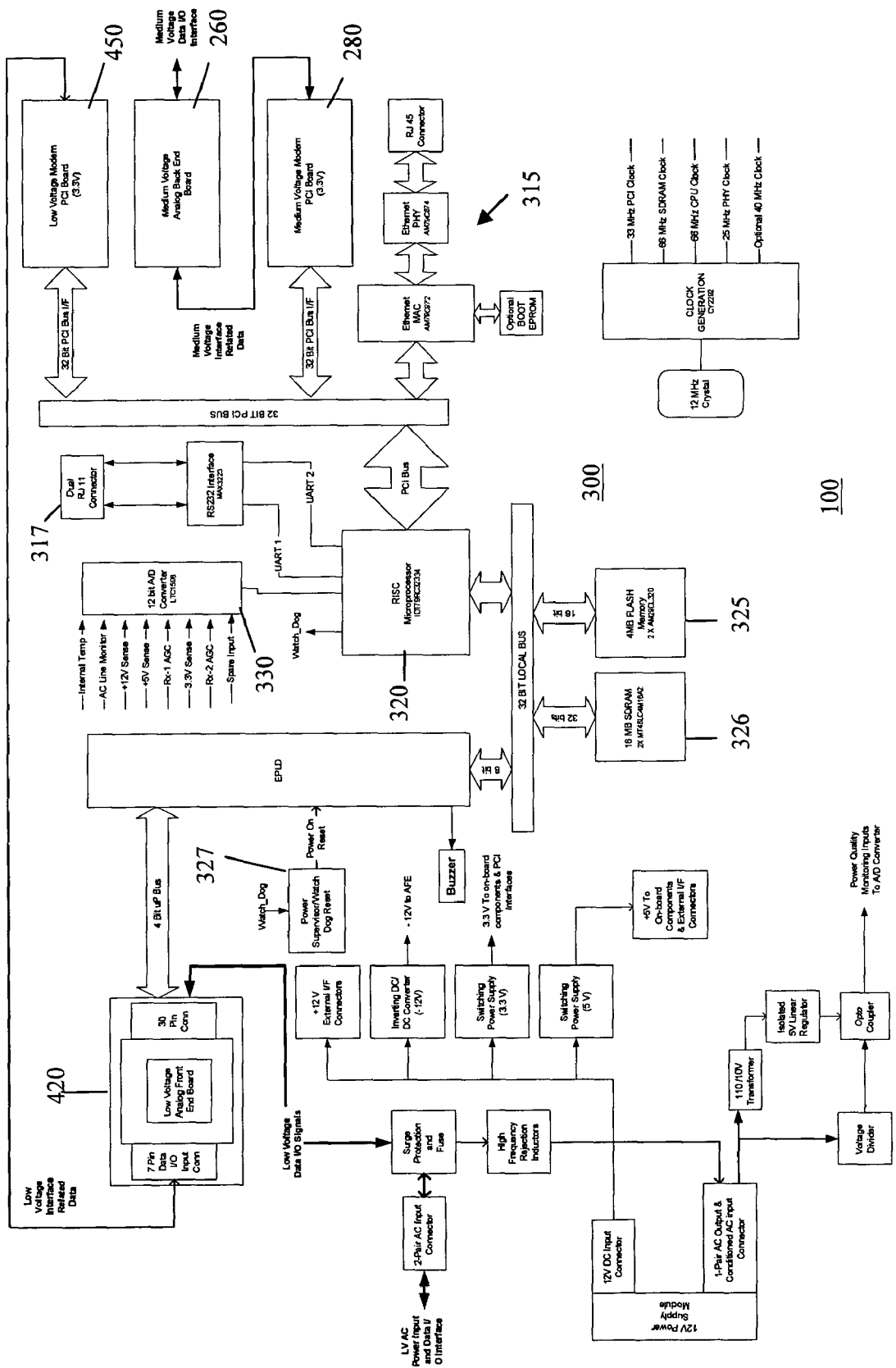
FIG. 9 is a functional block diagram illustrating of a portion of a bypass device, in accordance with an embodiment of the present invention.

A block diagram illustrating most of the functional components of one embodiment of the present invention is shown in FIG. 9. As discussed, the controller 300 includes the hardware and software for managing communications and control of the BD 100. In this embodiment, the controller 300 includes an IDT 32334 RISC microprocessor 320 for running the embedded application software and also includes flash memory 325 for storing the boot code, device data and configuration information (serial number, MAC addresses, subnet mask, and other information), the application software, routing table, and the statistical and measured data. This memory includes the program code stored therein for operating the processor 320 to perform the routing functions described herein.

This embodiment of the controller also includes random access memory (RAM) 326 for running the application software and temporary storage of data and data packets. This embodiment of the controller 300 also includes an Analog-to-Digital Converter (ADC) 330 for taking various measurements, which may include measuring the temperature inside the BD 100 (through a temperature sensor such as a varistor or thermistor), for taking power quality measurements, detecting power outages, measuring the outputs of feedback devices 423, and others. The embodiment also includes a "watchdog" timer 327 for resetting the device should a hardware glitch or software problem prevent proper operation to continue.

This embodiment of the controller 300 also includes an Ethernet adapter, an optional on-board MAC and physical (PHY) layer Ethernet chipset 315 that can be used for converting peripheral component interconnect (PCI) to Ethernet signals for communicating with the backhaul side of the BD 100. Thus, the RJ45 connector may provide a port for a wireless transceiver (which may be a 802.11 compliant transceiver) for communicating wirelessly to the backhaul point 10 or other BD, which, of course, would include a similar transceiver.

The BD 100 also may have a debug port, such as debug port 317 that can be used to connect serially to a portable computer. The debug port 317 preferably connects to any computer that provides terminal emulation to print debug information at different verbosity levels and can be used to control the BD 100 in many respects such as sending commands to extract all statistical, fault, and trend data.

In addition to storing a real-time operating system, the memory of controller 300 of the BD 100 also includes various program code sections such as a software upgrade handler, software upgrade processing software, the PLS command processing software (which receives commands from the PLS, and processes the commands, and may return a status back to the PLS), the ADC control software, the power quality monitoring software, the error detection and alarm processing software, the data filtering software, the traffic monitoring software, the network element provisioning software, and a dynamic host configuration protocol (DHCP) Server for auto-provisioning user devices (e.g., user computers) and associated PLIDs.

Referring to FIG. 9, the router 310 (i.e., processor 320 executing the routing program code) shares a bus with the LV modem 450 and MV modem 280. Thus, the router 310 in this embodiment is not physically located between the two modems, but instead all three devices—the router 310, LV modem 450, and MV modem 280—are communicatively coupled together via the bus. Consequently, in some instances (e.g., at the occurrence of a particular event) the router 310 may be programmed to allow the LV modem 450 to pass data directly to the MV modem 280 and vice versa, without performing data filtering and/or the other functions performed by the router 310 which are described above.

This embodiment of the BD 100 may only receive or transmit data over the LV power line at any one instant. Likewise, the BD 100 may only receive or transmit data over the MV power line at any one instant. However, as will be evident to those skilled in the art, the BD 100 may transmit or receive over the LV power line, while simultaneously transmitting or receiving data over the MV power line.

PLS Command Processing Software

The PLS and BD 100 (or repeater) may communicate with each other through two types of communications: 1) PLS Commands and BD responses, and 2) BD Alerts and Alarms. TCP packets are used to communicate commands and responses. The commands typically are initiated by the NEM portion of the PLS. Responses sent by the BD 100 (or repeater) may be in the form of an acknowledgement (ACK) or negative acknowledgement (NACK), or a data response depending on the type of command received by the BD (or repeater).

Commands

The PLS may transmit any number of commands to the BD 100 to support system control of BD functionality. As will be evident to those skilled in the art, most of these commands are equally applicable for repeaters. For ease of discussion, however, the description of the commands will be in the context of a BD only. These commands may include altering configuration information, synchronizing the time of the BD 100 with that of the PLS, controlling measurement intervals (e.g., voltage measurements of the ADC 330), requesting measurement or data statistics, requesting the status of user device activations, and requesting reset or other system-level commands. Any or all of these commands may require a unique response from the BD 100, which is transmitted by the BD 100 (or repeater) and received and stored by the PLS.

Alerts

In addition to commands and responses, the BD 100 (or repeater) has the ability to send Alerts and Alarms to the PLS (the NEM) via User Datagram Protocol (UDP), which does not require an established connection but also does not guarantee message delivery.

Alerts typically are either warnings or informational messages transmitted to the NEM in light of events detected or measured by the BD 100. Alarms typically are error conditions detected by the BD 100. Due to the fact that UDP messages may not be guaranteed to be delivered to the PLS, the BD 100 may repeat Alarms and/or Alerts that are critically important to the operation of the device.

One example of an Alarm is an Out-of-Limit Alarm that indicates that an out-of-limit condition and has been detected at the BD 100, which may indicate a power outage on the LV power line, a temperature measurement inside the BD 100 is too high, and/or other out-of-limit condition. Information of the Out-of-Limit condition, such as the type of condition (e.g., a LV voltage measurement, a BD temperature), the Out-of-Limit threshold exceeded, the time of detection, the amount (e.g., over, under, etc.) the out of limit threshold has been exceeded, is stored in the memory of the BD 100 and may be retrieved by the PLS.

Software Upgrade Handler

The Software Upgrade Handler software may be started by the PLS Command Processing software in response to a PLS command. Information needed to download the upgrade, including for example the remote file name and PLS IP address, may be included in the parameters passed to this software module (or task) from the Software Command Handler.

Upon startup, this task may open a file transfer program such as Trivial File Transfer Protocol (TFTP) to provide a connection to the PLS and request the file. The requested file is then downloaded to the BD 100. For example, the PLS may transmit the upgrade through the Internet, through the backhaul point 10, through the MV power line to the BD where the upgrade may be stored in a local RAM buffer and validated (e.g., error checked) while the BD 100 continues to operate (ie., continues to communicate packets to and from PLIDs and the backhaul point 10). Finally, the task copies the downloaded software into a backup boot page, and transmits an Alert indicating successful installation to the PLS. A separate command transmitted from the PLS, processed by the Command Processing software of the BD 100, may make the newly downloaded and validated program code the primary software operating the BD 100. If an error occurs, the BD 100 issues an Alert indicating the download was not successful.

ADC Scheduler

The ADC Scheduler software, in conjunction with the real-time operating system, creates ADC scheduler tasks to perform ADC sampling according to configurable periods for each sample type. Each sample type corresponds with an ADC channel. The ADC Scheduler software creates a scheduling table in memory with entries for each sampling channel according to default configurations or commands received from the PLS. The table contains timer intervals for the next sample for each ADC channel, which are monitored by the ADC scheduler.

ADC Measurement Software

The ADC Measurement Software, in conjunction with the real-time operating system, creates ADC measurement tasks that are responsible for monitoring and measuring data accessible through the ADC 330. Each separate measurable parameter may have an ADC measurement task. Each ADC measurement task may have configurable rates for processing, recording, and reporting for example.

An ADC measurement task may wait on a timer (set by the ADC scheduler). When the timer expires the task may retrieve all new ADC samples for that measurement type from the sample buffer, which may be one or more samples. The raw samples are converted into a measurement value. The measurement is given the timestamp of the last ADC sample used to make the measurement. The measurement may require further processing. If the measurement (or processed measurement) exceeds limit values, an alarm condition may be generated. Out of limit Alarms may be transmitted to the PLS and repeated at the report rate until the measurement is back within limits. An out of limit recovery Alert may be generated (and transmitted to the PLS) when the out of limit condition is cleared (i.e., the measured value falls back within limit conditions).

The measurements performed by the ADC 330, each of which has a corresponding ADC measurement task, may include BD inside temperature, LV power line voltage, LV power line current (e.g., the voltage across a resistor), AGC1 (corresponding to Feedback device 423*a*), and AGC2 (corresponding to Feedback device 423*a*) for example.

As discussed, the BD 100 includes value limits for most of these measurements stored in memory with which the measured value may be compared. If a measurement is below a lower limit or above an upper limit (or otherwise out of an acceptable range), the BD may transmit an Out-of-Limit Alarm, which is received and stored by the PLS. In some instances, one or more measured values are processed to convert the measured value(s) to a standard or more conventional data value.

The measured data (or measured and processed data) is stored in the memory of the BD. This memory area contains a circular buffer for each ADC measurement and time stamp. The buffers may be read by the PLS Command Processing software task in response to a request for a measurement report. The measurement data may be backed up to flash memory by the flash store task.

The LV power line voltage measurement may be used to provide various information. For example, the measurement may be used to determine a power outage, or measure the power used by a consumer or by all of the consumers connected to that distribution transformer. In addition, it may be used to determine the power quality of the LV power line by measuring and processing the measured values over time to provide frequency, harmonic content, and other power line quality characteristics.

Traffic Monitoring Software

The Traffic Monitoring software may collect various data packet traffic statistics, which may be stored in memory including the amount of data (i.e., packets and/or bytes) communicated (i.e., transmitted and received) through the MV power line, and/or through the LV power line; the amount of data (packets and/or bytes) communicated (transmitted and received) to and/or from the PLS; the number of Alerts and Alarms sent to the PLS; the number of DHCP requests from user devices; the number of failed user device authentications; the number of failed PLS authentications; and the number of packets and bytes received and/or transmitted from/to each user device (or PLID 50).

Data Filtering Software

The Data Filtering software provides filtering of data packets transmitted to and/or from a user device (or PLID 50). The filtering criteria may be supplied from the PLS (which may be based on requests received from the user) and is stored in memory of the BD 100 and may form part of the routing table. The Data Filtering software may analyze the data packets and may prevent the transmission of data packets through the BD:1) that are transmitted to the user device from a particular source (e.g., from a particular person, user, domain name, email address, or IP or MAC source address); 2) that are transmitted from the user device to a particular destination (e.g., to a particular person, email address, user, domain name, or IP or MAC destination address); 3) that have particular content (e.g., voice data or video data); 4) based on the time of transmission or reception (e.g., times of the day and/or days of the week); 5) that surpass a threshold quantity of data (either transmitted, received, or combination thereof for a predetermined window of time (e.g., a day, week, month, year, or subscription period); or 7) some combination thereof.

Auto-Provision and Activation of Network Components

"Auto-Provisioning" is the term used that may be used to refer to the steps performed to get a new network element (e.g., a BD 100, repeater, or backhaul point 10) onto the PLCS network. While skilled in working with power lines, personnel installing the BDs (linemen) often have little or no experience in working with communication networks. Consequently, it is desirable to have a system that permits easy installation of the BDs without the need to perform network configuration or other network installation procedures.

In the present example embodiment, each network element includes a unique identifier, which may be a serial number. In this embodiment, the enclosure of the BD 100 has a barcode that the installer scans to record the serial number. The installer also records the location of the installed device. This information (the identifying information and location) is provided to a network administrator to input the information into the PLS. Alternately, the installer may wirelessly transmit the information to the PLS for reception and storage by the PLS.

In one example embodiment, after being physically installed and powered up, the BD transmits a request, such as a dynamic host configuration protocol (DHCP) request, to the BP 10 with whom the communication device is physically or functionally connected. In response to the request, the BP 10 assigns and transmits an IP address to the MV interface 200 (i.e., assigns an IP address to be used to communicate with the MV modem 280), and the MV subnet mask. In addition, the BP transmits the IP address of the BP 10 to be used as the BD's network gateway address, and the IP address for the PLS. The BD 100 receives the information from the BP 10 and stores it in its non-volatile memory.

The BD 100 then transmits an Alive Alert to the PLS (using the IP address received in response to the DHCP request) indicating that the BD is running and connected to the network. The Alive Alert may include information identifying the BD, network configurations of the BD (e.g., MAC addresses of the LV modem 450 and MV modem 280), the IP address of the MV Interface (i.e., the IP address assigned to the MV modem 280 received from the BP 10) and MV subnet mask for use by the communication device's backhaul interface (much of which was received from the BP 10). This information is stored by the PLS in the network elements database.

In response, the PLS may activate the BD 100 by assigning and transmitting the BD 100 a LV subnet mask and a LV Interface IP address (i.e., the IP address used to communicate with the LV modem 450). If there are customers present on the LV subnet, the PLS will transmit customer information to the BD 100, which may include such information as data filtering information, keys (e.g., encryption keys), user device IP addresses, and subscription levels for the various users and/or user devices. In addition, the PLS may configure the BD by transmitting DNS addresses (e.g., a first and second DNS address), and a registration server IP address. This information is stored by the PLS (in the network elements database) and the BD 100. As discussed below, until a user device is registered, the BD 100 may be programmed to allow the user device to access only the domain name servers and registration server.

Provisioning a New User Device

Similarly, when a user installs a new user device on the LV subnet attached to the BD 100, the user device may need to be provisioned to identify itself on the network. To do so in this embodiment, the new user device transmits a DHCP request, which is received and routed by the BD 100 to a DHCP server running in the controller 300 of the BD 100. In response to the request, the BD 100 may respond by transmitting to the user device the IP address and subnet mask for the user device, the gateway IP address for the device's network interface to be used as the network gateway (e.g., the IP address of the LV modem 450 of the BD 100), and the IP addresses of the Domain Name Servers (DNS) all of which are stored in memory by the user device. In addition, the BD may transmit a new user device Alert to the PLS.

After provisioning, it may be necessary to register the user device with the network, which may require providing user information (e.g., name, address, phone number, etc.), payment information (e.g., credit card information or power utility account information), and/or other information to the registration server. The registration server may correlate this information with information of the utility company or Internet service provider. The registration server may form part of, or be separate from, the PLS. Until registered, the BD 100 prevents the user device (through its PLID 50) from communicating with (receiving data from or transmitting data to) any computer other than the registration server or the two DNSs. Thus, until the user device is registered, the BD 100 may filter data packets transmitted to and/or from the user device that are not from or to the registration server or a DNS. In addition, requests (such as HTTP requests) for other Internet web pages may be redirected and transmitted as a request for the registration web page on the registration server, which responds by transmitting the registration web page. Control of access of the user device may be performed by limiting access based on the IP address of the user device to the IP addresses of the registration server and DNSs.

After registration is successfully completed, the registration server communicates with the PLS to provide registration information of the user device to the PLS. The PLS transmits an activation message for the user device (or PLID 50) to the BD. In response, the BD 100 removes communication restrictions and permits the user device (and PLID 50) to communicate through the PLCS to all parts of the Internet. As will be evident to those skilled in the art, filtering of data and controlling access of the user device may be performed by limiting access based on the IP address of the user device (or depending on the network communication protocol, the MAC address of the user device) or the MAC address of the PLID 50 to which the user device is connected. Thus, the BD 100 may compare the source IP address (or MAC address) with information in its memory to determine if the IP address (or MAC address) is an address that has been granted access to the PLCS. If the source address is not an address that has been granted access to the PLCS (e.g., by registering, which results in an activation message from the PLS to the BD 100), the BD 100 may replace the destination IP address of the packet with the IP address of the registration server and transmit the packet to the backhaul point. The procedure above, or portions of the procedure, with respect to provisioning user devices may be used to provision a PLID instead of or in addition to a user device.

Alternate Embodiments

As discussed, the BD 100 of the above embodiment communicates data signals to user devices via the LV power line. Rather than communicating data signals to the PLID 50 and/or user devices via the LV power line, the BD 100 may use other communication media. For example, the BD may convert the data signals to a format for communication via a telephone line, fiber optic, cable, or coaxial cable line. Such communication may be implemented in a similar fashion to the communication with LV power line as would be well known to those skilled in the art.

In addition, the BD may convert the data signal to radio signals for communication over a wireless communication link to the user device. In this case, user device may be coupled to a radio transceiver for communicating through the wireless communication link. The wireless communication link may be a wireless local area network implementing a network protocol in accordance with an IEEE 802.11 (e.g., a, b, or g) standard.

Alternatively, the BD 100 may communicate with the user device via a fiber optic link. In this alternative embodiment, the BD may convert the data signals to light signals for communication over the fiber optic link. In this embodiment, the customer premises may have a fiber optic cable for carrying data signals, rather than using the internal wiring of customer premise.

Backhaul Point

As discussed, the present invention also may be embodied as a backhaul point 10. In this alternate embodiment, the device may include a controller 300, a MV interface 200, and a network interface. Thus, the MV interface of the device would be much the same as that described in the context of the BD 100 and may include a MV power line coupler 210, a first MV signal conditioner 220, and a MV modem 280. In addition, some, but not all, embodiments may also include an isolator 240 and/or a second MV signal conditioner 260 (or the functionality therein).

The controller 300 may include a router 310 coupled to the network interface. The network interface may include a network modem, a signal conditioner adapted to condition signals for communication through the network connected to the backhaul point, which may be a wired connection. In addition to or instead of a wired connection, the backhaul point 10 may include a transceiver such as a wireless transceiver for communicating with the AP wirelessly (e.g., an 802.11 wireless link) or a fiber optic transceiver for communicating with the AP via a fiber optic cable. In addition, the controller 300 of this embodiment may include substantially the same software and functionality as that described with respect to the BD 100 and modifications thereto would be readily apparent to one skilled in the art.

Specifically, the backhaul point may include substantially the same functionality with respect to monitoring data, taking measurements (e.g., temperature measurement), receiving and invoking software upgrades, transmitting data to the PLS, processing PLS commands (e.g., resets), and transmitting Alerts and Alarms.

Again, some embodiments of the backhaul point 10, such as those having a coupler with isolation designed in, may not incorporate a separate isolator and all of the signal conditioning circuitry described above.

Figure 11:
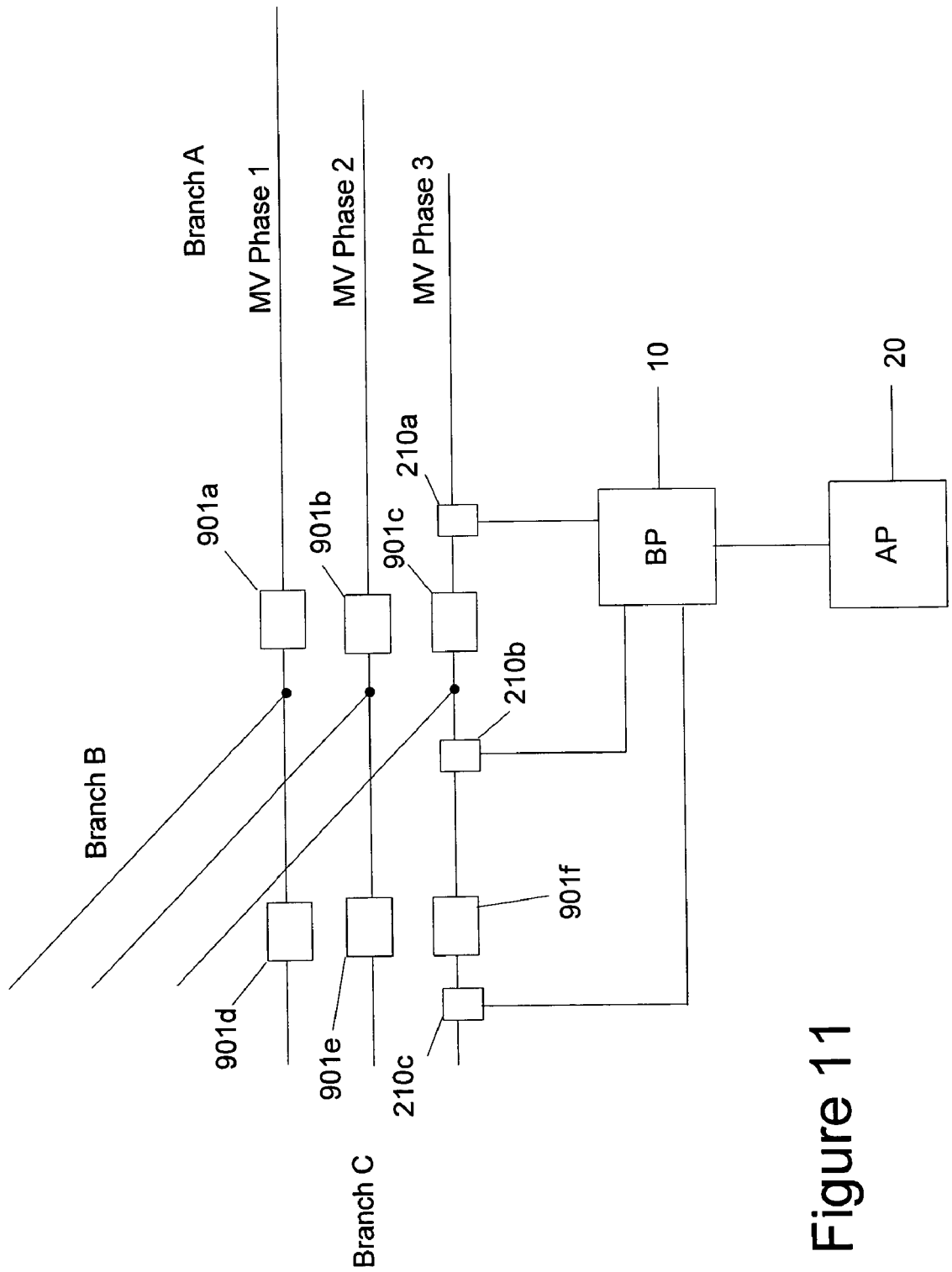
FIG. 11 is a schematic of backhaul point in a power line communication system, in accordance with an embodiment of the present invention.

In an alternate embodiment of the BP 10, the BP 10 is communicatively coupled to a plurality of MV power lines as shown in FIG. 11. For example, the BP 10 may be installed at a location where the MV power lines intersect in a "T". This alternate embodiment may include three MV interfaces with each having its own MV coupler. Each MV coupler 210 may be communicatively coupled to one of the branches such as branches A, B, and C of FIG. 11. A data filter 901 (such as a high frequency filter or rf choke for attenuating the data signals) is communicatively to the MV phase conductors between each MV coupler 210 to isolate the three communication channels of branches A, B, and C. For example, data filter 901c is disposed between MV coupler 210a and MV coupler 210b on phase 3 of the MV power line. Likewise, data filter 901f is disposed between MV coupler 210c and MV coupler 210b on phase 3 of the MV power line. Consequently, data coupled to the MV power line on phase 3 by MV coupler 210b will transmitted through branch B of the MV power line and prevented from traveling down branch A and branch C by data filters 901c and 901f, respectively.

As discussed above however, the frequency of the data signals may result in coupling of the data signals from one phase conductor to the other (e.g., from MV phase 3 to MV phase 2 and/or MV phase 1). Consequently, data filters 901b and 901e are communicatively coupled to phase 2 of the MV power line to prevent signals transmitted by MV coupler 210b on phase 3 of branch B from coupling to phase 2 (of branch B) and traveling up phase 2 and down branch A or branch C. Likewise, data filters 901b and 901e prevent signals coupled to phase 2 in branch A and branch C, respectively, from traveling down branch B. Data filters 901a and 901d likewise isolate phase 1 of the MV power line. Typically, the data filters are installed (i.e., communicatively coupled to block data signals) at substantially the same longitudinal position on the MV power line on each of their respective phase conductors as shown in FIG. 11 for data filters 901a–c.

MV coupler 210b alternatively may be physically installed on a phase conductor of branch B. In this topology, an additional data filter 910 may be installed on each phase conductor of the MV power line between the MV coupler 210b and the intersection of the three branches A, B, and C.

In yet another alternate embodiment, instead of having a complete and separate MV interface 200 to couple to each MV phase conductor, the BP 10 may have a separate coupler 210, MV signal conditioner(s) and MV isolator 240, but share a common MV modem 280. Preferably, however, the MV isolator 240 forms part of the coupler 210 and does not require a separate component. In any embodiment, the BP 10 may have two, three, four, or more couplers 210 (and MV interfaces 200) to couple to any desired number of MV power lines. In addition, in some instances, the data filters may not be necessary.

Figure 16:
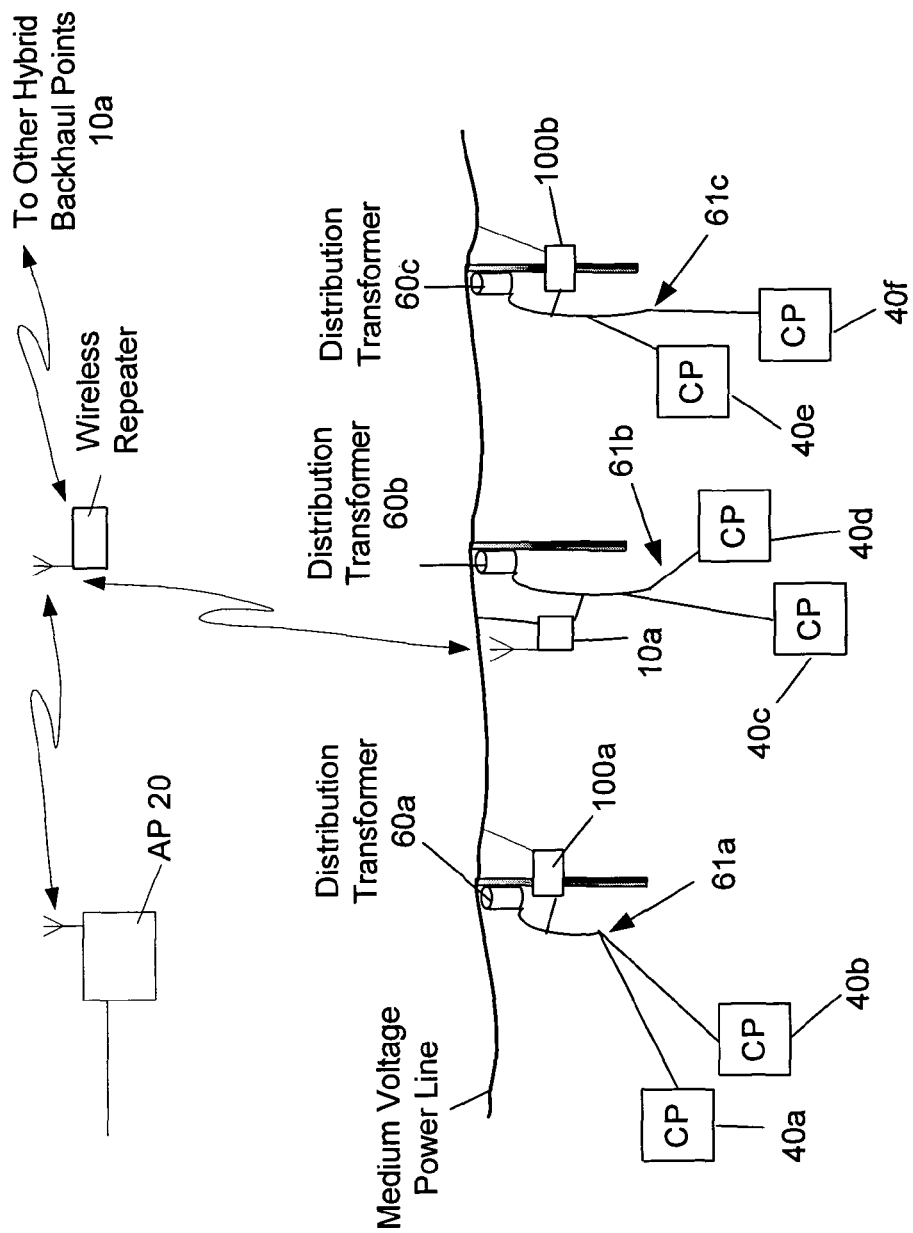
FIG. 16 is a schematic of a portion of a power line communication system in accordance with another embodiment of the present invention.

In addition and as discussed above, the BP 10 may have a wireless transceiver for providing a wireless link to the AP 20 (or distribution point as the case may be) and be a wireless BP 10a. The wireless link to the AP 20 (or distribution point) may be a direct wireless link or may include a wireless repeater as shown in FIG. 16. The wireless repeater of this embodiment is wirelessly coupled to the AP 20 (or distribution point), although the communication link could also be a wired link or fiber optic link as desired.

In addition, the BP 10, in some instances, may also act as a BD 100 serving those consumer premises 40 that receive power from the distribution transformer 60 to which the BP 10 is coupled. Thus, as shown in FIG. 16, this wireless BP 10a is a BP in that it acts as a backhaul point to the other BDs 100a and 100b that are communicatively coupled to the MV power line. However, this BP 10a also is perceived as a BD 100 to the user devices of the LV power lines 61b to which the wireless BP 10a is communicatively coupled such as those in consumer premises 40c and 40d. Likewise, a wired BP 10 (that communicates upstream via fiber, coaxial cable, or via another wired means) also may service customers via the LV power lines (or wirelessly). In addition, the wireless repeater may have a wired (or fiber optic) link to the AP 20 (or DP) instead of a wireless link as shown in FIG. 16.

Figure 13:
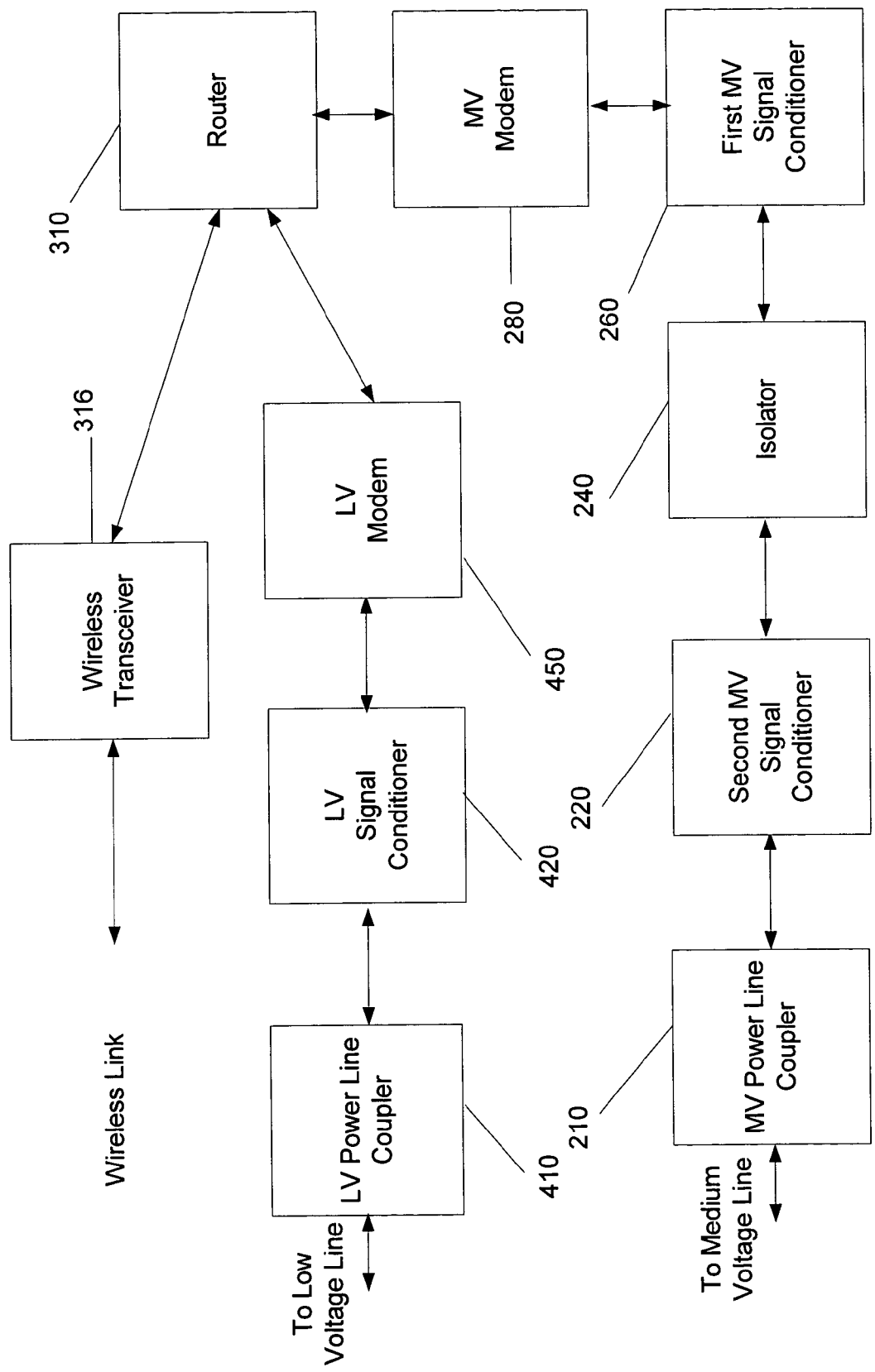
FIG. 13 is a functional block diagram of a bypass device, in accordance with another embodiment of the present invention.

Consequently, this wireless BP may be comprised of those components shown in FIG. 13 such as a MV interface 200 (including the MV coupler), LV interface 300, and a wireless transceiver. Thus, the wireless BP 10a may include a router 310 and addressing information stored in memory for communicating with the user devices coupled to the MV power line (via a BD 100 and PLID) such as such the MAC addresses of the MV modems of their respective BDs 100. In addition, the wireless BP 10a may have stored in memory the addresses (e.g., PLID MAC addresses) for communicating with the user devices coupled to the LV power lines to which the device 10a is coupled. In addition, the wireless BP 10a may include substantially all the functionality of the BD 100 (e.g., for provisioning user devices, tracking and filtering data, receiving software upgrades, and others described herein) and of the BP 10 (e.g., sending commands to BDs 100, transmitting software upgrades, and others described herein).

Repeater

In addition to, or instead of, being used as a transformer bypass device, the present invention may also take the form of a repeater. Thus, the repeater 70 may include an MVI interface 200 having many of the same components described above such as the MV coupler 210, the first MV signal conditioner 220 (which may perform all or some of the functions of the first and second MV signal conditioners 220 and 260 described above), and the MV modem 280. The repeater may also include a controller 300 having a router 310. In addition, the device may also include an isolator 240 and a LV power line coupler 410 (e.g., for coupling power from the LV line).

In addition, the repeater may include a second MV interface also coupled to the MV line for communicating on the MV power line in a second direction—opposite to the direction of communication along the MV from that of the first MV interface. Thus, a data filter such as a RF choke may be disposed on the MV power line between the respective coupling devices of the couplers of the MV interfaces to prevent data communications between the MV interfaces (so that all data is routed through the repeater) and so that the MV interfaces do not communicate with each other over the MV power line (i.e., the two communication channels are isolated). Consequently, the repeater may transmit or receive through the couplers simultaneously. A dual MVI interface repeater may be especially suitable for repeating signals through underground residential distribution cables. In addition, the repeater may also include an LVI to also act as a BD (to bypass a distribution transformer).

In addition to or instead of one of the MV interfaces, and as discussed with the BD, the repeater 70 may include a wireless transceiver for communicating with the backhaul point, a BD, or another repeater.

Depending on the distribution transformer, the allowable radiation limits, the configuration of the repeater, placement of repeater, and other factors, the repeater may permit communications to be transmitted through a distribution transformer for reception by a PLID and/or user device coupled to the LV power lines of the transformer and reception therefrom. Other embodiments of the repeater may include only one MV interface and therefore, may only be able to receive or transmit at any one point in time. Another embodiment of a repeater that provides isolation of networks is described in related U.S. patent application Ser. No. 10/434,024, entitled "A Power Line Communication Device and Method of Using the Same," filed May 8, 2003, which is hereby incorporated by reference in its entirety.

Wireless BD

As discussed, the BD 100 is coupled to the low voltage power lines on one side of the distribution transformer and the medium voltage power line on the other side of the distribution transformer to provide a data bypass around the distribution transformer 60. Thus, the BD embodiment described above provides communications for user devices communicatively coupled to the same low voltage power lines to which the BD is coupled and that extend from the bypassed distribution transformer. Consequently, with the above described BD, a BD 100 may be required for each distribution transformer to which a user device is electrically coupled in order to provide communications around the transformer for those user devices.

In order to reduce the costs of the PLCS, an enhanced BD may be used along with a Communication Interface Device (CID) to allow the enhanced BD to provide communication services to additional user devices electrically connected to other transformers. In particular, the enhanced BD and CID provide communications for user devices that are communicatively coupled to low voltage power lines other than those to which the enhanced BD is electrically coupled.

Figure 12:
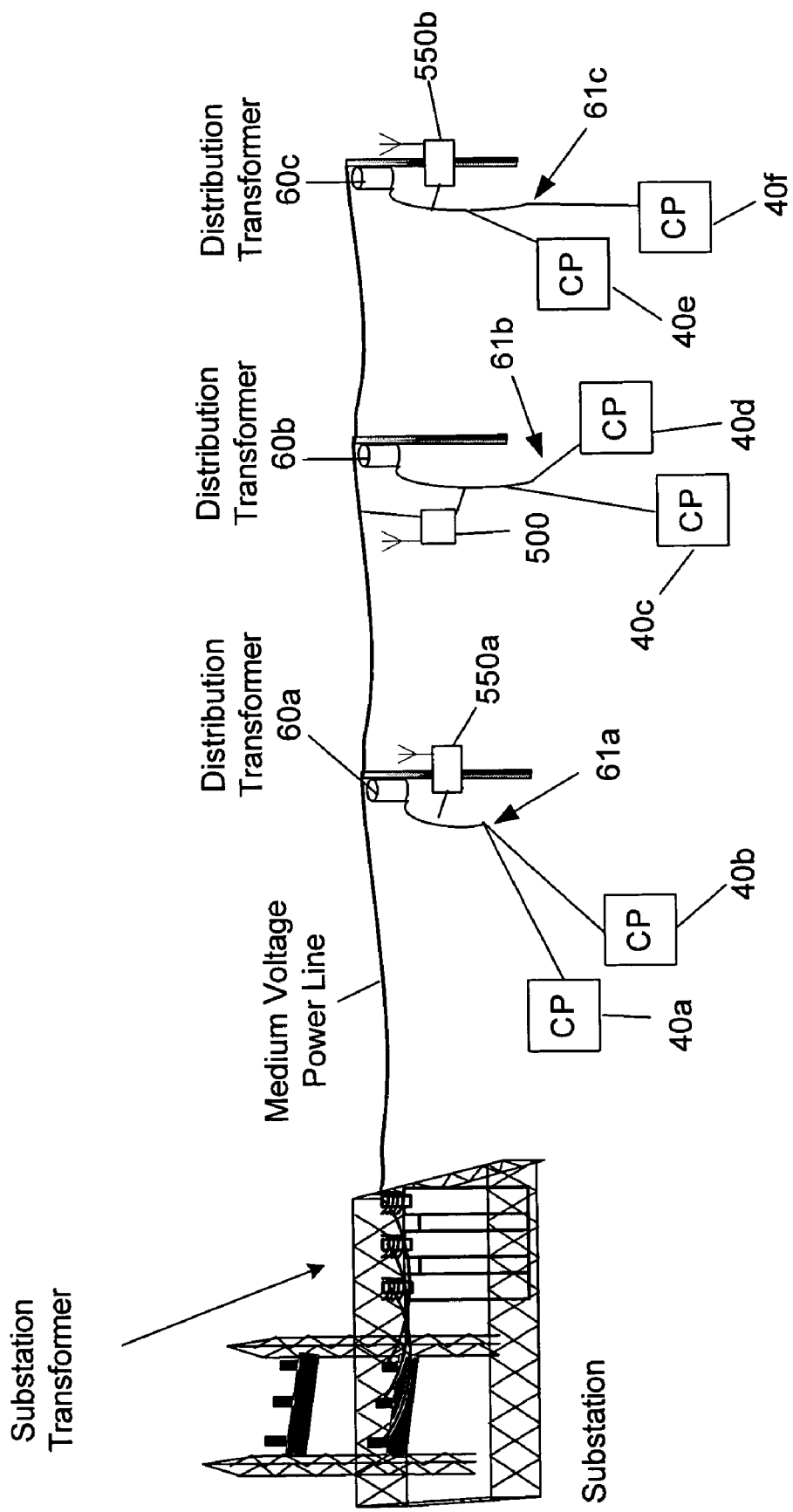
FIG. 12 is a diagram of a power distribution system modified to operate as a power line communication system, in accordance with another embodiment of the present invention.

An example of such a system employing an enhanced BD (EBD) 500 and multiple communication interface devices (CIDs) 550 is shown in FIG. 12. FIG. 12 provides just one example of such a system, and is not meant to be exclusive of all possible systems contemplated by the invention. The CIDs 550 are communicatively coupled to the EBD 500 via a bi-directional wireless link and to the user devices at the customer premises 40 via their respective low voltage power lines. In this example, a first CID 550*a* is installed at distribution transformer 60*a* and a second CID 550*b* is installed at distribution transformer 60*c*. CID 550*a* is communicatively coupled to the user devices at customer premises 40*a* and 40*b* via the low voltage power lines 61*a* extending from distribution transformer 60*a*. Similarly, CID 550*b* is communicatively coupled to the user devices at customer premises 40*e* and 40*f* via the low voltage power lines 61*c* extending from distribution transformer 60*c*. EBD 500 is communicatively coupled to the user devices at customer premises 40*c* and 40*d* via the low voltage power lines 61*b* extending from distribution transformer 60*b*. As discussed above, each CID 550*a* and 550*b* is communicatively coupled to the EBD 500 via a wireless link. Thus, the CIDs 550 provide a means for the EBD 500 to provide communications for user devices coupled to the low voltages power lines of additional distribution transformers (e.g., distribution transformers 60*a* and 60*c*) and, therefore, provide a means to bypass those additional transformers.

As shown in FIG. 13, the EBD 500 may comprise the same components described above for the BD 100 and further include a wireless transceiver 316, which may be comprised of an 802.11b wireless modem and an omni-directional antenna. The wireless transceiver 316 may be coupled to Ethernet port 315 of controller 300 (shown in FIG. 9) for communication with the router 310.

Figure 14:
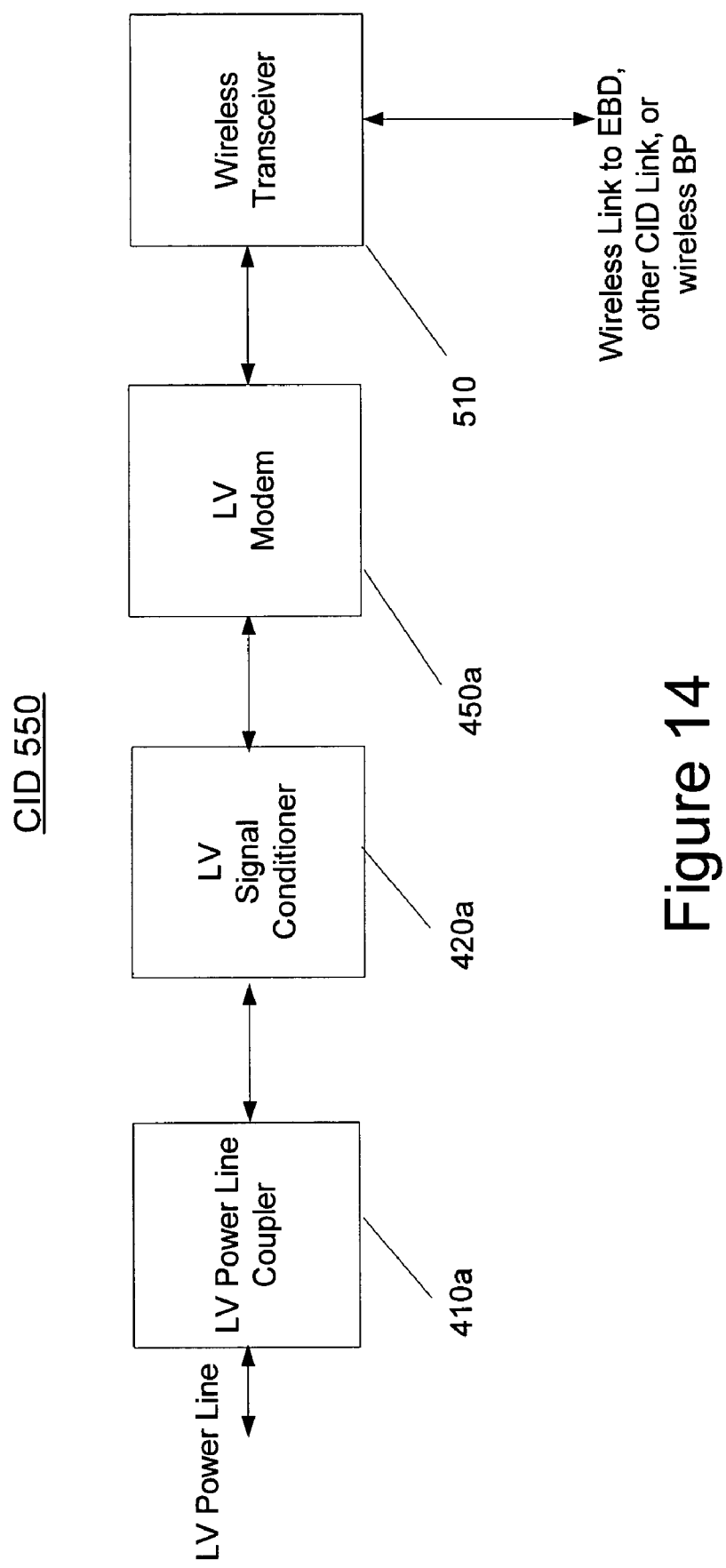
FIG. 14 is a functional block diagram of a communication device, in accordance with another embodiment of the present invention.

FIG. 14 is a functional block diagram of a CID, in accordance with one embodiment of the invention. As shown in FIG. 14, the CID 550 includes a LV interface, (which may be comprised of a LV power line coupler 410*a*, a LV signal conditioner 420*a*, and a LV modem 450*a*) that is communicatively coupled to the low voltage power line such as in a manner described above. The CID 550 also may include a power supply that receives power from the low voltage power line as described above. The LV modem 450*a* of the LV Interface is coupled to a wireless transceiver 510 (e.g., through an Ethernet or MII Interface), which may be comprised of an 802.11b wireless modem. The wireless transceiver 510 also may include a directional or omni-directional antenna, for example. Thus, CID 550 and the EBD 500 may communicate via a bi-directional wireless link via their respective wireless transceivers (510 and 316). The wireless transceivers may be any suitable wireless transceiver and be comprised, for example, of an 802.11a wireless transceiver, an 802.11b wireless transceiver, or a Bluetooth® transceiver, for example.

Referring to the example embodiment shown in FIG. 12, CID 550*a* communicates with the user devices and PLIDs connected to the low voltage power lines 61*a* of distribution transformer 60*a* such as those at customer premises 40*a* and 40*b*. Similarly, in this one example, CID 550*b* communicates with the user devices and PLIDs connected to the low voltage power lines 61*c* of distribution transformer 60*c* such as those at customer premises 40*e* and 40*f*. Data from the user devices may travel through the low voltage power lines (61*a* and 61*c*) to their respective CIDs (550*a* and 550*b*). The CIDs 550 provide signal conditioning, demodulation, and MAC processing as described above. In addition, the CIDs also may transmit the data packets to the EBD 500 via their wireless transceivers 510. The EBD 500 then provides routing functions as described above, and may forward the data packets to the MV modem 280 for transmission on the MV power line.

Similarly, data packets intended for user devices communicatively coupled to the CID 550 (e.g., from the internet via the backhaul point 10) may be routed first to the EBD 500. In this particular embodiment, the backhaul point 10 will add the MAC address of the MV modem 280 of the EBD 500 as the destination MAC address for data packets with destination IP addresses for the user devices electrically coupled (via low voltage power lines) to the EBD 500, CID 550*a*, and CID 550*b*. Thus, data packets coupled to the MV power line that are intended for user devices communicatively coupled to the CID 550 may first include the MAC address of the MV modem 280 of the EBD 500.

Upon determination of a match between the destination MAC address of the packet and the MAC address of MV modem 280, the MV modem 280 will remove the MAC header and supply the packet to the router 310. The router 310 may determine that the destination IP address of the data packet corresponds to a user device that is communicatively coupled to a particular CID 550 (e.g., based on the routing table) such as CID 550*a* or 550*b*. Upon making this determination, the router 310 may retrieve the MAC address of the LV modem 450a of the CID 550 from memory and include it in a MAC header (as the destination MAC address) that is added to the packet. The router 310 may then route the data packet to the wireless transceiver 316 to be transmitted to the CID 550 via the wireless link.

The wireless transceiver 510 of the CID 550 receives the data packet and supplies the data packet to the LV modem 450a. The LV modem 450a may compare the destination MAC address of the packet with the MAC address of the LV modem 450a. If the MAC addresses do not match, the packet may be discarded. If the MAC addresses match, the LV modem 450a may remove the MAC header and determine the MAC address of the PLID that provides communications for the user device identified by the destination IP address of the packet.

To determine the MAC address of the PLID that provides communications for the user device identified by the destination IP address of the packet, the LV modem 450a may first determine if the destination IP address of the packet is an IP address stored in its memory (e.g., stored in its bridging table). If the IP address is stored in memory, the LV modem 450a retrieves the MAC address for communicating with the IP address (e.g., the MAC address of the PLID) from memory, which will also be stored therein. If the IP address is not stored in memory, the LV modem 450a may transmit a request to all the devices to which it is communicatively coupled via the low voltage power line. The request is a request for the MAC address for communicating with the destination IP address of the packet. The device (e.g., the PLID) that has the MAC address for communicating with the destination IP address will respond by providing its MAC address. The LV modem 450a may then store the received MAC address and the IP address to which it provides communications in its memory (e.g., in its bridging table).

The LV modem 450a adds a new MAC header (e.g., that includes the MAC address of the PLID that provides communication for the user device identified by the destination IP address of the packet) to the packet and transmits the packet through the low voltage power line via coupler 410a. As will be evident to those skilled in the art, the CID 550, and in particular the LV modem 450a of the CID 550, includes routing information (e.g., a routing table and rules) stored in memory therein, which may include the MAC addresses (e.g., for PLIDs) and/or IP addresses (e.g., for the user devices) of devices communicatively coupled to the subnet of the CID 550.

The packet is then received by the PLID, which supplies the data packet to the appropriate user device and which may or may not remove the MAC header prior thereto.

Thus, in this particular embodiment, a single EBD 500 may provide communications through one or more CIDs 550 to user devices that are coupled to low voltage power lines other than the low voltage power lines to which the EBD 500 is physically coupled. The EBD 500 may provide communications through one, two, three, four or more CIDs 550, thereby providing communications for up to fifty or more users (e.g., eight CIDs 550 with eight user devices each and eight user devices coupled to the low voltage power lines that are coupled to the EBD 500).

In the above example, the CIDs 550 are coupled to low voltage power lines that receive power from the MV power line that is the same as the MV power line to which the EBD 500 is coupled (via coupler 210). However, the CIDs 550 may be coupled to LV power lines that receive power from a MV power line that is different from the MV power line to which the EBD 500 is coupled. In other words, one or more CID 550 may be coupled to LV power lines that receive power from a first phase and second phase of the MV power line conductors and the EBD 500 may be coupled to a third phase of the MV power line conductors. In addition, a CID 550 may be coupled to LV power lines that do not receive power from the same set of three phase MV power lines (i.e., the LV power lines may receive power from a different set of three phase MV power line conductors).

A CID 550 may be mounted adjacent a distribution transformer (and coupled to the LV power lines thereof) on each side of the EBD 500 as shown in FIG. 12. Furthermore, additional CIDs 550 may be installed further down or up the MV power line. In other words, one or more CIDs 550 may be installed on either or both sides of the EBD 500 so that there are two or more CIDs 550 on one or both sides of the EBD 500 along the MV power line. Also, a CID 550 need not be installed at the transformer adjacent the EBD 500. All that is required for operation for this embodiment is that the CIDs 550 be communicatively coupled to a user device and to the EBD 500. Depending on the wireless transceivers used, as well as other environmental considerations, the system may require a clear line of sight between the antenna of the EBD 500 and the antennas of the CIDs 550.

Other embodiments of the CID 550 may include a controller (which includes a processor, additional memory (e.g., RAM, ROM, PROM, and/or EPROM), and program code). In this alternate embodiment, the CID 550 may be assigned (and store in memory) an IP address to allow the PLS to transmit commands to the CID 550 and collect data therefrom. In addition, this alternate embodiment may assign IP addresses to user devices and may include a router and provide routing functions as described above with respect to the BD 100 (e.g., such as prioritizing voice packets over data packets or prioritizing based on the user device originally transmitting the packet).

Alternately, the CID 550 may be designed to perform minimal or no any packet processing. In other words, the CID 550 may simply receive a packet from the LV power line and wirelessly transmit the packet to the EBD 500 (or other wireless device). Similarly, the CID may receive packets wirelessly and transmit those packets (substantially in tact without, for example, modifying the MAC header) on the LV power line. In this embodiment, the EBD 500 (or other wireless capable device) would include the bridge tables and add the MAC address of the PLID corresponding to the user device addressed by the IP packet. Likewise, the PLIDs may store the MAC address of the EBD 500 wirelessly coupled to the CID 550. Thus, the CID 550 may be designed to perform varying levels of packet processing such as minimal packet processing (transmit all packets), perform MAC address processing, or perform IP (and MAC) address processing.

In addition, in the above embodiment the EBD 500 provides communications to the user devices coupled to the low voltage power lines to which it is coupled via coupler 210. However, in some instances that employ an alternate embodiment of the EBD 500, it may not be desirable to provide communications through the low voltage power lines. Thus, the alternate embodiment of the EBD 500 may not require most of a LV interface and may couple to the LV power lines only to draw power therefrom (i.e., not communicate data therethrough).

In still another embodiment, the CID 550 does not communicate to the user devices via the low voltage power lines, but instead communicates with the user devices and/or another CID 550 via a wireless link. In this alternate embodiment, the CID 550 may use the same wireless transceiver (e.g., with an omni-directional antenna) to communicate with the user devices and/or CID 550 (e.g., via an 802.11 wireless access point at the customer premises) and with the EBD 500. In still another embodiment, the CID 550 may use a first wireless transceiver (e.g., with an omni-directional antenna) to communicate with the user devices (e.g., via an 802.11 wireless access point at the customer premises) and a second wireless transceiver to communicate with the EBD 550. Each transceiver may be communicatively coupled to a controller (in the CID 550) that may perform routing functions and PLS communications as described above.

As an alternate to this embodiment, the CID 550 may be configured to simply shift the frequency of the wireless signal (such as a digital spread spectrum (DSS) signal or 802.11 signal) it receives from the EBD 500 and couple the signal to the LV power line for transmission through the LV power line and reception by a user device or other intermediate device designed to receive and process such signals. Likewise, the EBD 500 may be configured to simply frequency shift the received wireless signals (such as a DSS or 802.11 signal) and transmit them through the MV power line for reception by a backhaul point designed to receive and process such signals.

Transmission from the backhaul point through the MV power line (and from the user device through the LV power line) may be of the same transmission type (e.g., a DSS or 802.11 frequency shifted signal) or may be of another transmission type.

In many neighborhoods and geographical areas, the customer premises receive electrical power via underground power lines. For example, a pad mounted or underground transformer receiving receive power via an underground MV power line, may supply power to one or more user premises via underground LV power lines. In some instances, the pad mounted or underground transformers may be in an enclosure that may be difficult to access for installing PLC devices. In other instances, it simply may be more desirable to provide power line communications to the user premises—whether the electrical distribution network of the geographical area includes underground and/or overhead power lines—without employing the MV power lines and/or a MV interface 200.

Thus, another embodiment of a communication device of the present invention utilizes existing electrical distribution network infrastructure as an insertion point (a location on the electrical distribution network for inserting and/or extracting data signals) for the PLCS.

Figure 15:
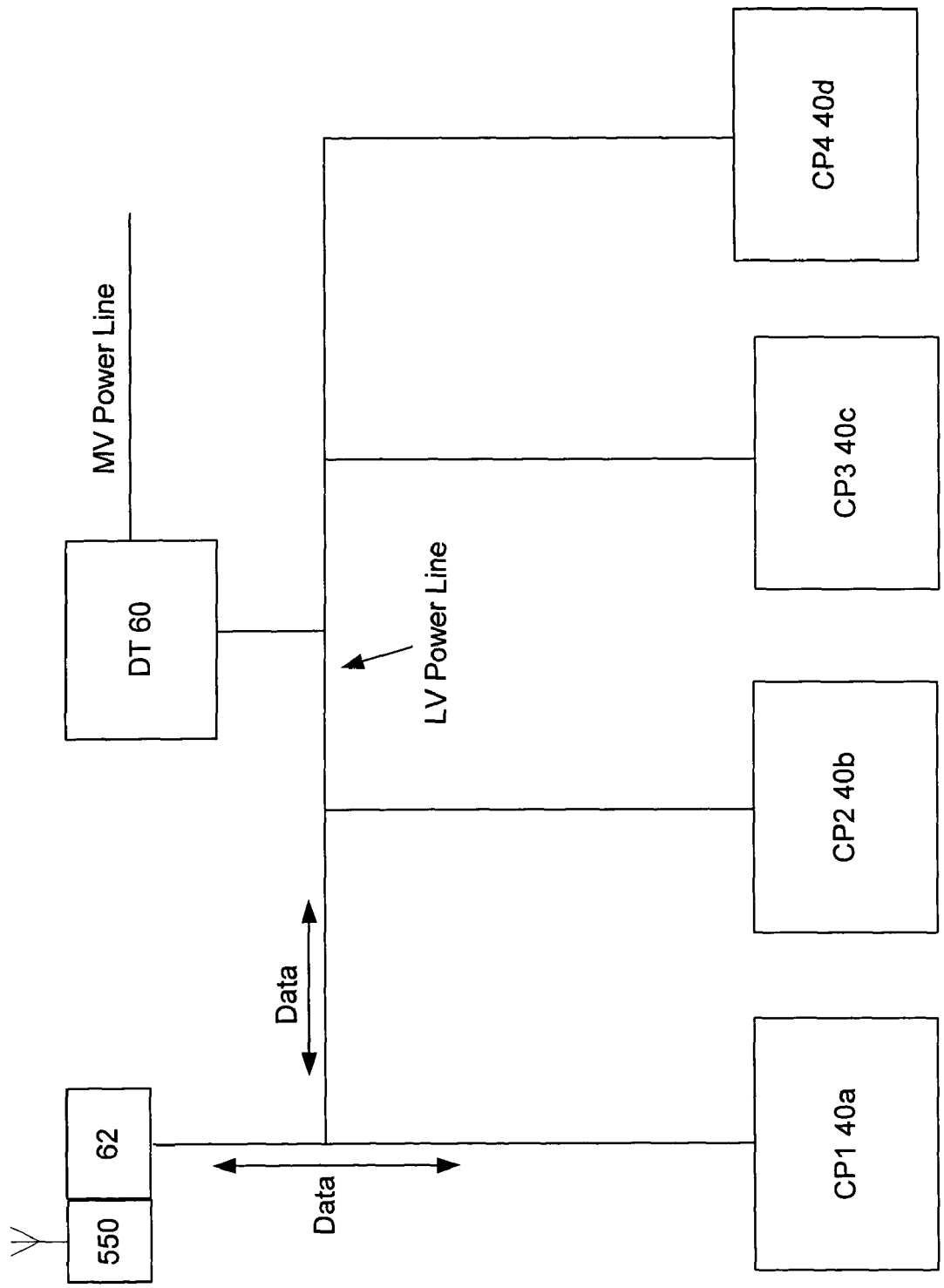
FIG. 15 is a schematic of a portion of a power line communication system in accordance with an embodiment of the present invention.

In one example embodiment shown schematically in FIG. 15, a street light 62, such as those receiving power from a LV power line, may provide an insertion point for the PLCS. The street light 62 may be on the same LV subnet as one or more customer premises. In other words, the LV power line providing power to the street light 62 may also be electrically coupled to one or more customer premises 40 as shown. This electrical connection—between the street light 62 and the customer premises 40—may thus be used to provide power line communications. Thus, the CID 550 need not be installed at a distribution transformer and may be communicatively coupled to existing electrical distribution network infrastructure to provide communications to the user devices communicatively coupled to the LV subnet to which the electrical distribution network infrastructure is coupled.

Street lights, such as those mounted to street light poles, are one example of existing electrical distribution network infrastructure that may be used as an insertion point. Street lights often have a photocell mounted on the top side of the light fixture. Based on the ambient light detected, the photocell controls whether the street light is turned on or off. The photocell includes a plug that plugs into a socket on the top of the light fixture. Thus, the photocell receives power from the same source as the street light itself, which typically is the LV power line. In the United States, both energized conductors typically are used to power the street light, thereby providing access to both LV conductors for communications.

In this example, the LV power line coupler 410*a* of this embodiment of the CID 550 includes a cylinder shaped device that includes a plug on one side and a socket on the other side. The plug is adapted to plug into the socket on top of the street light fixture. The socket of the coupler 410*a* is adapted to receive the plug of the photocell. The coupler 410*a* allows the photocell to receive power from the street light, but also provides a method of communicatively coupling the CID 550 to the LV power line (e.g., both energized conductors and the neutral) to provide communications to the user devices on the LV subnet. In addition, the CID 550 also preferably includes a power supply that receives power from the LV power line via the coupler 410*a* as described above.

While in this example embodiment the CID 550 is communicatively coupled to a street light, other electrical distribution network infrastructure to which the CID may be coupled include a traffic light (or LV power lines or control box coupled to the traffic lights), a hazard light, a sign (e.g., a business sign), decorative lighting, a billboard, or other electrical infrastructure. In addition, the CID 550 may be communicatively coupled to the LV power line at a customer premises 40 (e.g., outside such as on top of the premises or at an outdoor electrical outlet). For example, the antenna of the CID 550 may be installed on top of the premises (e.g., on or near the roof) while the remaining portion of the CID 550 may be mounted indoors (e.g., in the attic). The LV coupler 410*a* may be comprised of a wall socket plug that plugs into a wall socket, such as a 120 V wall socket (or alternatively a 240 V socket), or be designed to mate with a light bulb socket. Thus, these embodiments of the coupler 410*a* include a male portion adapted to mate with a female receptacle. The male portion of the coupler 410*a* is in electrical communication with a female receptacle of the coupler 410*a*, which is adapted to receive the male projection of an electrical device. The male portion and female receptacle of the coupler 410, may be electrically coupled together by one or more conductors (depending on how many conductors are present in the external female receptacle with which the coupler is designed to be used). In addition, the male portion of the coupler 410*a*, the female receptacle of the coupler 410*a*, or both are communicatively coupled to a transceiver (e.g., a modem) such as through signal conditioning circuitry (as discussed above) and may also supply power to a power supply.

If the LV coupler 410*a* is coupled only to one LV energized conductor (e.g., in the case of a light socket or 120 V wall socket), a LV data signal coupler may be installed (e.g., elsewhere in the premises) to couple the data signals from the first LV energized conductor to the second LV energized conductor. Such LV data signal couplers are well-known in the art. Depending on the geometry of the energized conductors and the strength and frequency of the data signals, a LV data signal coupler may not be necessary.

While the electrical distribution network infrastructures described above use (consume) electricity (e.g., to illuminate the light in the street light, to illuminate the billboard, to control and/or illuminate the traffic light), other electrical distribution network infrastructures may not themselves use electricity, but may simply house or be physically near the LV power lines.

Ideal structures for installation of a CID 550 as an electrical distribution network infrastructure insertion point are those that include a portion with a higher elevation than surrounding structures (e.g., buildings, trees, etc.) and have a LV power line (preferably with two low voltage energized conductors). However, the CID 550 may be installed anywhere communications can be achieved.

The CID 550 may be designed and installed to communicate with any wireless device that facilitates communications—hereinafter referred to as a CID Link. As discussed, it may be configured (designed and installed) to communicate with a CID Link that is an EBD 500. However, the CID 550 also may be configured to communicate with other CIDs 550. In addition, the CID 550 may be configured to communicate with a wireless repeater—which repeats the data to and from a backhaul point 10 (or AP 20) configured with a wireless transceiver. Similarly, the CID 550 may be configured to communicate with a device (e.g., an AP 20, distribution point, BP 10) that includes a wireless transceiver (and provides communications for a plurality of CIDs 550) and a line transceiver such as fiber optic transceiver or wired conductor transceiver (e.g., a conventional copper wire modem) for providing communications to and from the Internet or other destination.

In addition, a plurality of wireless repeaters (which may act as a BP 10) each may be configured to provide wireless communications with a plurality of CIDs 550. Each wireless repeater may be configured to communicate data (upstream) with an AP 20 (or distribution point) via wireless or wired link.

Thus, the CID Link may take the form of an EBD 500, a wireless repeater, a backhaul point with a wireless transceiver, an AP 20 having a wireless transceiver, another CID 550, or another device with wireless capabilities. Thus, one CID 550 may provide communications for, and act as a backhaul point 10 for, other CIDs 550 in much the same way as described for the wireless BP 10*a* above. Consequently, a plurality of CIDs 550 may form a wireless network in much the same way a wired network is formed by the BDs 100 and BP 10 described above.

The CID Link, whichever embodiment it takes, may be installed at any suitable location such as on a water tower, a mobile telephone communications tower, a radio tower, a television broadcast tower, a telephone pole, an electric utility pole, a street light, a hill top, a building, a traffic light, a billboard, a sign, decorative light, or other suitable structure. In one embodiment, a plurality of CIDs are installed on a plurality of utility poles for coupling to the LV power lines. The CIDs 550 are wirelessly linked to a CID Link that provides BP functionality and which is communicatively coupled to an AP 20.

As discussed, the CID 550 may be designed to perform varying levels of packet processing such as minimal packet processing (transmitting substantially all packets), perform MAC address processing, or perform IP (and MAC) address processing (and therefore, may or may not include a router).

Depending on the design of the network (and CID), each of the plurality of CIDs 550 in the network may have a unique MAC address, have a unique MAC address and IP address (e.g., an IP address assigned by the PLS as described above), or may simply pass through all packets without regard to addresses. The PLS may assign IP addresses to (if applicable), and store the location and other configuration information (serial number, address(es), subnet mask, and other information) of, each CID 550 (and CID Link if applicable) as described above with respect to the BD 100.

The communication network may thus be comprised of a plurality of CID Links (communicatively coupled to one or more AP 20) that each provides communications for a plurality of CIDs 550, which each provides communications to the user devices of one or more customer premises (via the LV power lines and/or wirelessly). The communication network may also include the MV attached network elements previously described (which may include a unique MAC and/or IP address) such as numerous wireless BPs 10*a*, backhaul points 10 (which may be communicatively coupled to one or more AP 20, which may be the same or different AP 20 to which the CID Links are coupled), which are coupled to BDs 100, repeaters 70, EBD 500, and other MV power line attached devices. As discussed, the configuration information and other information of each network element (MV coupled and wireless devices) may be stored in the PLS.

As will evident to those skilled in the art, the LV interface may be comprised of a signal conditioner (if any), a coupler, and the transceiver (i.e., transmitter and receiver), which may be a modem. The LV interface 400 may be combined with a wireless transceiver (as discussed in the context of CID 550) and/or a MV interface 200 (as discussed in the context of BD 100). In addition, the LV interface 40 may be combined with another LV interface 400 to couple data signals, for example, to another LV power line (e.g., another LV subnet, which may have two separate LV energized conductors). Any of these combinations may also include a controller (which may or may not have router functionality) as described above.

Topology

Figure 17A:
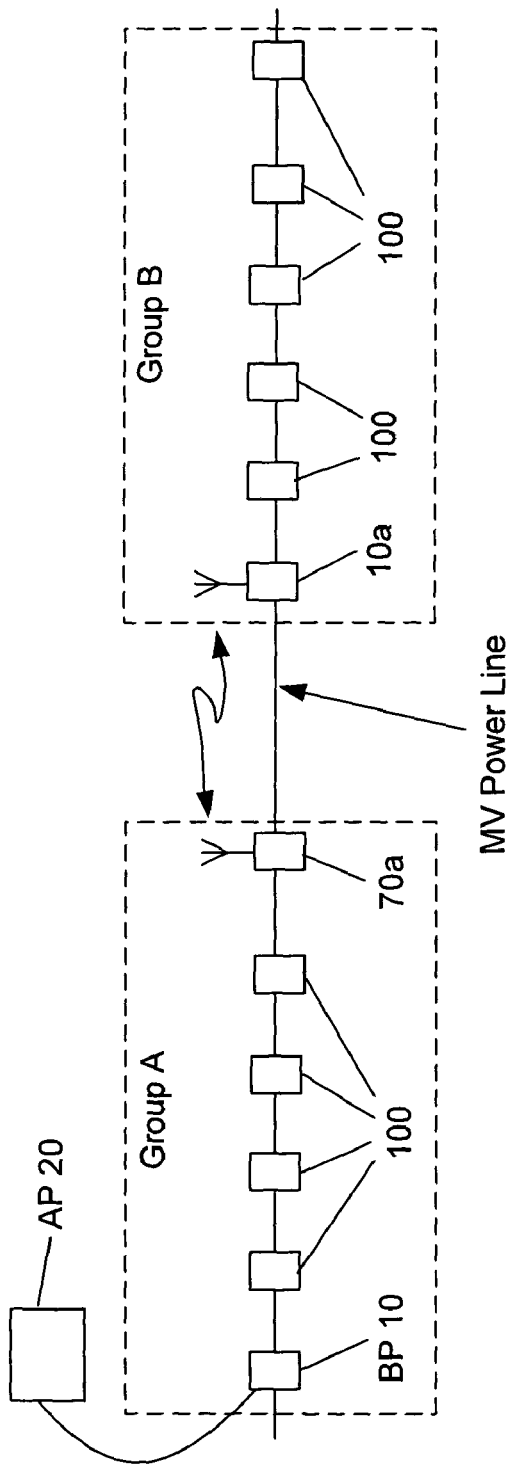
FIGS. 17*a–b* are schematics of a portion of a power line communication system in accordance with an embodiment of the present invention.

It will be evident to those skilled in the art that the PLC devices described herein permit a great deal of flexibility in network topology. One example topology is shown in FIG. 17*a*, which includes a first group (Group A) and second group (Group B) of PLC devices. Group A is comprised of a BP 10 in communication with AP 20. The communication link between the BP 10 and the AP 20 may be wireless, wired, fiber optic, or another type of link. Group A is also comprised of four bypass devices 100 and one repeater 70*a*. The repeater 70*a* of this embodiment is a MV-wireless repeater that is communicatively coupled to the MV power line and that repeats data through the MV power line or wirelessly. The repeater 70*a* thus includes a MV interface 200 (as described herein), a controller 300 (which may include a router), and a wireless transceiver 316 (as described herein in the context of the CIDs 550 and EBDs 500).

Group B is comprised of a wireless BP 10*a* that acts a first backhaul point for the five BDs 100 in Group B. In other words, the wireless BP 10*a* is in communication with the BDs 100 in Group B via the MV power line. In addition and as discussed, a wireless BP 10*a* includes a wireless transceiver for wireless communications, and in this embodiment, the wireless BP 10*a* is configured for wireless communications with the repeater 70*a* of Group A.

Due to noise, attenuation, and other characteristics of power lines, a BP (such as the BP 10 of Group A) will be able to reliably communicate data only a finite distance. In this example, the BP 10 may directly communicate with the repeater 70*a*, but not with the wireless BP 10*a*. However, the BP 10 may provide communications for Group B via the wireless link between the repeater 70*a* and the wireless BP 10*a*. More specifically, data transmitted on the MV power line by a BD 100 in Group B is received by the wireless BP 10*a* and wirelessly transmitted. The repeater 70*a* receives the wirelessly transmitted data, may process the data, and transmits the data on the MV power line. The BP 10 receives the data via the MV power line and processes the data as described herein (e.g., MAC processing and transmission to the AP 20 for transmission on a network such as the Internet).

Data from the AP 20 intended for a user device serviced by a PLC device in Group B will be received by the BP 10. Based on the destination IP address of the data packets and information in the routing (or bridge) table, the BP 10 may insert the MAC address of the MV modem of the repeater 70*a* as the destination MAC address. The data packets are then received by the repeater 70*a*. Based on the destination IP address of the data packets and information in the routing (or bridge) table of the repeater 70*a*, the repeater 70*a* may insert the MAC address of the MV modem of the PLC device in Group B that services the user device (corresponding to the destination IP address) as the destination MAC address of the packet. Thus, the wireless BP 10*a* may receive the data, and transmit all data on the MV power line that is not addressed to the BP 10*a*. Alternately, the repeater 70*a* may transmit all the data and the wireless BP 10*a* may insert the MAC address of the MV modem of the PLC device in Group B that services the user device (corresponding to the destination IP address) as the destination MAC address of the packet. The repeater 70*a* or wireless BP 10*a* (as the case may be) may ignore packets with IP addresses (and/or MAC addresses) that do not correspond to a user device serviced by a PLC device in Group B. Once the data packet is received by the correct PLC device in Group B, the packet is processed as described above (e.g., signal processing, MAC processing, etc.).

Thus, the wireless link between the repeater 70*a* and the wireless BP 10*a* permits communications over a portion of the power lines that might not otherwise be obtainable by the BP 10 alone. While in this example embodiment Group B is on the same power line as Group A, some or all of the devices of Group B may be communicatively coupled to a different phase conductor or on a conductor in a different conductor set (e.g., a different three phase conductor set). While in this embodiment the repeater 70*a* is used to establish the wireless link, another embodiment instead may use an EBD 500 in Group A, which additionally services its own customer premises (e.g., via the LV power lines or wirelessly), to establish the wireless link. Likewise, while the above embodiment uses a wireless BP 10*a* in Group B to establish the wireless link, another embodiment may use a MV-wireless repeater 70*a* (which may have a MV interface, controller, and wireless transceiver) in Group B, which may not service any customer premises and/or perform backhaul functions.

The groups of the above example are disposed so that the communications on the MV power line of either group may not be received by the PLC devices of the other group, thereby providing network isolation between the groups. This network isolation may be caused by the attenuation of the data signals traveling from one group toward the other, which may be due to the distance between the groups along the power line, the fact that the groups are on different conductors or different sets of conductors, and/or the use of one or more attenuators (e.g., RF chokes) between the groups. In addition, the network isolation may be provided through the use of software methods to isolate the groups (e.g., using different addressing, using different encryption keys, or using different carrier frequencies for each group).

While the above embodiment employs a wireless link between Group A and B, other embodiments may use a fiber optic link, a twisted conductor pair link, a coaxial cable, or another type of communication link. One advantage of these non-power line links is that the BDs 100 in the groups cannot receive the wireless, fiber optic, coaxial, or twisted pair communications as the case may be, and therefore, cannot get confused by receiving data not intended for the BDs 100. In other words, the non-power links facilitate communication between the desired PLC device of each group, but otherwise maintain the isolation between the groups. However, other embodiments may use the MV power line conductor as the communication link. In such an embodiment, another method (e.g., using different addressing, using different encryption keys, or using different carrier frequencies for each group) may be used to isolate communications of the groups of BDs 100. While the above embodiments include the BDs 100 in the groups, the groups also (or instead) may include CIDs 550, additional MV repeaters, EBDs 500, other PLC devices, or some combination thereof. In addition, one or more additional groups may be added that are comprised of the components of Group B and thereby are communicatively linked to Group A via repeater 70*a* (or an additional repeater 70*a* designated for communication with the additional group) or to an alternative wireless BP 10*a* in Group A. Finally, another group could added (e.g., having the components of Group B) to communicate with Group A via Group B, which may further include a repeater 70*a*.

In another example topology, the PLCS may be comprised of a plurality of groups of CIDs 550 that each provide communications to one or more customer premises (e.g., via the LV power lines). In this example, each CID 550 is in communication (wirelessly) with either a BP 10 with wireless capabilities (that is in communication with an AP 20), a wireless repeater such that shown in FIG. 16 that is wirelessly linked to an AP (perhaps through a BP 10), or an AP 20 that includes wireless capabilities. Thus, in some embodiments of this topology there may be no need for a backhaul point or communications over the MV power line.

As is known in the art, each PLC device coupled to the power line conductor may have a "through loss" and a "coupling loss." The through loss is the reduction in the strength (power) of the data signals as they pass through the PLC device (e.g., the coupling device of the PLC device) while traversing the power line conductor. For example, the through loss of a PLC device (e.g., a BD 100) reduces the power of the data signals transmitted by a BP 10 that traverse through the PLC device and are received by a second PLC device (such as a BD 100, repeater 70, etc.) further down the power line. Likewise, the through loss may be bi-directional and, therefore, may reduce the power of the data signals transmitted by the second PLC device (e.g., a BD 100, repeater 70, etc.) further down the power line that traverses up the power line, through the PLC device to the BP 10. Thus, the through loss of devices on a power conductor reduces the distance over which the data signals can reliably communicated over that power line conductor.

Coupling loss is the power loss of the data signals as that are coupled off of (or onto) the power line conductor (e.g., to or from the electronics of the PLC device). In other words, when the data signals arrive at the PLC device (e.g., its coupler) on the power line, the data signals must have power that is equal to or greater than th coupling loss of the PLC device for the data signals to be reliably received by the PLC device.

For example, assume that the through loss of each BD 100 in Group A is ten decibels (dB) and the coupling loss of the repeater 70a is fifteen dB. If the data signals transmitted by the BP 10 in FIG. 17a are forty dB above the noise (i.e., the link budget is forty dB) when coupled onto the MV power line conductor, the data signal will essentially be indiscernible from noise after traversing through four BDs 100. This is because the combined power loss due to the through loss of the four BDs 100 will be equal to the forty dB of power supplied by the BP 10. However, if the data signals are transmitted by the BP 10 at sixty dB above the noise, the data signals will be received by the repeater 70a, because forty dB will be the loss due to the BDs 100 and fifteen dB will be the loss due to the coupling loss of the repeater 70a leaving five dB of excess power. These examples are for illustrative purposes, of course, and assume that the power line itself is lossless, which is not a valid assumption in real world applications.

Figure 17B:
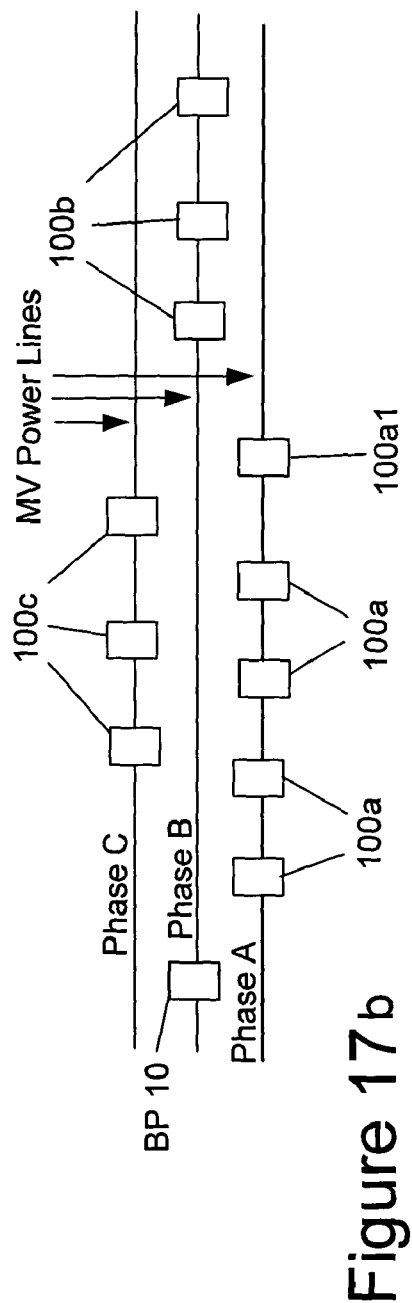
Figure 18:
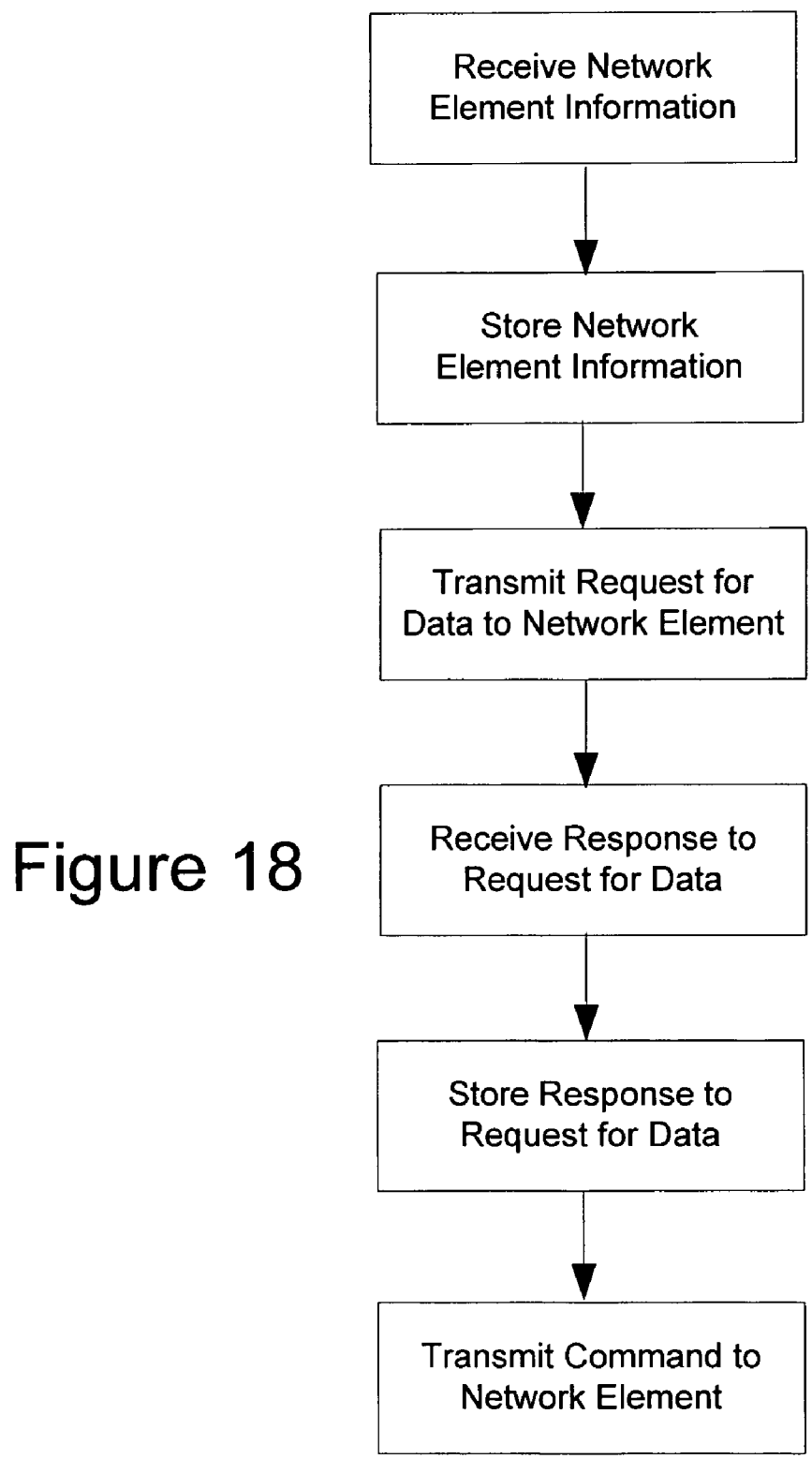
FIG. 18 provides a flow chart of an example method of operating a power line communication system in accordance with an embodiment of the present invention.

FIG. 17b illustrates a method of arranging PLC devices to minimize the effects of the PLC devices' through loss on the PLCS performance. As discussed, the data signals may be transmitted using modulation techniques that use carrier frequencies in the megahertz range. Due to these frequency ranges and the physical arrangement of the power lines (e.g., their diameter and spacing), the data signals may couple from one phase conductor to one or more of the other phase conductors, which typically run in parallel.

As shown in FIG. 17b, the BP 10 is communicatively coupled to the middle conductor (Phase B) of the three MV power line conductors. In this embodiment, the BP 10 provides communications to all of the BDs 100 in FIG. 17b. The BP 10 communicates with the BDs 100b coupled to Phase B via the Phase B power line conductor. The BP 10 communicates with the BDs 100a coupled to Phase A via coupling of the data signals from the Phase B conductor to the Phase A conductor. The BP 10 communicates with the BDs 100c coupled to Phase C via coupling of the data signals from the Phase B conductor to the Phase C conductor. The BDs 100c on Phase C and BDs 100a on Phase A may provide communications for customer premises between the BP 10 and BDs 10b. However, the BDs 100c and 100a are not communicatively coupled to Phase B and, therefore, cause a significantly less (or substantially zero) through loss to the data signals communicated to the BDs 100b on Phase B. It is worth noting, however, that the BDs 100c on Phase C and BDs 100a on Phase A may have a greater effective coupling loss than they would if coupled to Phase B because there will be a loss as the data signals couple from Phase B to either Phase A or C.

In addition, the data signals may couple from Phase B to Phase A for reception by the BD 100a1, thereby circumventing at least a portion of the through loss of the BDs 100a that are between the BP 10 and BD 100a1. It will be evident from the description herein that a PLC device, such as a transformer bypass device 100, a BP 10, and an EBD 500, may be coupled to any MV power line phase desired by the network designer. Specifically, the PLC devices do not need to be (although they may be) coupled to the MV power line phase conductor that supplies power to the distribution transformer electrically coupled to the LV power line(s) to which the PLC device is coupled. For example, referring to FIG. 17b, the BDs 100b shown on phase B may service customer premises that are supplied power by a transformer coupled to (and receiving power from) Phase A or C.

As will evident to those skilled in the art, the topology of FIG. 17b (and principles taught therein) could be used for (or in) the topology of Group A and/or B in FIG. 17a (and with the principles taught therein).

Miscellaneous

As discussed, the functions of the PLID may be integrated into a smart utility meter such as a gas meter, electric meter, or water meter. The meter may be assigned an IP address by the PLCS (e.g., by the PLS) and, upon receiving a request or at predetermined intervals, transmit data such as consumption data to the BD 100, the PLS, and/or a utility computer system in a manner described herein, thereby eliminating the need to have utility personnel physically travel to read the meter. In addition, one or more addressable switches, which may form part of a utility meter, may be controlled via the PLCS (e.g., with commands transmitted from the BD 100, the PLS, and/or utility computer system) to permit connection and disconnection of gas, electricity, and/or water to the customer premises.

Similarly, the PLCS may be used to control MV power line switches. The addressable MV power line switch may be a motorized switch and assigned an IP address by the PLS, which is also provided to the utility computer system to thereby operate the switch. When a power outage is detected, the utility company may remotely operate one or more addressable MV power line switches to provide power to the area where the outage is detected by transmitting commands to the IP addresses of the switches.

Likewise, the PLCS may be used to operate a capacitor switch that inserts or removes a capacitor (or capacitor bank) into the power distribution system. Capacitor banks are used to improve the efficiency of the power distribution network by providing Volt/VAr management (e.g., modifying the reactance of the power distribution network). Thus, the PLS may assign an IP address to one or more capacitor switches, which is also provided to the utility computer system to thereby operate the switch. Based on power quality measurements taken and received from one or more BDs, the utility company may insert or remove one or more capacitor banks by remotely actuating one or more capacitor bank switches by transmitting commands to the IP addresses of the switches.

The capacitor switch and the MV power line switch may be controlled by an embodiment of the present invention that includes a MV interface and controller. In addition, in some embodiments a LV interface may also be employed.

The PLID 50 in the above embodiments has been described as a device that is separate from the user device. However, the PLID 50 may also be integrated into and form part of the user device.

While the above described embodiments utilize a single modem in the LV interface and the in the MV interface, alternate embodiments may use two modems in the LV interface and two modems in the MV interface. For example, the LV interface may comprise a receive path (for receiving data from the LV power lines) that includes a LV modem and signal conditioning circuitry and a transmit path (for transmitting data through the LV power lines) that includes a second LV modem and signal conditioning circuitry. Each LV modem may have a separate address (MAC and IP address) and operate at a separate frequency band. Thus, the receive or transmit LV interfaces may also include frequency translation circuitry.

Likewise, as another example the MV interface may comprise a receive path (for receiving data from the MV power line) that includes a MV modem and signal conditioning circuitry and a transmit path (for transmitting data through the MV power line) that includes a second MV modem and associated signal conditioning circuitry. Each MV modem may have a separate address (MAC and IP address) and operate at a separate frequency band. Thus, the receive or transmit MV interfaces may also include frequency translation circuitry. A repeater may also be constructed with multiple MV modems in both of its MV interfaces or in its only MV interface as the case may be.

While the described embodiments may apply the data signals to one MV conductor (and the data signals may couple to other conductors), other embodiments may apply the data signals differently. For example, a first MV coupler (and an associated MV interface) may be coupled to a first MV conductor for transmitting data on the MV conductor and a second MV coupler may be coupled to a second MV conductor for receiving the return current of the transmitted data. The two couplers may thus share a signal MV modem. Similarly, the first and second couplers (coupled to the first and second MV power line conductors) may transmit (and receive) the data signals differentially as described above in the context of the LV power line transmissions and shown in FIGS. 6b and 6c. Thus, the same data signal may be transmitted down multiple MV conductors with the signal on each conductor being phase shifted (e.g., 120 degrees or 180 degrees) with respect to the signal(s) on the other conductor(s). Alternately, in any of these embodiments, the neutral conductor may be used (e.g., as a return path or separate transmission path) instead of one or more of the MV conductors.

As will be evident to those skilled in the art, the backhaul points and PLIDs for communicating with these alternate embodiments of the bypass device (or repeater) would also require similar circuitry for transmitting and receiving with multiple modems and in the different frequency bands. More specifically, the modified backhaul point and/or PLID would also require a first and second modem for transmitting and receiving, respectively, and designed to operate in the appropriate frequency bands for establishing communications. Such a system would permit full duplex communications through the power lines.

In the above embodiment, the processor performs routing functions and may act as a router in some instances and perform other functions at other times depending on the software that is presently being executed. The router may also be a chip, chip set, or circuit board (e.g., such as an off the shelf circuit card) specifically designed for routing, any of which may include memory for storing, for example, routing information (e.g., the routing table) including MAC addresses, IP addresses, and address rules.

The isolator described above provides a non-electrical signal path (i.e., for transmission of a signal that is non-electrical), which is a fiber optic signal path. However, any non-electrical signal may be used such as a radio frequency signal, a microwave signal, and the like.

Finally, the type of data signal coupled by the coupling device may be any suitable type of data signal. The type of signal modulation used can be any suitable signal modulation used in communications (Code Division Multiple Access (CDMA), Time Division Multiple Access (TDMA), Frequency Division Multiplex (FDM), Orthogonal Frequency Division Multiplex (OFDM), and the like). OFDM may be used one or both of the LV and MV power lines. A modulation scheme producing a wideband signal such as CDMA that is relatively flat in the spectral domain may be used to reduce radiated interference to other systems while still delivering high data communication rates.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method of operating a power line communication system (PLCS) for communicating over an electrical power distribution network (EPDN) having a plurality of medium power lines, and wherein the PLCS includes a plurality of power line network elements, with each network element having a first port coupled to one of the plurality of medium voltage power lines of the EPDN at a different location and a second port in communication with one or more user devices disposed at one or more customer premises, the method comprising:
receiving network element information relating to the plurality of the power line network elements transmitted, at least in part, via one or more medium voltage power lines of the EPDN;
storing said network element information in a memory; and
wherein said network element information comprises a network element address.

2. The method of claim 1, wherein said network information further comprises information relating to the physical location of the network element.

3. The method of claim 1, wherein said network element address comprises an IP address.

4. The method of claim 3, wherein said network element address comprises a MAC address.

5. The method of claim 1, wherein said network element address comprises a MAC address.

6. The method of claim 1, further comprising transmitting a device address to a network element.

7. The method of claim 6, wherein said device address is an IP address.

8. The method of claim 6, wherein said device address is an address for a low voltage interface of the network element.

9. The method of claim 1, further comprising transmitting a subnet mask to a network element.

10. The method of claim 1, further comprising transmitting customer information to a network element.

11. The method of claim 1, wherein the customer information is transmitted, at least in part, via the EPDN.

12. The method of claim 10, wherein said customer information comprises an encryption key.

13. The method of claim 10, wherein said customer information comprises data filtering information.

14. The method of claim 10, wherein said customer information comprises a user device address.

15. The method of claim 10, wherein said customer information comprises a subscription level.

16. The method of claim 1, further comprising transmitting a Domain Name Service address to a network element.

17. The method of claim 1, further comprising transmitting a registration server address to a network element.

18. The method of claim 1, further comprising:
receiving a notification of a new user device; and
storing information of said notification in a memory.

19. The method of claim 18, wherein the receiving comprises communication of the notification, at least in part, via the EPDN.

20. The method of claim 1, further comprising:
receiving user information;
receiving payment information; and
storing said user information.

21. The method of claim 20, wherein the receiving comprises communication of said user information, at least in part, via the EPDN.

22. The method of claim 20, wherein said user information comprises a user name and a user address.

23. The method of claim 20, further comprising transmitting an activation notice to a network element servicing the user.

24. The method of claim 1, further comprising:
identifying a power outage on the EPDN; and
determining a location associated with the power outage.

25. The method of claim 24, wherein said determining comprises receiving power outage information of the EPDN wherein said power outage information is communicated, at least in part, via the EPDN.

26. The method of claim 24, further comprising transmitting information of the power outage and information relating to the location of the power outage.

27. The method of claim 1, further comprising receiving information of an unauthorized attempt to access the PLCS.

28. The method of claim 1, further comprising receiving a request for permission to access the PLCS.

29. The method of claim 1, further comprising receiving a request for an address from a network element.

30. The method of claim 29, further comprising:
determining an address for the network element; and
transmitting said address to the network element.

31. The method of claim 30, wherein said address is transmitted, at least in part, via the EPDN.

32. The method of claim 1, further comprising:
determining an address for the network element; and
transmitting said address to the network element.

33. The method of claim 1, further comprising transmitting a command to download software to a network element.

34. The method of claim 33, wherein said command is transmitted, at least in part, via the EPDN.

35. The method of claim 33, further comprising transmitting a file name and address for downloading the software.

36. The method of claim 35, further comprising:
receiving a request for software from the network element; and
transmitting the software to the network element in response to the request for software.

37. The method of claim 36, further comprising transmitting a command to use the transmitted software.

38. The method of claim 1, further comprising:
receiving a request for software from a network element; and
transmitting the software to the network element in response to the request for software.

39. The method of claim 38, further comprising transmitting a command to use the transmitted software.

40. The method of claim 1, further comprising:
receiving an out of limit notification; and
storing said out of limit notification in memory.

41. The method of claim 1, further comprising transmitting a time synchronization command to a network element wherein said time synchronization command comprises time information.

42. The method of claim 41, wherein said time synchronization command is transmitted, at least in part, via the EPDN.

43. The method of claim 1, further comprising transmitting a command for measurement intervals.

44. The method of claim 1, further comprising transmitting a request for data to a network element device.

45. The method of claim 44, wherein said request is transmitted, at least in part, via the EPDN.

46. The method of claim 44, wherein said requested data comprises an amount of data communicated by the network element device.

47. The method of claim 44, wherein said requested data comprises an amount of data received by a user device.

48. The method of claim 44, wherein said requested data comprises temperature data.

49. The method of claim 44, wherein said requested data comprises voltage data.

50. The method of claim 49, wherein said voltage data is based on at least one low voltage measurement by the network element device.

51. The method of claim 49, wherein the voltage data comprises time data.

52. The method of claim 44, wherein said requested data comprises electrical current data.

53. The method of claim 44, further comprising:
receiving said requested data; and
storing said requested data.

54. The method of claim 1, further comprising:
receiving a request from a user to filter data; and
transmitting filtering information based on said filter data to a network element.

55. The method of claim 1, further comprising transmitting a reset command to a network element.

56. The method of claim 55, wherein said command is transmitted, at least in part, via the EPDN.

57. A computer program product in a computer readable medium for operating a power line communication system (PLCS) for communicating over an electrical power distribution network (EPDN) having a plurality of medium voltage power lines, and wherein the PLCS includes a plurality of power line network elements, with each network element having a first port coupled to one of the plurality of medium voltage power lines of the EPDN at a different location and a second port in communication with one or more user devices disposed at one or more customer premises, the program comprising:
a first code segment to transmit a request for data to a network element, at least in part, via a medium voltage power line of the EPDN;
a second code segment to receive and store a response to said request for data, wherein the response is communicated, at least in part, via a medium voltage power line of the EPDN;
a third code segment to transmit a command to a network element, at least in part, via a medium voltage power line of the EPDN; and
a fourth code segment to store information identifying the network element, an address of the network element, and the physical location of the network element.

58. The computer program product of claim 57, wherein said command comprises a reset command.

59. The computer program product of claim 57, wherein said command comprises a time synchronization command.

60. The computer program product of claim 57, wherein said command comprises a Domain Name Service address.

61. The computer program product of claim 57, further comprising:
a fifth code segment for determining an IP address for a network element; and
a sixth code segment for transmitting said IP address to the network element.

62. The computer program product of claim 57, further comprising a code segment for transmitting customer information to a network element.

63. The computer program product of claim 62, wherein said customer information comprises an encryption key.

64. The computer program product of claim 62, wherein said customer information comprises a subscription level.

65. The computer program product of claim 57, further comprising:
a fifth code segment for receiving user information;
a sixth code segment for receiving payment information; and
a seventh code segment storing said user information.

66. The computer program product of claim 57, further comprising a fifth code segment for identifying a power outage.

67. The computer program product of claim 61, wherein the network element comprises a coupler configured to communicatively couple to a street light.

68. A method of operating a power line communication system (PLCS) for communicating over an electrical power distribution network (EPDN) having a plurality medium voltage power lines, and wherein the PLCS includes a plurality of power line network elements, with each network element having a first port coupled to one of the plurality of medium voltage power lines of the EPDN at a different location and a second port in communication with one or more user devices disposed at one or more customer premises, the method comprising:
storing said network element information in a memory wherein said network element information comprises an address and information identifying the network element;
transmitting a request for data to a network element, at least in part, via a medium voltage power line of the EPDN;
receiving a response from said request that is transmitted, at least in part, over a medium voltage power line of the EPDN;
storing at least a portion of said response; and
transmitting a command to a network element, at least in part, via a medium voltage power line of the EPDN.

69. The method of claim 68, further comprising:
receiving user information;
receiving payment information; and
storing said user information.

70. The method of claim 68, wherein said command comprises a reset command.

71. The method of claim 68, wherein said command comprises a time synchronization command.

72. The method of claim 68, wherein said command comprises a DNS address.

73. The method of claim 68, further comprising:
determining an IP address for a network element; and
transmitting said IP address to the network element, at least in part, via the EPDN.

74. The method of claim 68, further comprising transmitting customer information to a network element.

75. The method of claim 74, wherein said customer information comprises an encryption key.

76. The method of claim 74, wherein said customer information comprises a subscription level.

77. The method of claim 68, further comprising:
receiving user information;
receiving payment information; and
storing said user information.

78. The method of claim 68, further comprising identifying a power outage.

* * * * *